US006978295B2

(12) United States Patent　　　(10) Patent No.:　　US 6,978,295 B2
Meifu et al.　　　(45) Date of Patent:　　Dec. 20, 2005

(54) SERVER APPARATUS FOR SPACE INFORMATION SERVICE, SPACE INFORMATION SERVICE PROVIDING METHOD, AND CHARGE PROCESSING APPARATUS AND CHARGING METHOD FOR SPACE INFORMATION SERVICE

(75) Inventors: Yoshinobu Meifu, Kawasaki (JP); Keiji Mizuma, Kawasaki (JP); Hideyuki Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 09/941,420

(22) Filed: Aug. 28, 2001

(65) Prior Publication Data

US 2002/0103911 A1　Aug. 1, 2002

(30) Foreign Application Priority Data

Jan. 31, 2001　(JP) .............................. 2001-024870

(51) Int. Cl.⁷ ............................................. G06F 15/16
(52) U.S. Cl. ........................ 709/217; 709/218; 709/219
(58) Field of Search ................................ 709/217, 218, 709/219; 707/10

(56) References Cited

U.S. PATENT DOCUMENTS

| | | | |
|---|---|---|---|
| 5,815,411 A | | 9/1998 | Ellenby et al. |
| 5,926,116 A | * | 7/1999 | Kitano et al. ............... 340/988 |
| 6,023,278 A | | 2/2000 | Margolin |
| 6,138,072 A | * | 10/2000 | Nagai ......................... 701/207 |
| 6,173,239 B1 | * | 1/2001 | Ellenby ...................... 702/150 |
| 6,507,802 B1 | * | 1/2003 | Payton et al. ............... 702/150 |
| 6,522,292 B1 | * | 2/2003 | Ellenby et al. ........ 342/357.07 |
| 6,529,143 B2 | * | 3/2003 | Mikkola et al. ......... 340/995.1 |
| 6,789,102 B2 | * | 9/2004 | Gotou et al. ................ 709/203 |

FOREIGN PATENT DOCUMENTS

WO　　　99/42946　　　8/1999

OTHER PUBLICATIONS

H. Tarumi, et al. "Space Tag: an Overland Virtual System and its Applications" IEEE International Conference on Multimedia Computing & Systems (ICMCS'99), vol. 1, Italy, pp. 207-212, Jun. 1999.
H. Tarumi, et al. "Communications Through Virtual Active Objects Overlaid onto the Real World" Third International Conference on Collaborative Virtual Environments (CVE 2000), ACM, USA, pp. 155-164, Sep. 2000.

* cited by examiner

*Primary Examiner*—Marc D. Thompson
*Assistant Examiner*—Joseph Maniwang
(74) *Attorney, Agent, or Firm*—Katten Muchin Rosenman LLP

(57)　　　ABSTRACT

A server apparatus comprises an information bubble managing unit for managing bubble data (information bubble) in which space range information including position information in a real physical space is correlated with desired supply information, an extracting unit for extracting supply information of bubble data including retrieval object space range information based on position information on a user terminal, a providing unit for providing the extracted supply information to the user terminal, and an information bubble movement control unit for updating at least position information of the bubble data to virtually move the information bubble in the real physical space. In providing an information service, it is possible to retrieve and refer information in an analog-like operation closer to human sensation in the user terminal by using an information bubble virtually registered in the real physical space, and provide information to many and unspecified users with a less number of information bubbles.

38 Claims, 56 Drawing Sheets

FIG. 8

| BUBBLE NUMBER | SPACE OCCUPATION INFORMATION | URL |
|---|---|---|
| 1 | A/X/0/3 | http://www.xxx.100 |
| 2 | A/X/3/1 | http://www.xxx.101 |
| 3 | A/X/2/1 | http://www.xxx.102 |
| 4 | A/X/1/1 | http://www.xxx.103 |
| 5 | B/X/0/2 | http://www.xxx.200 |
| 6 | B/X/2/1 | http://www.xxx.201 |
| 7 | B/X/1/1 | http://www.xxx.202 |
| 8 | C/X/0/3 | http://www.xxx.300 |
| 9 | D/X/0/4 | http://www.xxx.400 |
| 10 | A-1/X/1/0.5 | http://www.xxx.110 |
| 11 | 1/X/1/0.5 | http://www.xxx.111 |
| 12 | A+1/X/1/0.5 | http://www.xxx.112 |
| 13 | A-1/X/2/0.5 | http://www.xxx.120 |
| 14 | A/X/2/0.5 | http://www.xxx.121 |
| 15 | A/X/3/0.5 | http://www.xxx.130 |
| 16 | D/X/4/0.5 | http://www.xxx.410 |
| 17 | D/X/4/0.5 | http://www.xxx.411 |

FIG. 9

| BUBBLE NUMBER | SPACE OCCUPATION INFORMATION (LATITUDE/LONGITUDE/ ALTITUDE/BUBBLE RADIUS) | OBJECT URL | CONTENTS NAME |
|---|---|---|---|
| 1 | 149° 22' 20" / 62° 11' 11" /30/5 | http://www.nifty.ne.jp/ gps/user/mori/index.html | BUILDING A |
| 2 | 149° 21' 15" / 62° 09' 04" /15/20 | http://www.nifty.ne.jp/ gps/user/yashi/index.html | BUILDING B (RESTAURANT) |
| 3 | 149° 19' 12" / 62° 14' 07" /50/200 | http://www.nifty.ne.jp/ gps/com/fujitsu/index.html | STADIUM C |
| 4 | | | |

BUILDING A  BUILDING B  BUILDING C  BUILDING D

FIG. 24

| USER IDENTIFIER | CONTENTS IDENTIFIER (MESSAGE) | CONDITION SETTING 1(FLOATING PERIOD) | CONDITION SETTING 2 (UPPER LIMIT OF THE NUMBER OF POST-ENTERING PERSONS) | THE NUMBER OF PERSONS HAVING POST-ENTERED (RECORD) |
|---|---|---|---|---|
| USER 1 | CONTENTS 1 | 2002/1/1 | — | — |
| USER 2 | CONTENTS 2 | — | 3 | 1 |
| : | : | : | : | : |

| BALLOON NUMBER | BALLOON POSITION (LATITUDE/LONGITUDE/ ALTITUDE/BUBBLE RADIUS) | CONTENTS URL | TITLE/ SUMMARY | TYPE OF INFORMATION | USER IDENTIFIER |
|---|---|---|---|---|---|
| 1 | 149/22/3/3 | http://www.xx.ne.jp/service1/xx.html | THIS YEAR ... | BALLOON MAIL | USER 1 |
| 2 | 150/25/50/100 | http://www.xx.ne.jp/service1/xxx.html | RECOMMEND THIS SONG FOR HEALING | BALLOON MAIL | USER 2 |
| 3 | 139/35/18/100 | http://www.xx.com/profile.html | PROFILE OF F COMPANY | COMPANY | USER 3 |
| .. | | | .. | .. | .. |

PRESENT BALLOON POSITION: N35° 22′ 20″

CHANGE (RANDOM VALUE): −20″

NEW BALLOON POSITION: N35° 22′ 00″

※VALUE OF EACH OF LATITUDE, LONGITUDE AND ALTITUDE CAN BE CHANGED BY A RANDOM VALUE

| REGISTERED MESSAGE IDENTIFIER | CONTENTS OF REGISTERED MESSAGE |
|---|---|
| MESSAGE 1 | HAPPY BIRTHDAY TO XX |
| MESSAGE 2 | ON SALE FOR 30 MINUTES FROM NOW. DROP INTO XX SHOE SHOP |

| USER NAME | REGISTERED MESSAGE IDENTIFIER | DISPLAY SCHEDULE (DATE, TIME, THE NUMBER OF TIMES) |
|---|---|---|
| A | MESSAGE 1 | 2001/1/15 /18:00/1 |
| B | MESSAGE 2 | 2001/1/12/15:00/2 |

FIG. 38

| REGISTERED USER IDENTIFIER | CONTENTS IDENTIFIER | COLLECTION TYPE | MAXIMUM VALUE OF COLLECTION | COLLECTION REST PERIOD |
|---|---|---|---|---|
| USER 1 | CONTENTS 1 | POINT COLLECTION | — | 1 YEAR |
| USER 2 | CONTENTS 2 | CONTENTS COLLECTION | 6 | — |

| USER IDENTIFIER | CONTENTS IDENTIFIER | COLLECTION TYPE | MAXIMUM VALUE OF COLLECTION | ACCUMULATION RESULT (RECORD) |
|---|---|---|---|---|
| USER 1 | CONTENTS 1 | POINT COLLECTION | — | 25 POINTS |
| USER 2 | CONTENTS 2 | CONTENTS COLLECTION | 6 | 1,3,4,5,6 |

226

(THE SECOND CONTENTS ARE NOT YET COLLECTED)

FIG. 47

481: CHARGE POLICY DATA (CONTENTS USE CHARGE)
BALLOON NUMBER

| BALLOON NUMBER | CHARGE CONDITION | OBJECT CHARGE | CHARGE | CHARGED ACCOUNT |
|---|---|---|---|---|
| 1 | ②-C-2 | ④-C | 30 YEN/EACH | ⑤-A |
| 2 | ③-D OR ③-E | ④-C | 100 YEN/MONTH | ⑤-D |
| 3 | — | ④-C | FREE | — |

FIG. 48

482: CHARGE POLICY DATA (CONTENTS REGISTRATION CHARGE)

| BALLOON NUMBER | CHARGE CONDITION | OBJECT CHARGE | CHARGE | CHARGED ACCOUNT |
|---|---|---|---|---|
| 1 | ②-A AND ②-F | ④-B | 10,000 YEN/DAY | ⑤-B |
| 2 | ②-D AND ③-D | ④-B | 30 YEN/EACH | ⑤-B |
| 3 | ②-A AND ②-F (3M & 1 WEEK) | ④-B | FREE | — |

FIG. 49

483: CHARGE POLICY DATA (PACKET CHARGE)

| BALLOON NUMBER | CHARGE CONDITION | OBJECT CHARGE | CHARGE | CHARGED ACCONT |
|---|---|---|---|---|
| 1 | ②-E(18:00-21:00) | ④-A | MEASURED RATE | ⑤-F |
| 2 | ③-D OR ③-E | ④-A | MEASURED RATE | ⑤-C |
| 3 | — | ④-A | MEASURED RATE | ⑤-A |

FIG. 50

15-2: BALLOON POSITION-CONTENTS URL-CHARGE POLICY DATA

| | 15-1 | | | | | | CHARGE POLICY DATA 480 | | |
|---|---|---|---|---|---|---|---|---|---|
| | 15A | 15B | | | | | CONTENTS USE CHARGE | CONTENTS REGISTRATION CHARGE | PACKET COMMUNICATION CHARGE |
| BALLOON NUMBER | BALLOON POSITION (LATITUDE/LONGITUDE/ ALTITUDE/BALLOON RADIUS) | CONTENTS URL | TITLE/ SUMMARY | REGISTRANT IDENTIFIER | INFORMATION CATEGORY | | | | |
| 1 | 149/22/3/3 | http://aa | THE SOCCER FINALS | EVENT COMPANY A | EVENT INFORMATION | | REFER TO FIG. 47 | REFER TO FIG. 48 | REFER TO FIG. 49 |
| 2 | 150/25/50/100 | http://bb | IZU TRAVEL GUIDE | TRAVEL ASSOCIATION B | TRAVEL GUIDE | | " | " | " |
| 3 | 150/25/2/20 | http://cc | SHIBUYA BULLETIN BOARD | SERVICE CENTER C | BULLETIN BOARD | | " | " | " |
| ... | ... | ... | ... | ... | ... | | ... ←481 | ... ←482 | ... ←483 |

FIG. 55(a)
①TERMINAL-SUBSCRIBER ATTRIBUTE LIST

A. TERMINAL TYPE
B. TERMINAL PERFORMANCE
C. TERMINAL REGISTRATION AREA
D. TELEPHONE NUMBER
E. USER ID
F. SERVICE SUBSCRIPTION TIME
G. AGE
H. SEX
I. OCCUPATION, ETC.
J. TERMINAL USE AREA
K. DATA COMMUNICATION USE AMOUNT
L. MOVEMENT MODE

FIG. 55(b)
②CONTENTS ATTRIBUTE LIST

A. BALLOON RADIUS
B. INFORMATION CATEGORY (TYPE)
C. INSIDE/OUTSIDE OF BALLOON REGISTERED AREA (1. INSIDE, 2. OUTSIDE)
D. BALLOON ACCESS NUMBER
E. BALLOON USE TIME ZONE
F. BALLOON REGISTRATION PERIOD 1. 6:00–17:00
2. 17:00–22:00
3. 23:00– 6:00 "SELECT"

1. CHILD
2. STUDENT
3. THE AGED "SELECT"
452
451

FIG. 55(c)
③CONTENTS PROVIDER ATTRIBUTE

A. BUSINESS INFORMATION SITE
B. SHOP ADVERTISEMENT SITE
C. COMPANY ADVERTISEMENT SITE
D. PUBLIC FACILITY GUIDE SITE
E. TRAVEL GUIDE SITE

453

FIG. 55(d)
④OBJECT CHARGE LIST

A. PACKET CHARGE
B. CONTENTS REGISTRATION CHARGE
C. CONTENTS USE CHARGE
D. OTHERS

CHARGE SETTING
1. DOLLAR
2. YEN
CURRENCY "SELECT"
200 FREQUENCY OF COLLECTION

1. YEN/YEAR
2. YEN/MONTH
3. YEN/DAY
4. YEN/EACH "SELECT"

461  461a

FIG. 55(e)
⑤CHARGED ACCOUNT (CUSTOMER) LIST

A. GENERAL USER
B. CONTENTS REGISTRANT
C. CONTENTS PROVIDER
D. ADVERTISEMENT COMPANY
E. COMMUNICATION CARRIER
F. OTHER COMPANY

COMPANY NAME
F COMPANY
"SELECT"

462

②CONTENTS ATTRIBUTE LIST

452

③CONTENTS PROVIDER ATTRIBUTE

453

④OBJECT CHARGE LIST 461  461a

⑤CHARGED ACCOUNT (CUSTOMER) LIST

462

FIG. 58(a) FIG. 58(b) FIG. 58(c)
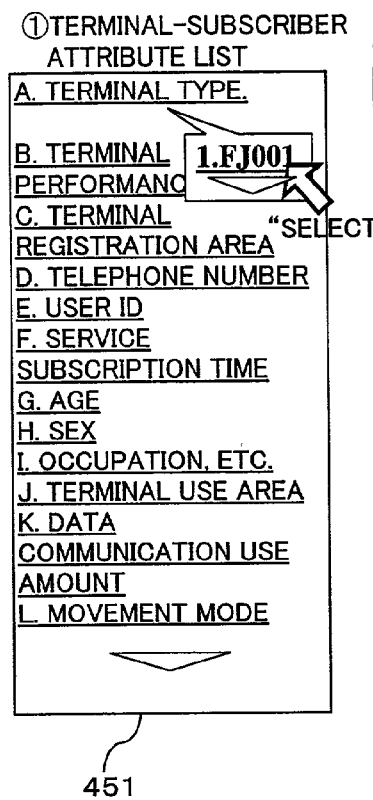
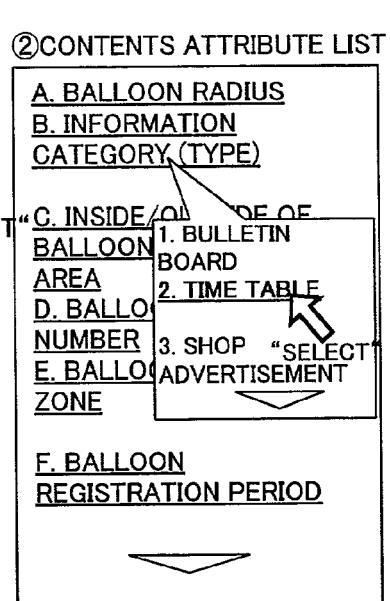
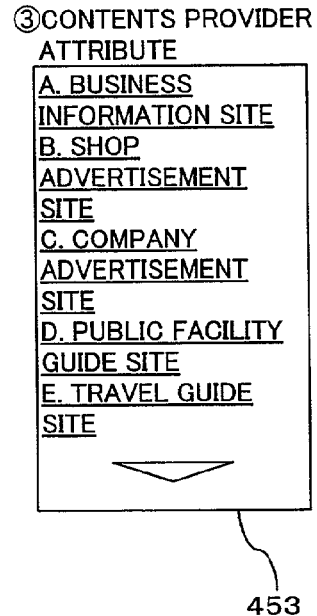
FIG. 58(d) FIG. 58(e)
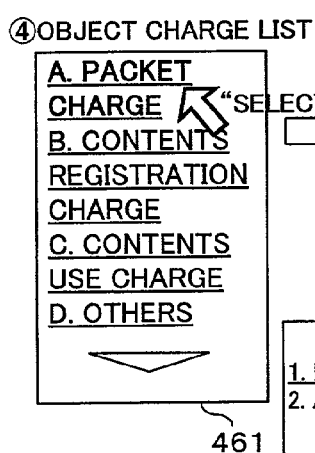
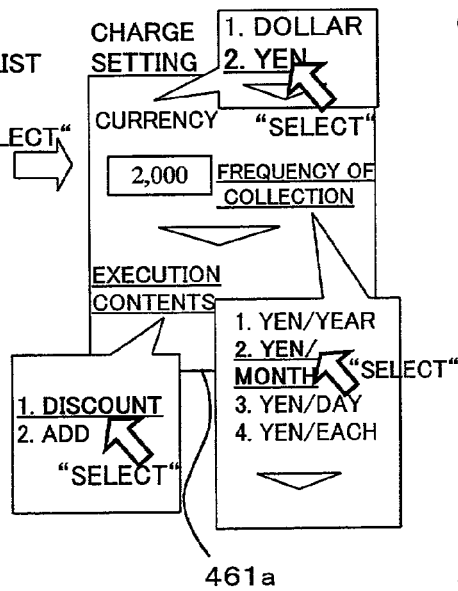
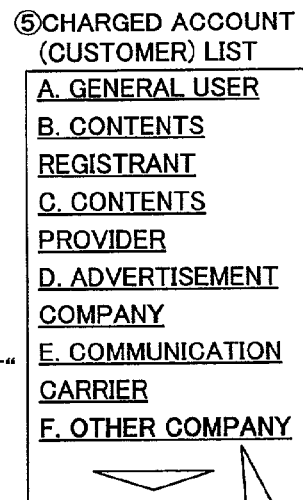

FIG. 60

15-2: BALLOON POSITION-CONTENTS URL-CHARGE POLICY DATA

| | 15-1 | | | | | | CHARGE POLICY DATA 480 | | | |
| --- | --- | --- | --- | --- | --- | --- | --- | --- | --- | --- |
| | 15A | 15B | | | | | | | | |
| BALLOON NUMBER | BALLOON POSITION (LATITUDE/LONGITUDE/ ALTITUDE/BALLOON RADIUS) | CONTENTS URL | TITLE/ SUMMARY | REGISTRANT IDENTIFIER | INFORMATION CATEGORY | | CONTENTS USE CHARGE | CONTENTS REGISTRATION CHARGE | PACKET COMMUNICATION CHARGE | PERMISSION FLAG |
| 1 | 149/22/3/3 | http://aa | THE SOCCER FINALS | EVENT COMPANY A | EVENT INFORMATION | | REFER TO FIG. 47 | REFER TO FIG. 48 | REFER TO FIG. 49 | YES |
| 2 | 150/25/50/100 | http://bb | IZU TRAVEL INFORMATION | TRAVEL ASSOCIATION B | TRAVEL GUIDE | | ″ | ″ | ″ | YES |
| 3 | 150/25/2/20 | http://cc | SHIBUYA BULLETIN BOARD | SERVICE CENTER C | BULLETIN BOARD | | ″ | ″ | ″ | NO |
| ⋮ | ⋮ | ⋮ | ⋮ | ⋮ | ⋮ | | ⋮ | ⋮ | ⋮ | ⋮ |

481 — CONTENTS USE CHARGE
482 — CONTENTS REGISTRATION CHARGE
483 — PACKET COMMUNICATION CHARGE
484 — PERMISSION FLAG

SERVER APPARATUS FOR SPACE INFORMATION SERVICE, SPACE INFORMATION SERVICE PROVIDING METHOD, AND CHARGE PROCESSING APPARATUS AND CHARGING METHOD FOR SPACE INFORMATION SERVICE

BACKGROUND OF THE INVENTION (1) Field of the Invention

The present invention relates to a server apparatus for a space information service, a space information service providing method, and a charge processing apparatus and a charging method for a space information service suitable for use in a position information service using, for example, a portable terminal.

(2) Description of Related Art

When retrieving, referring or storing electronic data, the user (company, individual) uses a processing apparatus such as a keyboard, a mouse or the like. Namely, in order to direct "his/her intention" (retrieving/referring/storing) to a terminal, the user converts his/her intention into digital data using exclusive hardware (processing apparatus) and inputs it into the terminal, thereby retrieving, referring or storing the data.

However, the user needs to temporarily converts "his/her intention" into a data in another form when retrieving, referring or storing the data. In this method, the user needs to digitally process the data. For this, when the user designates a thing that the user desires to retrieve and refers or stores a result of the retrieval, the user cannot carry out the process in an analog manner close to human sensation as if putting things that come into his/her view on a shelf, for example.

For instance, the user cannot retrieve and refer information in an analog-like feeling. Concretely, it is impossible for the user to designate an object of retrieval using a terminal such as a portable telephone or the like in such a feeling that the user asks various objects such as a building, a construction and the like in a way of "what is that?" or "what is this?," and to display (refer/store) the answers (results of retrieval) on the terminal. This does not fit to human sensation, so that the user feels difficulty in use.

For this, the user needs to digitally process data when retrieving or storing the data, although it is more convenient for the user to operate in an analog way. Additionally, the digital processing requires the user special knowledge and experience in order that the user can effectively use such the digital process.

Recent tremendous spread of the Internet allows various information services to be developed by companies and individuals on the Internet (WWW:World Wide Web). For example, various advertising services and questionnaires are developed on the Internet. However, such the advertising service or questionnaire is not referred by a user unless the user (terminal) accesses (retrieves, refers) to a specific fixed site (contents) using the above digital process.

In order that many and unspecified users can use the service, the service provider needs to notify the same advertising or questionnaire in a number of sites, which is at a disadvantage in cost. This is the same not only on the Internet but also in the real space. Namely, the service provider needs to dispose advertising posts in many places or prepare a number of spots on the streets to conduct the questionnaire.

Owing to recent spread of the Internet, mobile terminals (data communication terminals) such as portable telephones accessible to the Internet are also tremendously spread. With this, a communication charge or a service use charge to a user tends to increase. In future, development of communication services in various mode is easily forecasted, which leads to an increase in economical burden on the users caused by an increase in communication charge or service user charge.

SUMMARY OF THE INVENTION

In the light of the above problems, an object of the present invention is to enable a user of a user terminal to readily retrieve and refer information in an analog-like manner closer to human sensations, and to provide the information to many and unspecified users with a less number of information bubbles, by virtually registering information or service information relating to an object existing in the user's view, for example, as an information bubble, in providing an information service using a terminal such as a portable telephone or the like.

An another object of the present invention is to be able to flexibly set a desired service charge in a desired service mode to a desired charged account, and to decrease an economical burden on the user by lessening an increase in communication charge or service use charge to the user terminal caused by that retrieval and reference to information become easily as above.

To attain the above object, the present invention provides a server apparatus for a space information service comprising:

(1) an information bubble managing unit for managing bubble data in which space range information including position information in a real physical space is correlated with supply information in order to virtually register an information bubble related with the desired supply information in the real physical space;

(2) an extracting unit for extracting supply information of bubble data including retrieval object space range information based on position information on a user terminal from the information bubble managing unit;

(3) a providing unit for providing the supply information extracted by the extracting unit to the user terminal; and (4) an information bubble movement control unit for updating at least position information of the bubble data to virtually move the information bubble in the real physical space.

The server apparatus according to this invention can provide desired supply information related to an information bubble including retrieval object space range information based on position information on a user terminal to the user terminal. Namely, information related to an information bubble included in a space range that is an object of retrieval by the user terminal or having an overlapping portion (space range) in a real physical space is provided as a result of space retrieval to the user terminal. On this assumption, the above information bubble floats (moves) in the real physical space. In consequence, it is possible to realize an equivalent information service with a less number of information bubbles than when a plurality of information bubbles having (related to) the same information are fixedly registered in a plurality of places.

The information bubble movement control unit may comprise an information bubble behavior setting unit for setting behavior data defining behavior of the information bubble in the real physical space, and an information bubble moving unit for updating position information of the bubble data on the bases of the behavior data set by the information bubble behavior setting unit to move the information bubble according to the behavior data. It is thereby possible to freely set behavior of the information bubble in the real physical space.

The information bubble behavior setting unit may comprise a random number generating unit for generating a random number with respect to position information of the bubble data as behavior data, and the information bubble moving unit may comprise a first information bubble position updating unit for randomly updating position information of the bubble data with the random number generated by the random number generating unit to randomly move the information bubble in the real physical space. It is thereby possible to increase an opportunity of providing the information bubble to a larger number of unspecified users.

The information bubble behavior setting unit may comprise a condition setting unit for setting condition data with respect to a time to move the information bubble to a specific position in the real physical space as the behavior data, and the information bubble moving unit may comprise a second information bubble position updating unit for updating position information of the bubble data to position information on the specific position at a time defined by the condition data. It is thereby possible to move the information bubble to a desired position in the real physical space after a predetermined period is elapsed, thus possible to use the information bubble as a mail addressed to a desired position.

Data with respect to an available period to move the information bubble may be set as the condition data. It is thereby possible to freely set an opportunity to move the information bubble to a specific position.

The information bubble managing unit may comprise a supply information updating unit for updating the supply information according to update information about the supply information from a user terminal having received the supply information. A number of unspecified user terminals can thereby update information related to the information bubble.

In such case, data with respect to the number of times of update of the supply information by the supply information updating unit may be set as the condition data. When the number of users having updated the supply information reaches a predetermined number, the above information bubble can be moved to a specific position (initial registered position). In consequence, it is possible to effectively use the information bubble in a questionnaire or the like.

A charge processing apparatus for a space information service according to this invention is a charge processing apparatus for the above space information service, which comprises:

(1) an attribute information storing unit for storing plural kinds of attribute information being able to define service modes of the space information service;

(2) a charge type information storing unit for storing information on types of service charges which can be objects of charge in the service modes;

(3) a charged account information storing unit for storing information on a plurality of charged accounts;

(4) a charge policy setting unit for arbitrarily combining various kinds of information in the storing unit to set an arbitrary service mode and a charged account for a service charge of each type of charge; and (5) a charge processing unit for executing a charging process to charge the service charge to the charged account according to a setting by the charge policy setting unit.

The charge processing apparatus according to this invention can set a charged account for an arbitrary service mode and a service charge of each type of charge (charge policy setting step), and execute a charging process to charge the service charge to the charged account (charge processing step) It is thereby possible to flexibly execute a setting to charge a desired service charge in a desired service mode to a desired charged account.

According to this invention (the server apparatus for a space information service and a method for providing a space information service), a user of a user terminal can readily retrieve and refer information in an analog-like manner closer to human sensations by virtually registering information or service information relating to an object existing in the user's view, for example, as an information bubble in providing an information service using a terminal such as a portable telephone or the like. By floating (moving) the above information bubble in the real physical space, it becomes possible to realize an equivalent information service with a less number of information bubbles than when a plurality of information bubbles having (related to) the same information are fixedly registered in a plurality of places. In consequence, it is possible to inexpensively realize an information service at a less information registration charge.

Since the above information bubble can be moved according to behavior data defining behavior in the real physical space, it is possible to freely set the behavior of the information bubble in the real physical space. Accordingly, the information service in various modes can be flexibly realized.

Since the above information bubble can be randomly moved in the real physical space with a random number, it is possible to increase an opportunity of providing the information bubble to a larger number of unspecified user terminals. Accordingly, it is possible to inexpensively realize, for example, an advertising information service or the like at a less registration charge.

Since the above information bubble can be moved to a specific position in the real physical space or put back to the original (initial registered) position after a predetermined period is elapsed, it is thereby possible to flexibly realize the information service in various modes, as well.

An opportunity of moving the information bubble to a specific position or an initial registered position can be freely set by setting data relating to a movement available period. It is thereby possible to realize various types of information service flexibly.

Since information related to the above information bubble can be suitably updated by many and unspecified user terminals having retrieved and referred the information, it is possible to use the information bubble in, for example, a questionnaire. In such case, many pieces of information that can be used in marketing with respect to goods or service can be readily obtained.

In this case, it is possible to set the information bubble by setting data relating to the number of times that the information bubble is updated such that when information bubble is updated by a predetermined number of users, for example, the information bubble is moved to a specific position (initial registered position). Such a control becomes possible that the information bubble is put back to the original position when information for a necessary number of users is collected, which enables an effective questionnaire research or the like.

The present position of the information bubble may be converted into a geographical representation in the real physical space, and provided to a user terminal having registered the information bubble. The user having registered the information bubble can readily and intuitively recognize the present position of the information bubble.

The above space range information may be defined by latitude, longitude, altitude and a bubble radius in the real physical space, whereby the above space information service is readily realized.

According to this invention (the charge processing apparatus and a method for charging in a space information service), it is possible to set a charged account for an arbitrary service mode and a service charge of an arbitrary charge type, and execute a charging process to charge the service charge to the charge account according to the setting. A setting to charge a desired service charge in a desired service mode to a desired charged account becomes possible. For example, it is possible to set a charged account other than a user terminal for a use charge or a communication charge occurring when the user terminal uses the space information service. This allows a reduction in economical burden on the user caused by a use of the space information service.

It is possible to finely set a charge setting according to each of various service modes using any one of or an arbitrary combination of attribute information relating to a user terminal or a user of the user terminal, attribute information relating to the supply information, and attribute information relating to a registrant of the supply information. Thus, flexibility of the charge setting is further improved.

BRIEF DESCRIPTION OF THE DRAWINGS

FIG. 8 is a diagram showing an example of registered contents in the service center (database) of the information bubbles shown in FIG. 7;

FIG. 9 is a diagram showing another example of registered contents in the service center (database) of the information bubbles shown in FIG. 7;

FIG. 24 is a diagram showing an example of condition (behavior) data in the service center shown in FIG. 17;

FIG. 25 is a diagram showing an example of a database (balloon position-contents URL correlation data) in the service center shown in FIG. 17;

FIG. 32 is a diagram showing an example of registered message data managed in the service center in the display service shown in FIG. 29;

FIG. 33 is a diagram showing an example of schedule data managed in the service center in the display service shown in FIG. 29;

FIG. 38 is a diagram showing an example of registered condition data on the service center's side used in the collection service using the space information service system according to the embodiment;

FIG. 40 is a diagram showing an example of collection data on the service center's side used in the collection service using the space information service according to the embodiment;

FIG. 47 is a diagram showing an example of charge policy data (contents use charge) according to the embodiment;

FIG. 48 is a diagram showing an example of charge policy data (contents registration charge) according to the embodiment;

FIG. 49 is a diagram showing an example of charge policy data (packet communication charge) according to the embodiment;

FIG. 50 is a diagram showing an example of balloon position-contents URL-charge policy data according to the embodiment;

FIGS. 55(a) through 55(e) are diagrams showing an example of display of a charge setting menu (contents use charge setting menu) in order to illustrate a procedure for selecting information for setting charge policy data according to the embodiment;

FIGS. 58(a) through 58(e) are diagrams showing an example of a display of a charge setting menu (packet communication charge setting menu) in order to illustrate a procedure for selecting information for setting charge policy data according to the embodiment;

FIG. 60 is a diagram showing a modified example of the balloon position-contents URL-charge policy data shown in FIG. 50.

DESCRIPTION OF THE PREFERRED EMBODIMENTS

Hereinafter, description will be made of embodiments of this invention with reference to the accompanying drawings.

(A) Description of Basic System Structure

Figure 1:
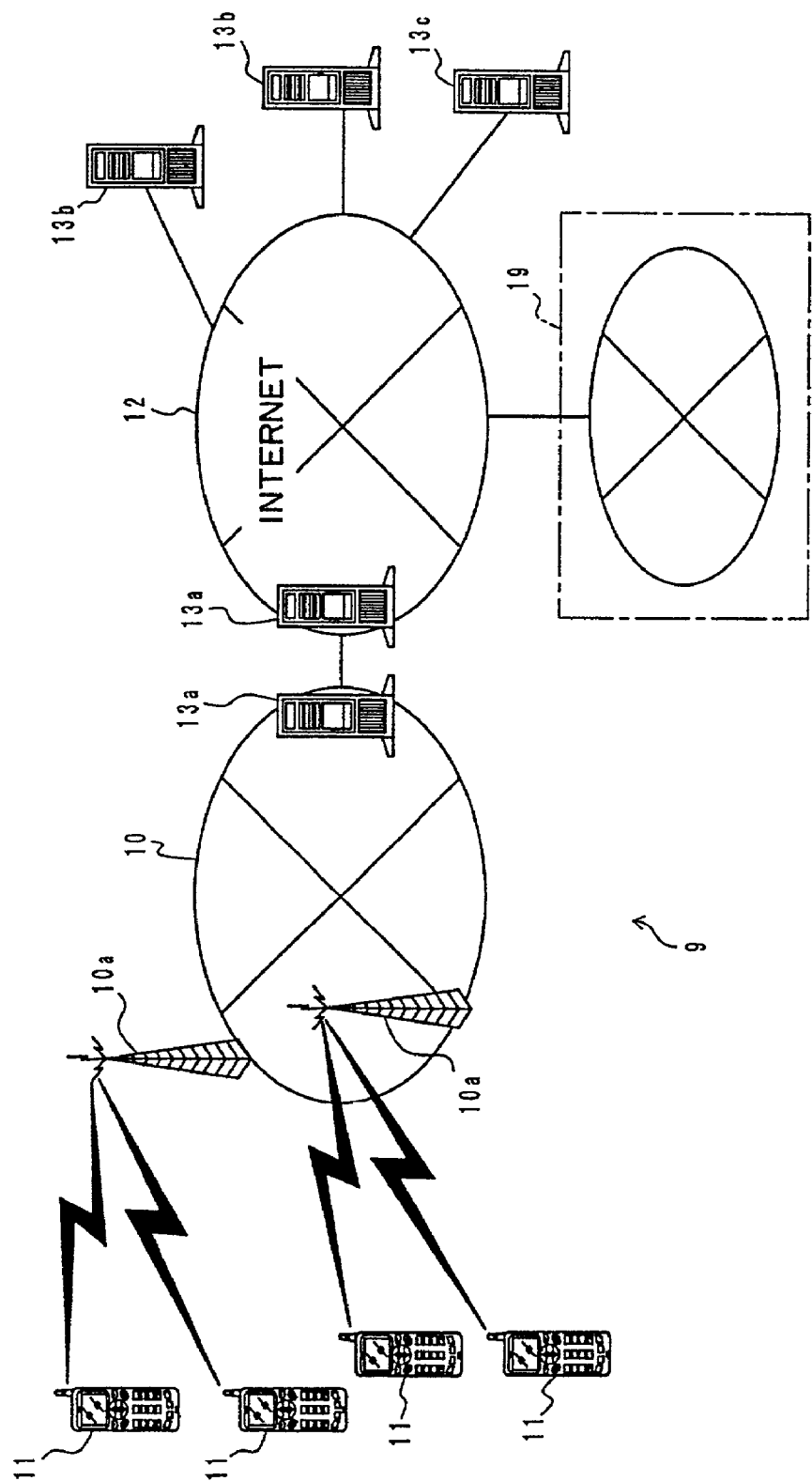
FIG. 1 is a block diagram showing an embodiment of an information providing service system to which the present invention is applied.

FIG. 1 is a block diagram showing an embodiment of an information providing service system to which this invention is applied. The information providing service system (space information service system; hereinafter abbreviated as a system, occasionally) shown in FIG. 1 provides information to a user terminal (portable terminal) such as a portable telephone, a PDA (Personal Digital Assistance) or the like. The information service system comprises a service center 19 and not less than one portable terminal 11, along with a radio base station (radio tower) 10a, a radio network 10, a gateway server 13a, the Internet 12, a Web server 13b, a DNS (Domain Name System) server 13c, etc.

The system 9 according to this embodiment can provide two kinds of services (1) and (2) below, along with a general telephone service and the like, to the portable terminal 11.

(1) Service (hereinafter referred to as service "1", occasionally) that displays, on the portable terminal 11, information relating to a building or the like existing within a predetermined-distance range (or a predetermined-distance range around the present position of the portable terminal 11) in a direction that the portable terminal 11 (or antenna thereof) is aimed.

(2) Service that displays, on the portable terminal 11, information relating to a specific building to which the portable terminal 11 is aimed (or the antenna thereof is aimed) (hereinafter, referred to as service "2" occasionally).

According to the former service "1", the user aims the portable terminal 11 toward a desired direction to obtain information relating to a building or the like existing within a 100 m (meter) range from the position of the terminal, for example.

According to the latter service "2", the user aims the portable terminal 11 toward, for example, a building in front of him/her to obtain information on the building (that first comes into his/her view), or information on goods sold in a shop in the building.

In FIG. 1, the above radio network 10 is a mobile communication system operated and managed by a communication carrier. The service center 19 includes a server which holds bubble data in which space occupation information (space range information or space area information) composed of latitude, longitude, altitude and a bubble radius to be described later of an object (for example, a building, each floor of the building, a signboard or the like actually existing) or a desired space in the three-dimensional space (real physical space) is correlated with various information on the object or a URL (Uniform Resource Locator) relating to the various information.

Incidentally, the server can contain bubble data in which space occupation information on a desired space is correlated with various information desired to be correlated with the desired space or a URL relating to the various information. Here, "bubble" signifies a specific space in the three-dimensional space defined by the above space occupation information, which is like a bubble floating in the three-dimensional space, by which a real building is reproduced in a data space. Man generally reminds of a sphere from "bubble", but a geometric of "bubble" is not specifically limited to a sphere, here (concrete examples thereof will be described later).

The above portable terminal 11 can be connected (access) to the service center 19 over the Internet 12 to display various information retrieved using the above bubble data. Incidentally, the portable terminal 11 is a subscriber's terminal of the radio network 10, which can freely access to the service center 19.

The radio base station 10a is connected to the portable terminal 11 and the radio network 10 to transmit/receive a radio signal. The gateway server 13a allows only a signal outputted from a server having a desired URL to pass therethrough. The Internet 12 is configured by connecting a number of servers using Hyper Text Transfer Protocol (http) as a communication protocol.

Figure 10:
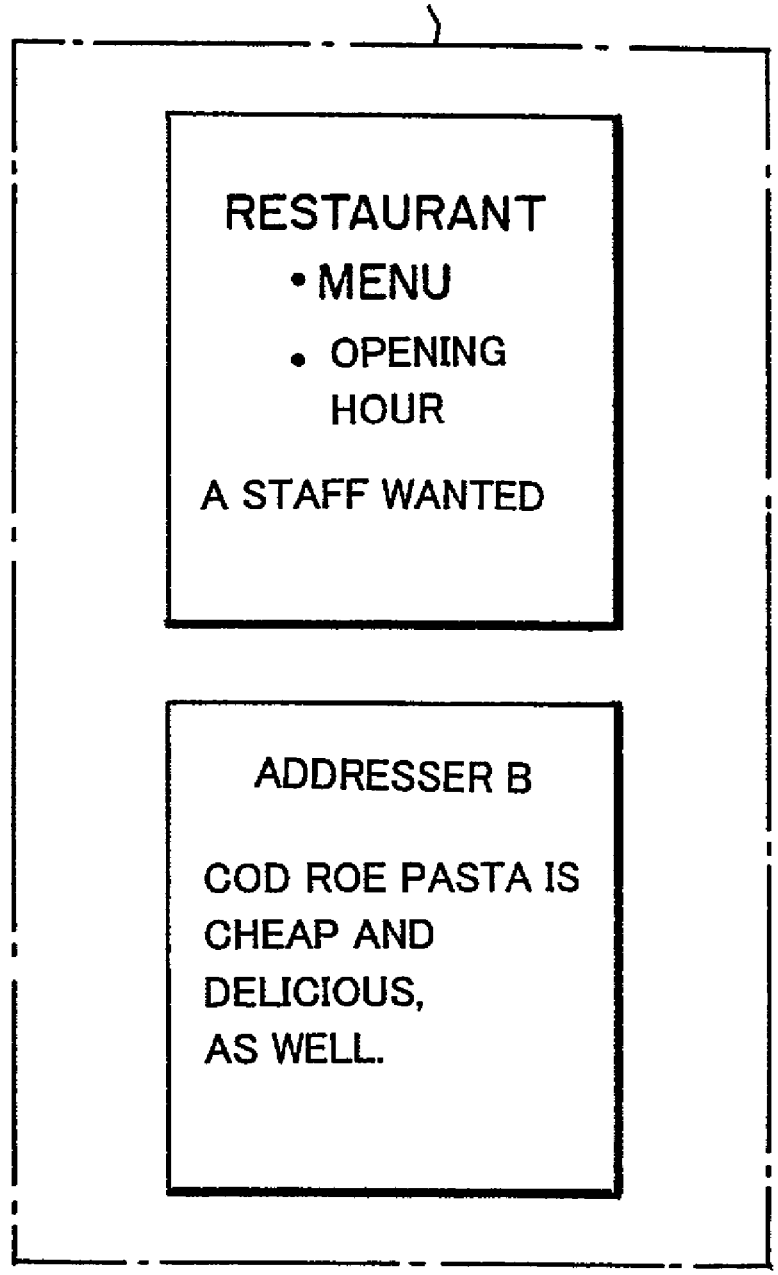
FIG. 10 is a diagram showing an example of contents (supply information) according to the embodiment.

The Web server 13b holds Web data (contents) of an individual or a company. An example of the contents is as shown in FIG. 10. The DNS (Domain Name Server) server 13c outputs an IP (Internet protocol) address corresponding to a host name.

(A1) Description of Detailed Structure of Service Center 19

Figure 2:
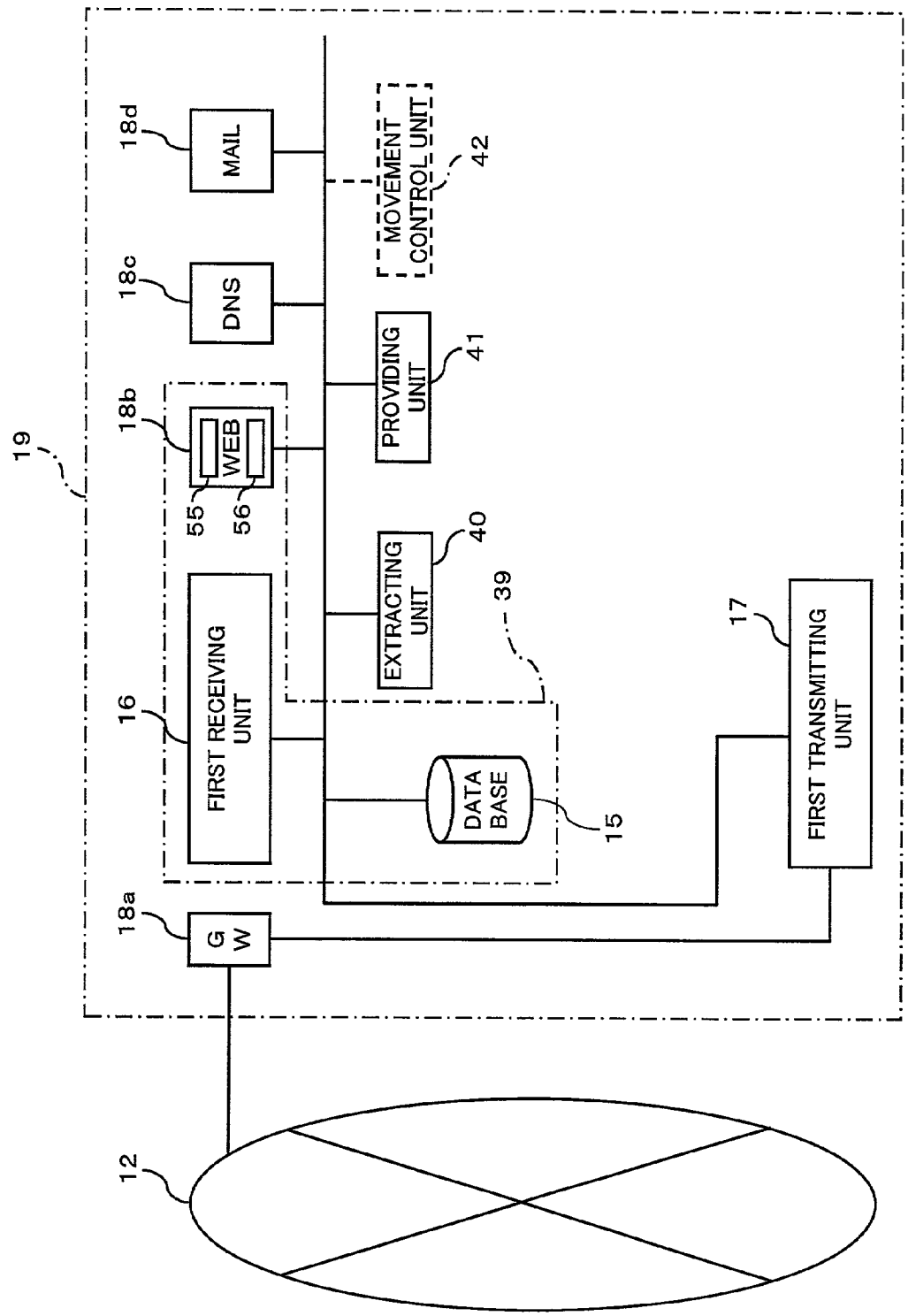
FIG. 2 is a block diagram showing an example of a structure of a service center shown in FIG. 1.

Next, description will be made of a structure of the service center 19 for realizing the above services "1" and "2". FIG. 2 is a block diagram showing an example of the structure of the service center 19. In the structure shown in FIG. 2, the service center 19 is configured with one server (server apparatus) having parts below.

The service center 19 in this case has, as a server, a database 15, a first receiving unit 16, a first transmitting unit 17, an extracting unit 40, a providing unit 41, a Web information outputting unit 18b, a gateway unit (GW: Gate Way) 18a, a DNS unit 18c and a mail transmitting/receiving unit 18d. In FIG. 2, reference character 39 represents an information bubble managing unit, and reference character 42 represents an information bubble movement control unit. Details of these will be described later in the next section (B); "Description of Structures and Operations of Essential Parts of This Embodiment."

The above database (space occupation information/URL database) 15 holds bubble data in which space occupation information composed of latitude, longitude, altitude and a bubble radius of an object in the three-dimensional space is correlated with or a URL for obtaining various information relating to the object or service information relating to the various information as shown in, for example, FIG. 8.

The above "various information relating to an object" represents facility information relating to a building or the like, which includes information on a building, Tokyo tower or the like, information on a shop in the building, Tokyo tower or the like, information on a station of a public transportation system, and the like. On the other hand, "service information relating to the various information" is service information of the facility information, which includes information on a product of a company in its own building, information on an opening hour of Tokyo Tower, or a menu of a restaurant in the building, information on a time table of the station, and the like. Each pieces of the information includes not only character data but also image data, voice data and the like.

In the following description, "various information relating to an object" and "service information relating to various information" will be used in the same sense unless specifically mentioned. Since each of these pieces of information is information to be provided to the user, these pieces of information will be simply referred to as "supply information", occasionally.

On the other hand, the above "space occupation information" is information on a space region occupied by an object such as a building beforehand registered by an owner of the building, a company or a restaurant in the three-dimensional space. In FIG. 8, latitude/longitude/altitude/bubble radius is expressed in a form of A/X/0/3 or the like.

In this case, each "URL" is information (address) for specifying "supply information" corresponding to "space occupation information", thus it becomes possible to readily retrieve contents in which information desired to be provided to the user is written. In other words, a Web site (URL) displaying "supply information" relating to an object is correlated with the object (space occupation information), and held in the database 15.

The database 15 also has three-dimensional geographic data in order to process space occupation information. The database 15 is not always required to be provided in the service center 15, but may be provided in a server in another place connected to the Internet 12. Further, this database function is accomplished by, for example, a hard disk, a ROM (Read Only Memory), a RAM (Random Access Memory), etc., although not shown.

The database can be configured by directly correlating "space occupation information" with "supply information". However, correlating "space occupation information" with "URL" allows a quantity of data to be more decreased as above, so that the database 15 can be configured more readily and efficiently, management of which becomes more easy.

In the case where the service center 19 provides the above service "1", when receiving position information and retrieval distance range transmitted from the portable terminal 11, the service center 19 retrieves bubble data corresponding to buildings designated by the user using the position information, retrieves a plurality of buildings falling within a 100 m range in, for example, the north direction from a position of the portable terminal 11, obtains a plurality of URLs corresponding to the plural buildings, obtains contents corresponding to the plural buildings, and transmits the contents to the portable terminal 11.

The service center 19 can provide information within a 100 m range from the user.

Figure 12:
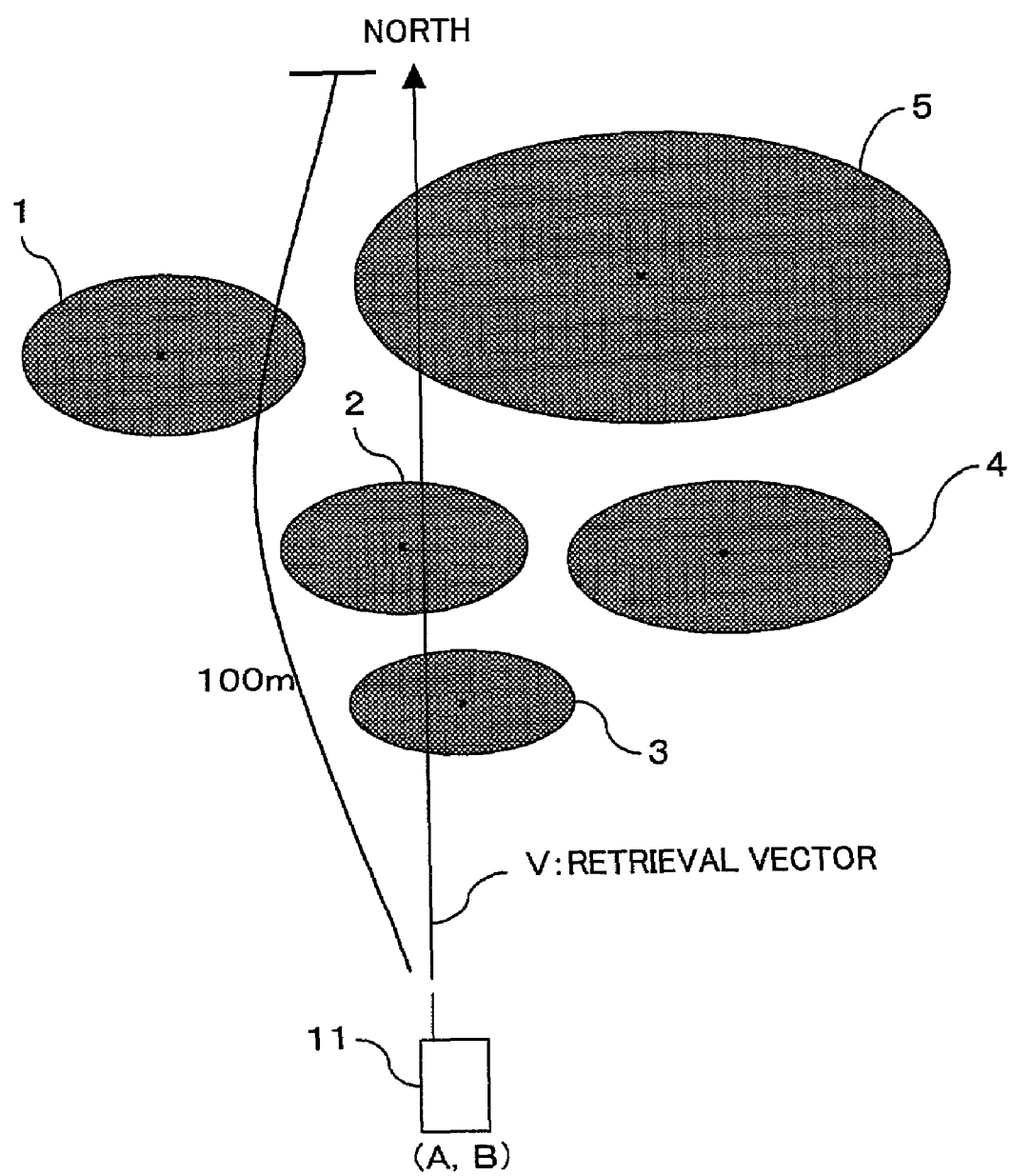
FIG. 12 is a diagram for illustrating a retrieval mode in which a distance is designated in service "1" according to the embodiment.
Figure 13A:
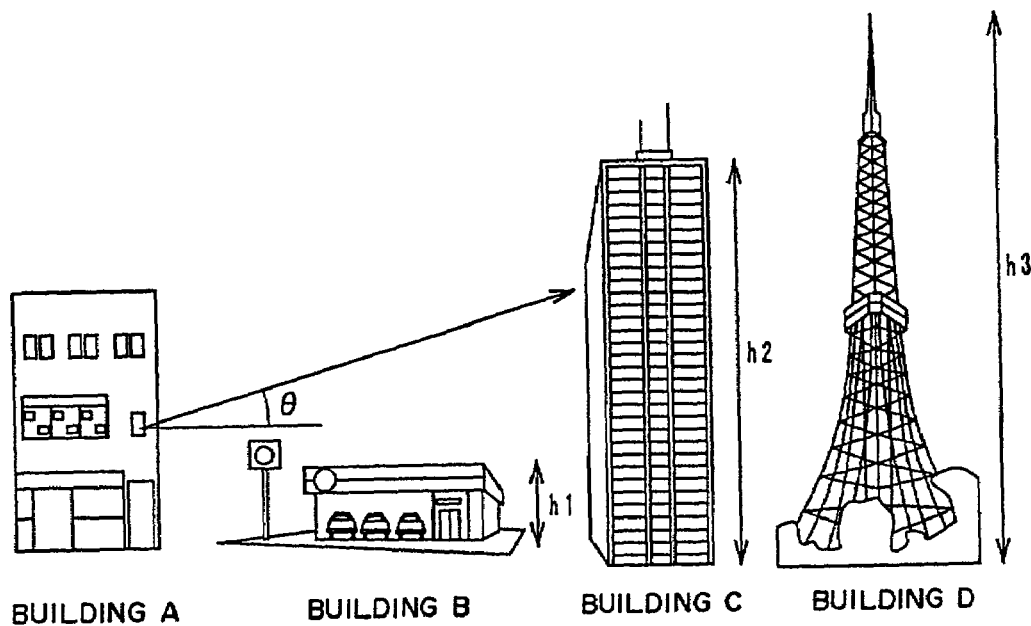
FIGS. 13(a) and 13(b) are diagrams for illustrating a retrieval mode in service "2" according to the embodiment.
Figure 13B:
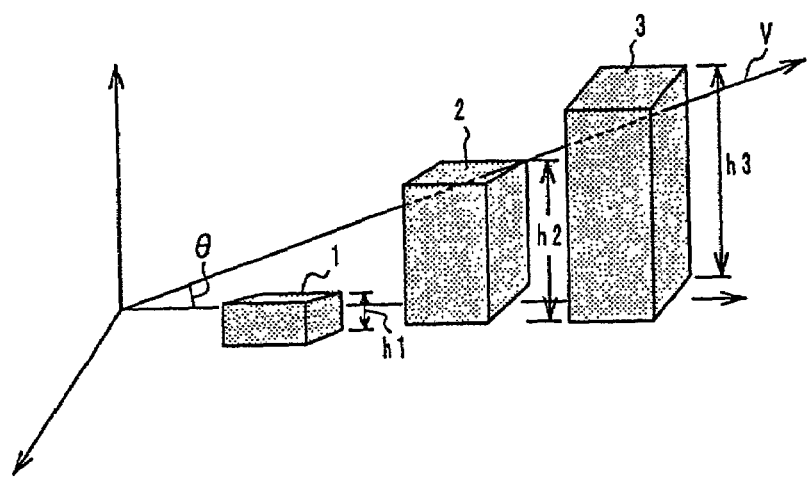

In more detail, the service center 19 retrieves bubble data using a retrieval vector V on the basis of the above position information [for example, refer to FIGS. 12, 13(a) and 13(b)]. The retrieval vector V is a vector toward an object of retrieval such as a structure, a building, a shop, a temple, etc. from a position of the portable terminal 11, which corresponds to information (retrieval object space range information) defining a space range that is an object of retrieval by the portable terminal The retrieval vector V is generated on the basis of position information transmitted from the portable terminal 11 in the service center 19. The service center 19 provides a URL correlated with an information bubble (an image of space occupation information of bubble data) intersecting the retrieval vector V [or included in a space having the retrieval vector V as a radius (that is, including the above retrieval object space range information)] as results of (space) retrieval to the portable terminal 11.

In the case shown in FIG. 12, for example, there are hit information bubbles "2", "3" and "5", so that URLs correlated with them are provided as a result of retrieval to the portable terminal 11. In the case shown in FIGS. 13(a) and 13(b), URLs correlated with information bubbles "2" and "3" corresponding to buildings C and D are provided as results of retrieval to the portable terminal 11.

At this time, it is not always required to provide all of the hit results of retrieval to the portable terminal 11. But, it is possible to provide a part of the hit information bubbles such as an information bubble [namely, an information bubble that first comes into the user's view; building C in FIG. 13(a), for example] first intersecting the retrieval vector V, for example. The service center 19 may select information (URL) corresponding to an information bubble (to be described later) corresponding to a shop in the building, for example, as a result of retrieval, and transmit it to the portable terminal 11.

In providing the service "2", when receiving the position information transmitted from the portable terminal 11, the service center 19 generates a retrieval vector V on the basis of a position and direction of the portable terminal 11 in the similar manner, retrieves an information bubble first intersecting the retrieval vector V, and transmits, for example, contents such as a lunch menu to be provided by a restaurant designated by the user (aimed by the portable terminal 11) to the portable terminal 11. The service center 19 can provide information on a shop or the like designated by the user.

Incidentally, an image of space occupation information (information bubble) may be registered in an arbitrary form such as a sphere, an ellipse, a quadrangular prism or the like in the space, as will be described later with reference to FIG. 11. The information bubble may be set to not only a closed space (occupied space) but also a predetermined range in the space, or an infinite range on one side.

When bubble data is written in the database 15, an effect similar to that provided when an image (information bubble) of space occupation information is generated is provided. When the bubble data is erased from the database 15, an effect similar to that provided when the information bubble disappears is provided.

In FIG. 2, the first receiving unit 16 receives position information having latitude, longitude, altitude, azimuth and an inclination angle transmitted from the portable terminal 11. This function is accomplished by an input port, a CPU (Central Processing Unit; not shown), a ROM, a RAM, etc. of a personal computer or a workstation.

The extracting unit 40 extracts a specific URL (signifying a specific address or specific retrieved information) corresponding to specific space occupation information intersecting the above retrieval vector V (or included in a space having the retrieval vector V as a radius) (namely, including retrieval object range information based on the position information on the portable terminal 11) out of space occupation information held in the database 15 on the basis of the position information having latitude, longitude, altitude, azimuth and an inclination angle of the portable terminal 11 transmitted from the portable terminal 11.

The providing unit 41 provides specific supply information corresponding to the specific URL extracted by the above extracting unit 40 to the portable terminal 11 via the first transmitting unit (refer to FIG. 2). The providing unit 41 can provide (transmit) a URL, or provide a contents name corresponding to the URL. Namely, "supply information" or "URL" that can be provided to the user may include a contents name. The user can thereby obtain desired information on an object of retrieval, thus complicated retrieval becomes unnecessary.

The first transmitting unit 17 (refer to FIG. 2) transmits the specific supply information (a URL or information displayed in a Web site corresponding to the URL) extracted by the above extracting unit 40 to the portable terminal 11. This function is accomplished by an output port, a CPU, a ROM, a RAM, etc. of a personal computer or a workstation.

The Web information outputting unit 18b holds contents (refer to FIG. 10, for example) of an individual, a restaurant or the like. According to this embodiment, the Web information outputting unit 18b comprises a URL generating unit (address generating unit) 55 and a message storing unit 56.

The URL generating unit 55 generates a URL at which various information or service information (contents) on an individual, a company or the like held in the Web information outputting unit 18b is held. By this function of the URL generating unit 55, the service center 19 can manage a list of URLs, and appropriately provide information corresponding to an object of retrieval.

The message storing unit 56 holds a message inputted (registered) from the user, which is configured with a memory. This message is correlated with space occupation information of bubble data (which is obtained by correlating space occupation information with each URL for obtaining supply information), and written in the message storing unit 56.

In correlating a message with space occupation information, a plurality of messages may be assigned to a plurality of small information bubbles provided inside the space occupation information, URLs may be given to these small information bubbles, respectively, and a message may be held at each of the URLs. In such case, it is possible to separately hold and manage a message written by each of plural users.

The DNS unit 18c has a conversion table of host names and IP addresses, and outputs an IP address corresponding to a received host name. The mail transmitting/receiving unit 18d transmits/receives an electronic mail (hereinafter abbreviated as a mail). According to this embodiment, the mail transmitting/receiving unit 18d has a function of correlating four kinds of information on latitude, longitude, altitude and a bubble radius with a mail address. The gateway unit 18a has a known gateway function.

Each of these functions is accomplished by a CPU, a ROM, a RAM, etc. in cooperation. The above functions of the service center 19 may be distributed to a plurality of servers, as shown in FIG. 3, for example.

Figure 3:
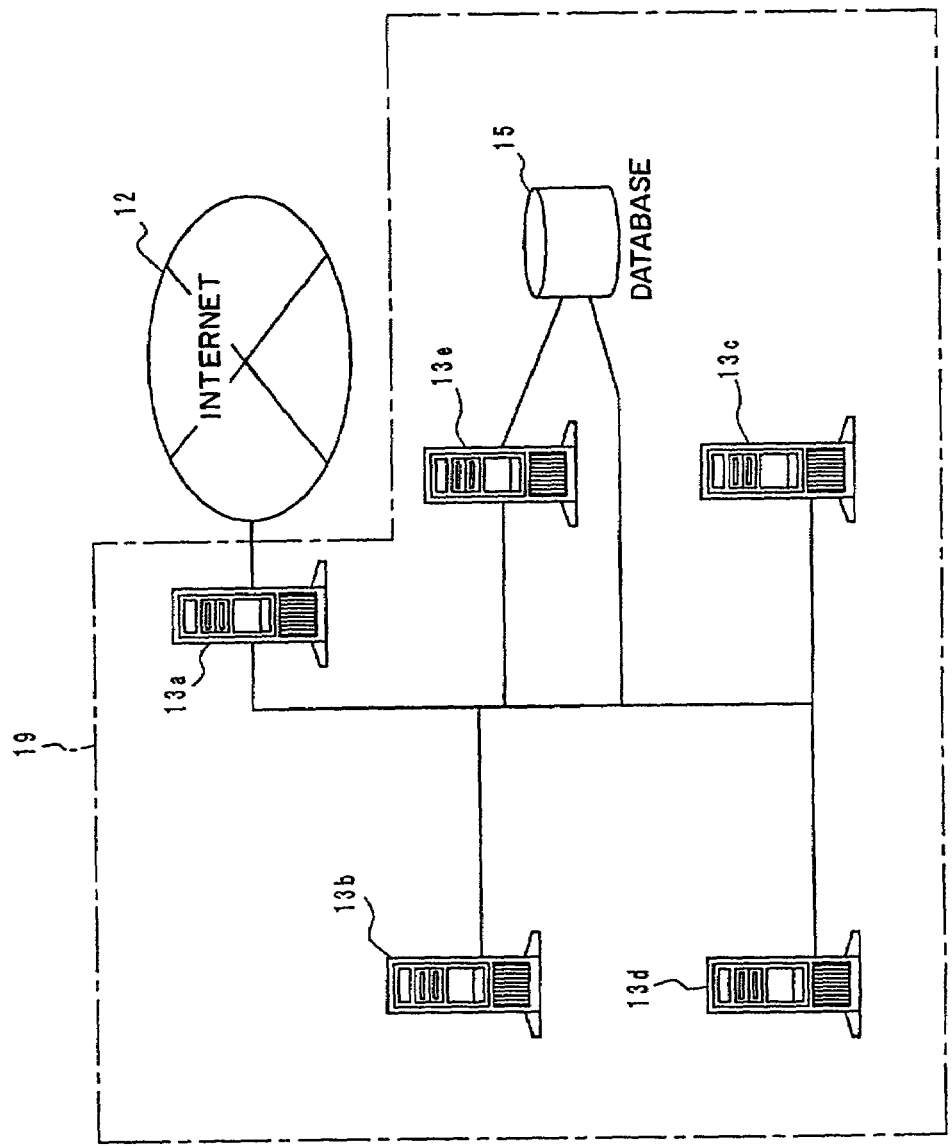
FIG. 3 is a block diagram showing an example of another structure of the service center shown in FIG. 1.

Namely, the above service center 19 may comprise, as shown in FIG. 3, a database 15, a gate way server 13a having an equivalent function to that of the gate way unit 18a, a Web server 18b having an equivalent function to that of the Web information outputting unit 18b, a DNS server 13c having an equivalent function to that of the DNS unit 18c, a mail server 13d having an equivalent function to that of the mail transmitting/receiving unit 18d, and a retrieval server 13e having an equivalent function to that of the providing unit 41.

(A2) Description of Example of Information Bubble Registration

Next, description will be made of a registered image of the above information bubble.

Figure 6:
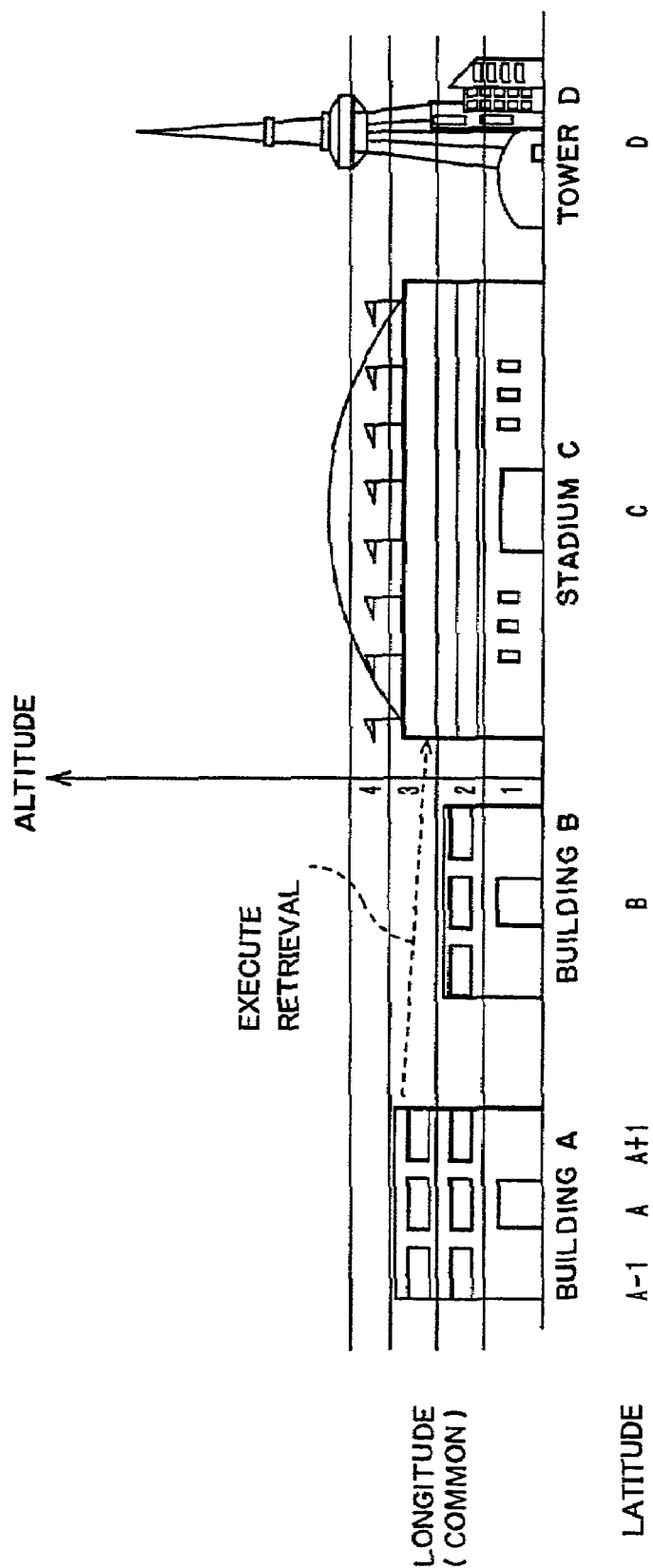
FIG. 6 is a side view schematically showing an arrangement of buildings in order to illustrate a registered image of information bubbles according to the embodiment.

Assuming here that various information relating to four buildings (A building, B building, C stadium and D tower) shown in FIG. 6 and service information thereon are registered as information bubbles. Incidentally, positions of the four buildings are at the same longitude, but at different latitudes. Assuming that A building lies in a range of latitude A−1 to A+1, whereas center positions of B building, C stadium and D tower lie at latitudes B, C and D, respectively. Incidentally, units of latitude and longitude are both "° (degree)", "' (minute)" and "" (second)." These are the same in the following description.

Figure 7:
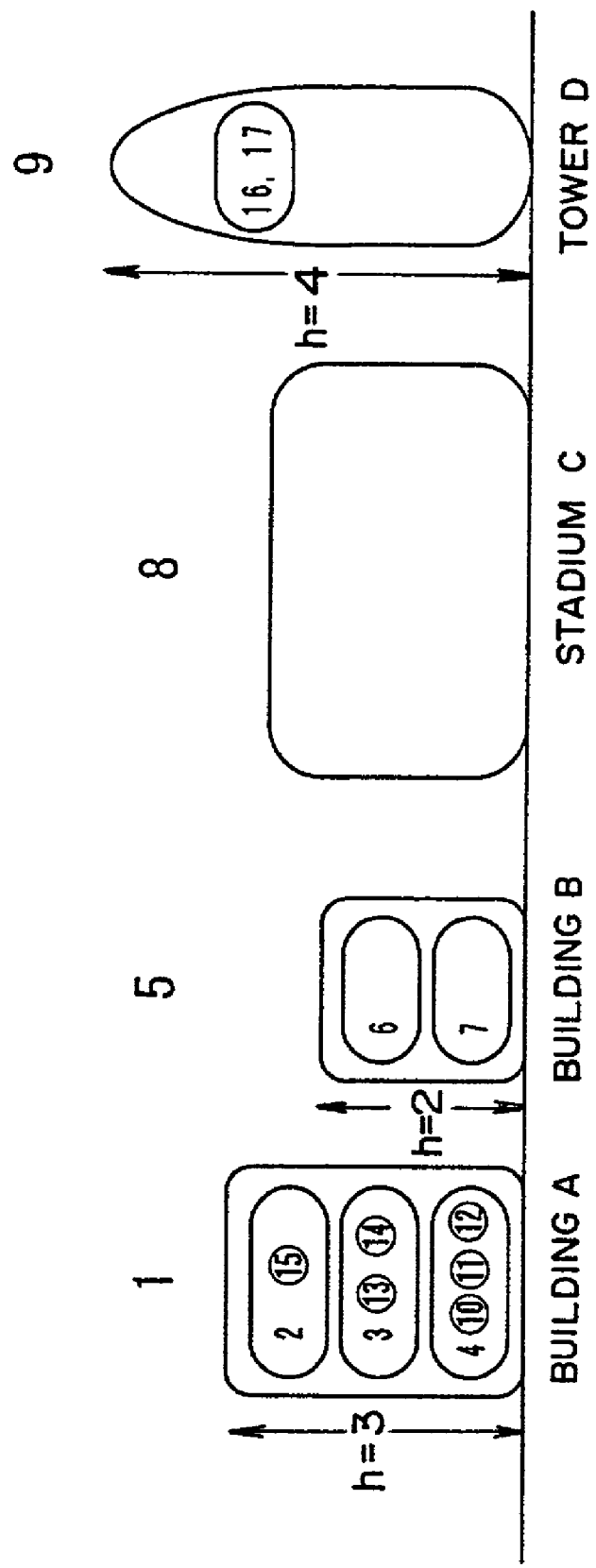
FIG. 7 is a schematic diagram showing information bubbles (images of space occupation information) corresponding to the buildings shown in FIG. 6.

In this case, space occupation information defined by latitude, longitude, altitude and a bubble radius (A/X/0/3) of A building is correlated with a URL (http://www.xxx.100) of supply information (contents) relating to the building, as shown in FIG. 8, and registered as bubble data in the database 15, whereby information bubble "1" corresponding to A building is registered, as shown in FIG. 7.

For instance, a company in A building correlates a URL of its own home page for introducing service contents of itself with space occupation information on its own building (A building) and registers it as bubble data in the service center 19 (database 15), thereby registering the whole A building as an information bubble "1".

Similarly, space occupation information on B building (B/X/0/2), space occupation information on C stadium (C/X/0/3) and space occupation information on D tower (D/X/0/4) are correlated with content URLs relating to these buildings, respectively, and registered as bubble data of bubble numbers "5", "8", and "9", whereby information bubbles "5", "8" and "9" corresponding to B building, C stadium and D tower, respectively, are registered, as shown in FIGS. 8 and 7.

When there are the third, second and first floors in A building, for example, space occupation information on each floor (A/X/3/1; A/X/2/1; or A/X/1/1) is correlated with a contents URL relating to that floor, and registered as bubble data of a bubble number "2", "3" or "4" in the database, as shown in FIG. 8, whereby information bubbles "2", "3" and "4" corresponding to the respective floors of A building are registered inside the information bubble "1", as shown in FIG. 7.

Further, with respect to a company or a shop existing on each of the floors, space occupation information on it is correlated with a contents URL relating to the company or the shop, and registered in the database 15 (refer to bubble data of bubble numbers "10" to "15" in FIG. 8). Whereby, it is possible to register the information bubbles corresponding to the company, the shop and the like of encircled numbers in FIG. 7 in the information bubbles "2", "3" and "4" corresponding to the respective floors. Namely, it is possible to register three shops on the first floor, two shops on the second floor and one shop on the third floor in A building as information bubbles "10" to "15" within the information bubbles "1" representing A building.

Similarly, it is possible to register information bubbles "6" and "7" corresponding to respective floors within the information bubble "5" representing B building. It is also possible to suitably register information bubbles "16" and "17" corresponding to respective floors (observation platform and the like) within the information bubble "9" representing D tower. Registration of an information bubble on the service center 19 may be carried out from the portable terminal 11 over the Internet 12 (using electronic mail or on Web), or from a terminal such as a personal computer of a so-called desktop type over the Internet 12. Procedure for registration using an electronic mail from the portable terminal 11 will be described later.

When the user carries out a retrieval operation by aiming an antenna of the portable terminal 11 toward C stadium on the third floor of A building, as shown in FIG. 6, after the information bubbles are registered on the service center 19 (database 15), position information (latitude, longitude, altitude, azimuth and the like) is transmitted from the portable terminal 11 to the service center 19. Retrieval using the above retrieval vector V is then carried out, and a URL of, for example, C stadium, is provided as a result of the retrieval to the portable terminal 11.

In the space occupation information (A/X/0/3 and the like) shown in FIG. 8, values corresponding to actual values (true values) are set. In the case of altitude, altitude "0" represents that the building contacts with the ground, whereas altitudes "1", "2" and "3" are values corresponding to true values (15 m, 30 m and 45 m, for example), respectively. Incidentally, altitude of a shop or the like on the basement is expressed by a minus value.

The above space occupation information may be set using true values such as 149°22'20" or 62°11'11", or 30 m or 5 m, of course, as shown in FIG. 9. The contents URL may be correlated with a contents name (for example, A building, C stadium or the like), as shown in FIG. 9.

So long as a contents name is beforehand registered in relation with a URL, such a sequence becomes possible that the service center 19 transmits not a URL but a contents name to the portable terminal 11, contents (for example, contents shown in FIG. 10) of a URL corresponding to the contents name are provided from the service center 19 (Web server 13 or the Web information outputting unit 18b) to the portable terminal 11 when the user clicks (carries out a selecting operation) the contents name on a display screen of the portable terminal 11, for example.

Meanwhile, the above information bubble (building data) may be registered in any one of various forms. The information bubble may be registered to be in a quadrangular prism as shown FIGS. 11(a) and 13(b), or in a sphere as shown in FIGS. 11(b), 11(d) and 11(f), or in an elliptic sphere as shown in FIGS. 11(c), 11(e) and 11(g), or in a circular cylinder as shown in FIG. 11(h), for example.

Here, "bubble radius" represents a radius when the information bubble has a spherical shape. When the information bubble is an elliptic sphere, "bubble radius" represents a major axis and a minor axis, values corresponding to the respective axes being required to be set. When the information bubble is a quadrangular prism in conformity with a volume of a building, "bubble radius" represents a width or the like of the quadrangular prism.

Figure 11A:
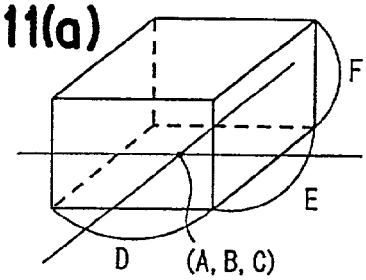
FIGS. 11(a) through 11(h) are diagrams for illustrating geometry of information bubbles.
Figure 11B:
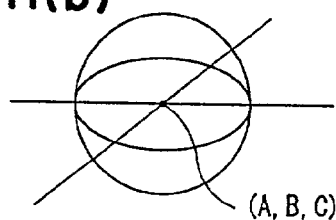
Figure 11C:
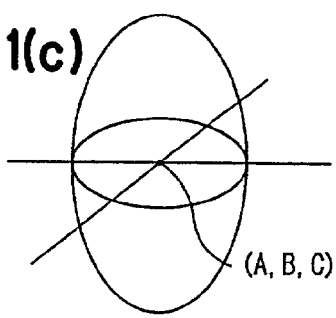
Figure 11D:
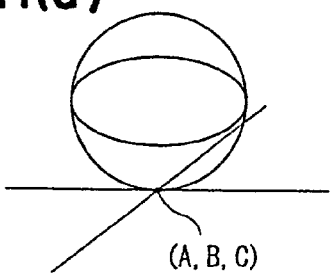
Figure 11E:
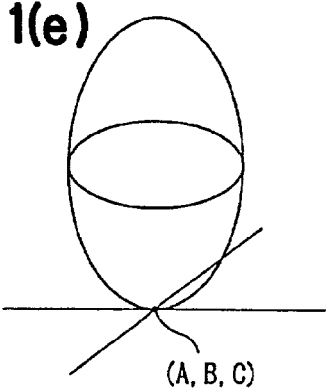
Figure 11F:
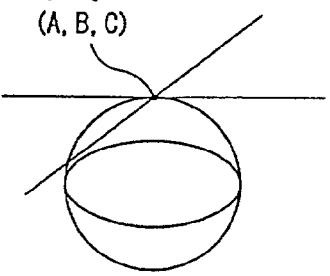
Figure 11G:
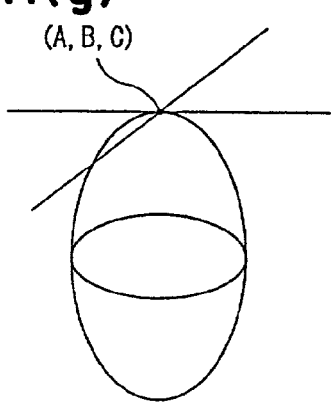
Figure 11H:
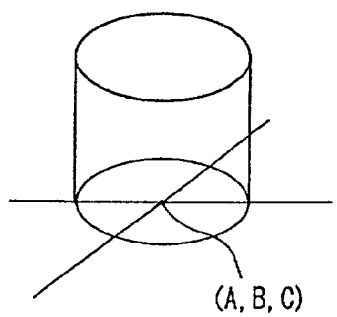

Incidentally, (A, B, C) in FIGS. 11(a) through 11(g) represents a center position defined in (x, y, z) coordinates of the information bubble. Namely, FIG. 11(a) shows that a center position of the information bubble having a shape of quadrangular prism is set at the center position on the bottom surface of the quadrangular prism. D, E and F shown in FIG. 11(a) represents a latitude width, a longitude width and an altitude width, which are values of 20 m, 20 m and 10 m, respectively, for example. These kinds of width data are beforehand held in the database 15, and considered when an information bubble is generated.

In the (x, y, z) coordinates, for example, a retrieval vector V passing through the origin (0, 0, 0) is expressed as (x, y, z)=(0, 0, 0)+(V1, V2, V3), where V1, V2 and V3 are x, y and z components of a direction vector. Whether the retrieval vector V intersects within the above width of the solid or not is calculated.

FIG. 11(b) shows that a center position of the information bubble having a spherical shape is set at the center position of the sphere. When an information bubble is retrieved, presence of an intersection is detected using an equation expressing the sphere and a formula expressing the retrieval vector V with latitude, longitude and altitude of the portable terminal 11 being as an origi of the coordinates.

For example, a sphere having a radius R with the origin (0, 0, 0) being the center position is expressed as $x^2+y^2+z^2=R^2$. Using the formula of the retrieval vector V and the expression of the sphere, an intersecting point is calculated.

FIG. 11(c) shows that the center position of an information bubble having an elliptic spherical shape is set in the center of the elliptic sphere. Here, an elliptic sphere having a major axis a and a minor axis b whose origin (0, 0, 0) is the center position is expressed as $(x/b)^2+(y/b)^2+(z/a)^2=1$.

FIG. 11(d) shows that the center position of an information bubble having a spherical shape is set at the lowest position of the sphere. FIG. 11(f) shows that the center position of an information bubble having a spherical shape is set at the highest position of the sphere. FIG. 11(e) shows that the center position of an information bubble having an elliptic spherical shape is set at the lowest position of the elliptic sphere. FIG. 11(g) shows that the center position of an information bubble having an elliptic spherical shape is set at the highest position of the elliptic sphere.

FIG. 11(h) shows that the center position of an information bubble having a circular cylindrical shape is set in the center on the bottom surface. A circular cylinder having a radius R and a height H whose origin (0, 0, 0) lies at the center position is expressed as $x^2+y^2=R^2$ and ($0 \leq z \leq H$).

Incidentally, at which position the center position of the information bubble is set may be arbitrarily set and uniformly used.

A range of an information bubble to be displayed by the service center 19 can be variously changed according to a contract fee or the like. When an individual makes a contract, it is basically set to an information bubble having a small radius (for example, within a 5 m radius) whose contract fee is cheap.

In concrete, a radius of the sphere, or a long axis and a short axis of the elliptic sphere shown in FIGS. 11(b) to 11(g) are changed. Further, space occupation information of a quadrangular prism shown in FIG. 11(a) may be set to not only a closed region but also a wider region in parallel to a side denoted by latitude E, for example. Additionally, space occupation information of a circular cylinder shown in FIG. 11(h) may be set to an infinite region extending upward from the center position in the z direction, for example.

(A3) Description of Detailed Structure of Portable Terminal 11

Figure 4:
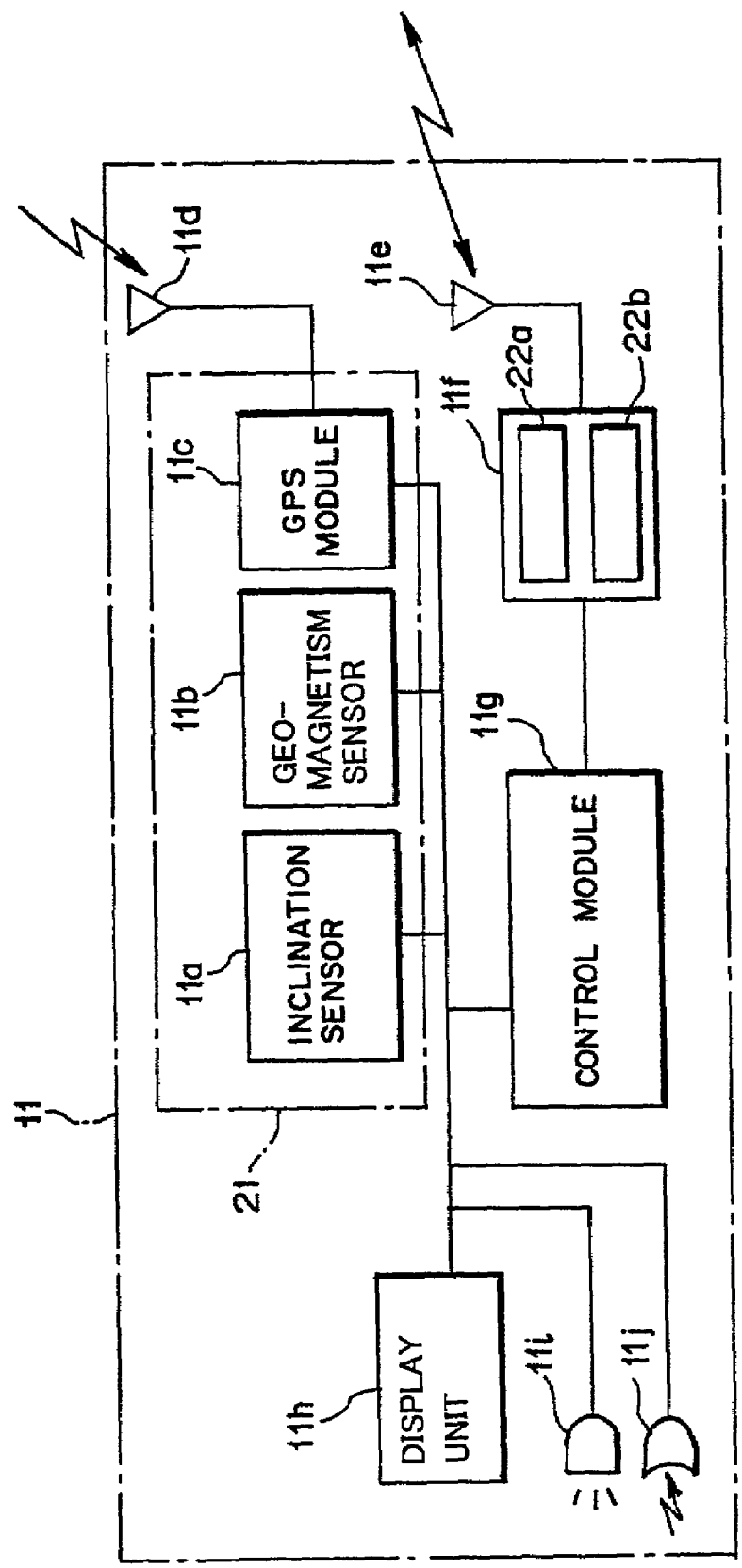
FIG. 4 is a block diagram showing an example of a structure of a portable terminal shown in FIG. 1.

Next, description will be made of a detailed structure of the above portable terminal 11. FIG. 4 is a block diagram showing an example of a structure of the above portable terminal 11. The portable terminal 11 shown in FIG. 4 comprises, for example, an antennae 11d and 11e, a detecting unit 21, a radio module 11f, a control module 11g, a display unit 11h, a speaker 11i, a microphone 11j, etc.

The antenna 11d is a GPS antenna receiving a radio signal transmitted from a satellite. The antenna 11e transmits and receives a radio signal from and to the radio network 10.

The detecting unit 21 detects postion information having latitude, longitude, altitude, azimuth and an inclination angle of the terminal. According to this embodiment, the detecting unit 21 comprises a GPS module (satellite information receiving unit) 11c, a geomagnetism sensor 11b, and an inclination sensor 11a.

The GPS module 11c can receive satellite information using the global positioning system. Incidentally, "satellite information" is information on latitude, longitude and altitude of the portable terminal 11. The GPS module 11c can control a direction of the antenna 11d.

The geomagnetism sensor (azimuth sensor) 11b can detect the geomagnetism to measure the azimuth. The geomagnetism sensor 11b has a coil not shown, for example, to measure the geomagnetism according to a magnitude of the magnetic flux through the coil. A reference of azimuth is a long axis (a direction in which the antenna 11e extends) of the portable terminal 11, for example. Incidentally, the measuring method by the geomagnetism sensor is known.

The inclination sensor (gyro sensor) 11a measures an inclination angle to the horizon of the portable terminal 11. The inclination sensor 11a can detect an attitude of the portable terminal 11 by cooperating with, for example, a gyro module.

Figure 5:
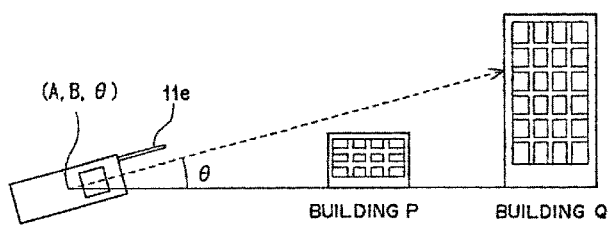
FIG. 5 is a schematic diagram for illustrating an example of position information measurement by the portable terminal shown in FIGS. 1 and 4.

As schematically shown in FIG. 5, for example, assuming that the portable terminal 11 is located at latitude A, longitude B and altitude 0, aimed toward a building Q. An inclination angle in this case is an angle θ (θ is a real number not less than 0 and not larger than 90) to the horizontal plane formed by the long axis of the portable terminal 11.

The portable terminal obtains a latitude A, a longitude B and an altitude 0 by means of the GPS module 11c, obtains an azimuth on the basis of a direction in which the antenna 11e extends as a reference by means of the geomagnetism sensor 11b, and obtains an inclination angle θ by means of the inclination sensor 11a, and transmits these pieces of position information to the service center 19.

The service center 19 generates the above-described retrieval vector V from the information, extracts a URL corresponding to an information bubble intersecting the retrieval vector V (or included in a space with the retrieval vector V being a radius), and transmits contents (supply information) corresponding to the URL to the portable terminal 11.

The radio module 11f (refer to FIG. 4) transmits and receives a radio signal, which comprises a second transmitting unit 22a and a second receiving unit 22b.

The second transmitting unit 22a transmits position information detected by the detecting unit 21 to the service center 19. The second receiving unit 22b receives specific supply information corresponding to specific space occupation information intersecting the above retrieval vector V (or included in a space with the retrieval vector V being a radius) out of space occupation information composed of latitude, longitude, altitude and a bubble radius of each of objects in the three-dimensional space transmitted from the service center 19 in response to the position information transmitted from the second transmitting unit 22a. Each of the second transmitting unit 22a and the second receiving unit 22b is formed with a radio circuit.

The control module 11g controls operations of respective parts of the portable terminal 11, besides processing a data format for transmission/reception on the basis of a predetermined protocol. This function is accomplished by a CPU, a ROM, a RAM, etc., for example.

The display unit (liquid crystal display or the like) 11h displays the specific supply information received by the second receiving unit 22b. This function is accomplished by a window display. The speaker 11i outputs voice. The microphone inputs voice.

As above, the portable terminal 11 has functions for GPS reception, azimuth detection, radio signal transmission/reception, display and voice input/output.

(A4) Description of Basic Operation

Next, description will be made of an actual service (space information service) that the service center 19 retrieves an information bubble (supply information) virtually registered in the three-dimensional space on the basis of position information on the portable terminal 11, and provides the information to the user (portable terminal 11).

When desiring to receive the service "1", the user aims the portable terminal 11 in a predetermined direction, and inputs, for example, "100 m" as a retrieval distance region into the portable terminal 11. The portable terminal 11 detects (obtains) information on a position and an attitude of the portable terminal 11, transmits the information and the distance region to the service center 19, then receives supply information from the service center 19, as stated above.

Alternatively, the user may select service information on a shop in a building within a predetermined-distance range, and require the service center 19 to transmit it. Still alternatively, the user may beforehand set "within 100 m", for example, in the portable terminal 11 instead of inputting a distance range. Still alternatively, the service center 19 may beforehand set such as to retrieve within 100 m.

Whereby, the user can obtain information relating to a building or the like existing within 100 m in a direction of the user's view, or information relating to that information.

When desiring to receive the service "2", the user aims the portable terminal 11 toward the ninth floor of a building in which there is a restaurant, for example. The portable terminal 11 transmits information on a position and an attitude of the portable terminal obtained in such the state to the service center 19, thereby obtaining service information on the restaurant from the service center 19. As this, the user can obtain information on a shop in a specific building.

Next, description will be made of registration of the information bubble using an electronic mail from the portable terminal 11. In this case, a transmitting/receiving (mailer) function for an electronic mail (hereinafter simply referred to as a mail) is accomplished by the mail transmitting/receiving unit 18d shown in FIG. 2 or the mail server 13d shown in FIG. 3. According to this embodiment, each of these is assumed to have a function (GPS mapping correlating function) of correlating latitude, longitude and altitude with a mail address.

Figure 14:
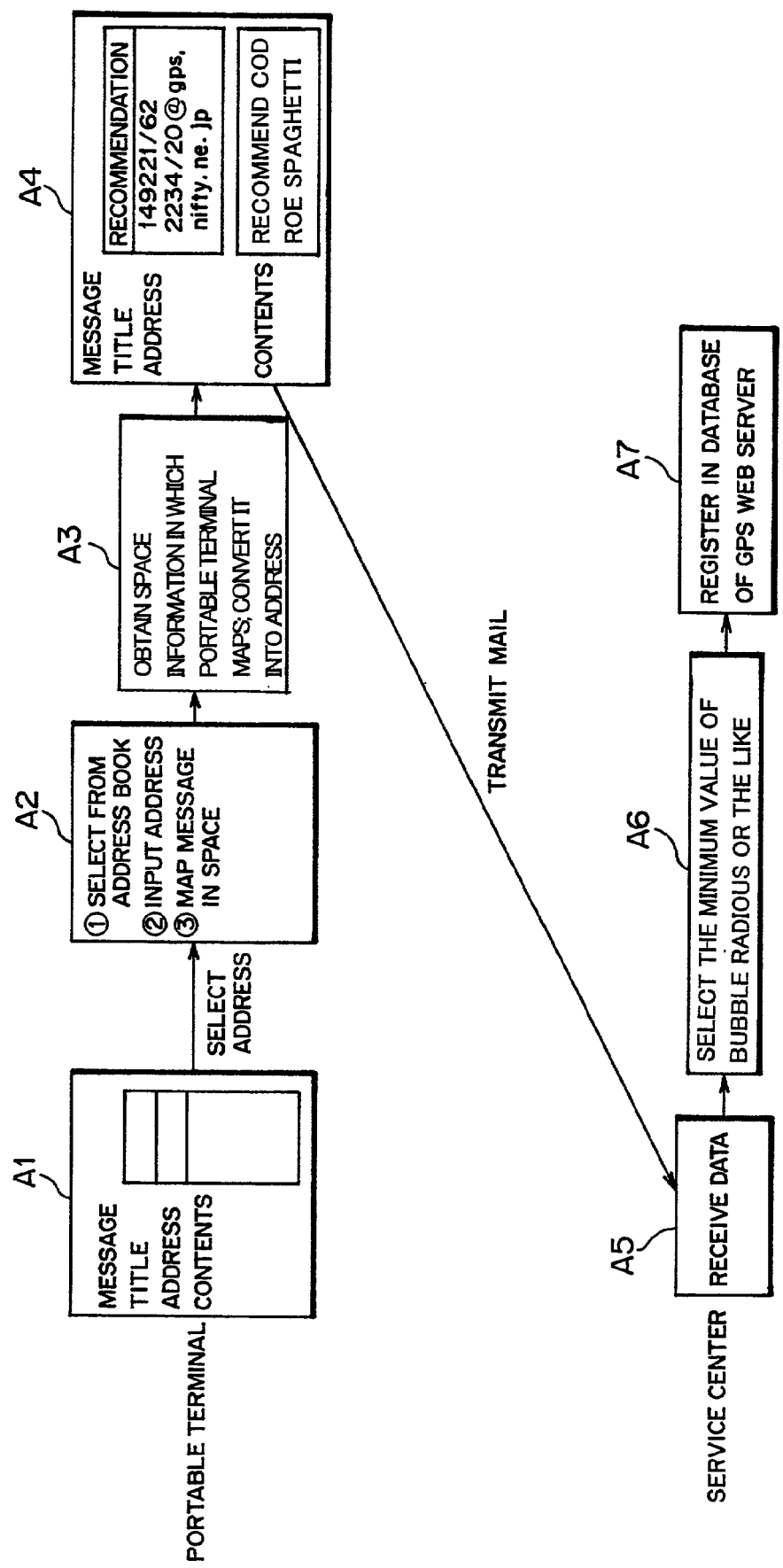
FIG. 14 is a sequence diagram for illustrating an example of registration of an information bubble on the information providing service system shown in FIG. 1 with an electronic mail.

As shown in FIG. 14, an information input screen for a transmitted mail is displayed on the display unit 11h of the portable terminal 11 (step A1). When the user selects an address (of a destination of the transmission) on the screen in this state, a menu screen is displayed on the display unit 11h, for example (Step A2). On the menu screen, there are displayed, as proposed choices, ① a mode in which the user selects a mail address from the address book to input the address, ② a mode in which the user directly inputs a mail address using a key pad (not shown) or the like of the portable terminal 11, and ③ a mode in which the user maps a message (registers an information bubble) in the space.

When the user selects ③, that is, the user maps a message in the space, in such the state, for example, the portable terminal 11 obtains various information (latitude, longitude, altitude, azimuth, inclination angle) by means of the detecting unit 21 as stated above, and converts the information into a mail address (step A3).

The user then inputs a desired message (step A4), and transmits the mail to the service center 19. When the service center 19 receives the mail data (step A5), the service center 19 selects a minimum value with respect to the bubble radius or the like (step A6), and writes it in the database 15 by means of the Web server (GPS Web server) 13b or the Web information outputting unit 18b.

Figure 15:
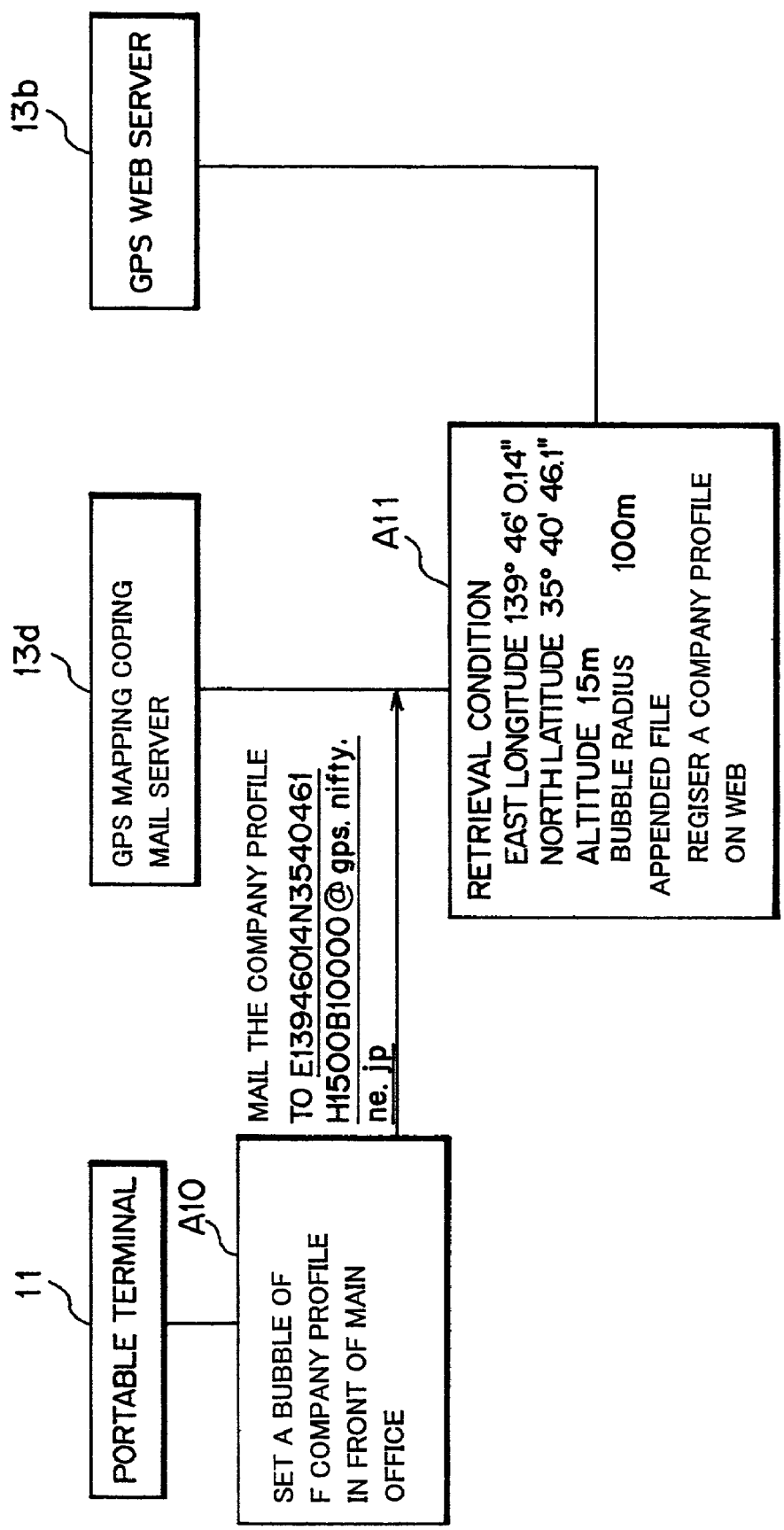
FIG. 15 is a diagram showing a transmit/receive procedure (sequence) among the portable terminal, a mail server (GPS mapping coping mail server), and a Web server (GPSWEB server) at the time that an information bubble is registered in the information providing service system shown in FIG. 1.

FIG. 15 shows a data transmitting/receiving procedure (sequence) among the portable terminal 11, the mail server (GPS mapping coping mail server) 13d and the Web server (GPS Web server) 13b at the time of registration of an information bubble.

The user (for example, a person in charge of a company) sets bubble data of a company profile of F company in front of the main office of F company in Tokyo (step A10). A position at which the bubble data is set is at 139°46'01.4" east longitude, 35°40'46.1" north latitude, altitude of 15 m, with a bubble radius of loom. The user sets a mail address correspondingly to the company profile. This address is, for example, E13946014N3540461H1500B10000@gps.nifty.ne.jp. The user mails retrieval conditions and the company profile to the address.

At step A11, the mail server 13d receives the above retrieval conditions and the company profile, and starts retrieval. An appended file thereof is registered as a company profile on the Web server 13b.

The user transmits values indicating a predetermined range as the mail address, bubble data including space occupation information within the range is retrieved.

A retrieval tag that is a position can be used, whereby the user obtain information simply and quickly.

Bubble data whose bubble radius is set large is easily retrieved, whereas bubble data whose bubble radius is set small is difficult to be retrieved, for example. For this, it is possible to set a small radius to bubble data having information desired to be hidden, while set a large radius to bubble data having information to be advertised to as many users as possible, such as a company profile or the like.

Figure 16:
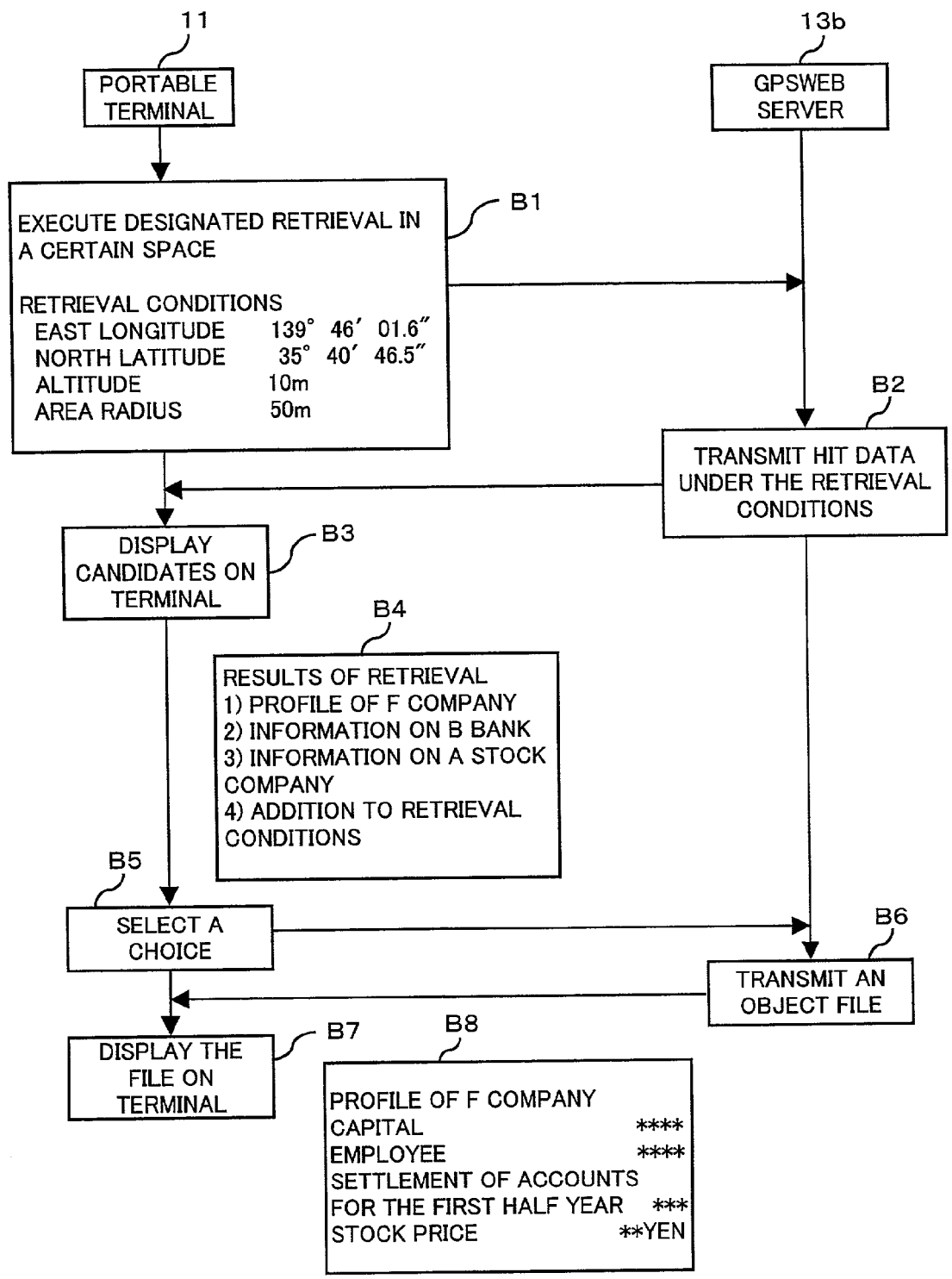
FIG. 16 is a sequence diagram for illustrating a retrieving operation by the portable terminal in the information service system shown in FIG. 1.

Next, description will be made of a retrieving operation of the portable terminal 11. As shown in FIG. 16, assuming that the user carries out designated retrieval using the portable terminal 11 (step B1). As retrieval conditions, the user designates at least position information (139°46'01.6" east longitude, 35°40'46.5" north latitude, altitude of 10 m) on the portable terminal 11 and a retrieval distance (area radius; 50 m), for example.

The portable terminal 11 transmits the conditions to the Web server 13b to request to retrieve Transmitted contents are, for example, http://www.gps.nifty.ne.jp/

Titles?qt=%C5%EC%B7%D0139%A1%EB46%A1%
C701.6%A1%C9%CB%CC%B0%DE35%A1%EB40%
A1%746.5%A1%C9%B9%E2%C5%D9%A3%B10% A3%
ED&SUBMIT=+%B8%A1%BA%F7+&1k=noframes&
svx=100600&col=JW (step B3).

Next, the Web server 13b retrieves in the database 15 using the designated retrieval conditions, and transmits (provides) hit data (results of retrieval) to the portable terminal 11 (step B2). The portable terminal 11 displays the received results of retrieval as proposed choices on the display unit 11h (step B3). An example of the display is a display B4.

When the user selects one of the choices (profile of F company, for example) in such the state (step B5), information on the selected choice is transmitted to the Web server 13b. The Web server 13b specifies a file corresponding to the choice selected by the portable terminal 11 on the basis of the information, and transmits the file to the portable terminal 11 (step B6). The portable terminal 11 displays contents of the received file on the display unit 11h (step B7), so that the user can refer the profile such as a capital or the like of F company (step B8).

As above, a mail address is used as a position tag, a message and data linked to the mail address are outputted to the user, so that the user can obtain information relating to, for example, an advertisement of a company, or a menu and popularity of a restaurant.

The user can retrieve in analog feeling based on human sensation such as "this place", "that place" or "this direction" when retrieving desired information on a building that comes into his/her view without a digital process as done in the retrieval service in the Internet 12.

Since the service is carried out between the portable terminal 11 and the Web server 13b, the restaurant can realize the service without necessity for special equipment.

Additionally, since the user retrieves designating a size of the bubble radius, the system administrator such as a contents provider can sell a specific space range to a company from a view point of company advertising. The selling price can be calculated from space occupation information and a bubble radius.

Meanwhile, various information relating to an object may include information on a city office, a park, an amusement park, a theme park, a historical building, a natural thing such as a mountain, a river, a peninsula, an island, the universe or the like, other than the above described information. Service information relating to the various information may include information on living, information on opening hour, information on vacant sheet for an attraction, geometry, history, explanation of constellations, information on travel, etc.

(B) Description of Structures and Operations of Essential Parts of this Embodiment Next, description will be made of a service that the above information bubble is virtually move as a balloon in a real physical space, based on the above space information service system 9. Hereinafter, an information bubble is occasionally referred as a balloon, for the sake of convenience.

(B1) Description of Registration of Information Bubble (Balloon)

Figure 17:
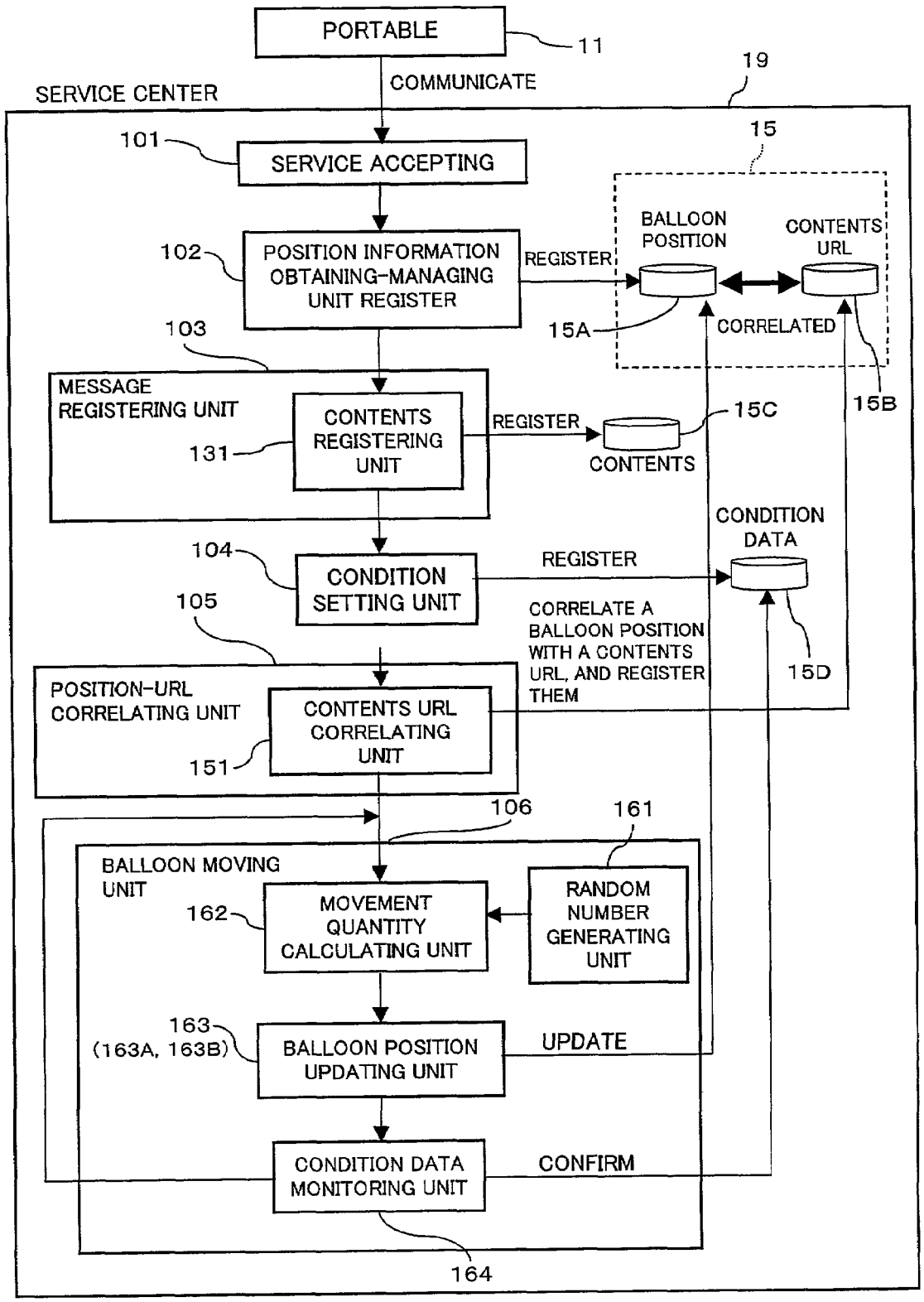
FIG. 17 is a block diagram showing structures of essential parts of the service center, focusing on a function for registration of a balloon (information bubble) according to the embodiment.

FIG. 17 is a block diagram showing structures of essential parts of the service center 19, focusing on functions of registering a balloon. The service center 19 shown in FIG. 17 comprises a service accepting unit 101, a position information obtaining-managing unit 102, a message registering unit 103, a condition setting unit 104, a position-URL correlating unit 105, a balloon moving unit 106, etc.

The service accepting unit 101 accepts a service request from the portable terminal 11. As types of service requests, there are "balloon register request", "balloon state confirm request", "balloon retrieve/message post-enter request" according to this embodiment. According to each of these requests, a process after that is determined. Each of these service requests is designated by that a mail having service menu contents or contents equivalent to these is provided to the portable terminal 11, and the user operates the portable terminal 11 to select a service that the user desires.

When a type of the service request accepted by the service accepting unit 101 is "balloon register request", the position information obtaining-managing unit 102 is activated to obtain position information (balloon position information; space occupation information composed of latitude, longitude, altitude, a babble radius, etc.) 15A at which a balloon should be registered, and registers and manages the position information 15A in the database 15.

If a balloon is registered at the present position of the portable terminal 11, the above balloon position information can be obtained from the position information on the portable terminal 11 detected by the portable terminal 11 by receiving it from the portable terminal 11. If the balloon is registered at a position other than the present position of the portable terminal 11, the balloon position information can be obtained by receiving position information designated by the user (portable terminal 11). The service accepting unit 101 and the position information obtaining-managing unit 102 can be accomplished as one function of the above-described first receiving unit 16 (refer to FIG. 2), for example.

The message (supply information) registering unit 103 registers various supply information such as a message and the like desired to be referred by (provided to) the user in relation with the above balloon as contents data 15C by means of a contents registering unit 131. The contents data 15C (hereinafter simply referred to as "contents 15C", occasionally) is registered on, for example, the Web information outputting unit (Web server) 18b (contents storing unit 56; refer to FIG. 2).

A position-URL correlating unit 105 correlates the above balloon position information 15A with URL data 15B (hereinafter, simply referred to as "a URL 15B" or "contents URL 15B", occasionally) of the contents 15C in the database 15 by means of a contents URL correlating unit 151. By this correlation, an imaginary balloon having the above supply information is virtually registered in a real physical space specified by the above balloon position information 15A.

A portion configured with the position information obtaining-managing unit 102, the message registering unit 103 and the position-URL correlating unit 105 fulfils a function as the information bubble managing unit 39 which correlates space occupation information including position information in a real physical space with the above supply information, and holds and manages it in the database 15, in order to virtually register an information bubble correlated with a desired supply information in the real physical space.

Namely, the message registering unit 103 (contents registering unit 131) and the position-URL correlating unit 105 (contents-URL correlating unit 151) can be realized as one function of the above-described Web information outputting unit 18b, for example. In other words, the above information bubble managing unit 39 corresponds to a portion configured with at least the database 15, the first receiving unit 16 and the Web information outputting unit 18b in FIG. 2.

FIG. 25 shows an example of balloon position-contents URL data 15-1 registered on the database 15. In FIG. 25, position information 15A on a balloon and a contents URL 15B are managed at each balloon number, and information (title, summary or the like) on contents of contents 15C corresponding to the contents URL 15B, an information type, a user identifier are managed for each balloon.

The above "information type" represents a type of a registered information bubble, that is, the information type represents whether a registered information bubble is registered as "a balloon mail" or registered as an information bubble (company profile described above or the like) relating to a building (a company) or a shop. The information type is referred when a retrieval category is designated in retrieval of an information bubble.

For example, when "balloon mail" is designated as a retrieval category by the retriever (user), only information bubbles whose information type is "balloon mail" become objects of the retrieval. When no retrieval category is designated, all registered information bubbles become objects of the retrieval.

The above user identifier is information used to identify a user having registered an information bubble. For example, the user identifier is given to the user from the service center 19 when the user beforehand goes through the formalities for user registration in order to use this space occupation information service. When using this space occupation information service, the user needs to notify the service center 19 of a given user identifier. A time that the user notifies of the user identifier may be when the user accesses to the service center 19, or when the user transmits position information on the portable terminal 11. This point with respect to the user identifier is the same in another mode of the service to be described later.

The condition setting unit 104 sets condition data 15D used when the above balloon is moved to a specific position (for example, moved back to the initial registered position) after the balloon moving unit 106 to be described later moves the balloon. As shown in FIG. 24, for example, data relating to a available period of balloon's movement (hereinafter simply referred to as "floating period") such as a balloon floating period or floating time limit, data (an upper limit value of the number of post-entering persons) relating to the number of persons who post-enter messages to the contents 15C (the number of times of update), that is, the number of other users (portable terminals 11) who hit the balloon in retrieval in the space and refer to the balloon, and the like can be set as the condition data 15D.

According to this embodiment, by setting the above condition data 15D, it is possible to freely define (set) behavior of a balloon in the real physical space such as to move the balloon to a specific position (initial registered position) after a predetermined period is elapsed (floating period), or move the balloon to a specific position (initial registered position) when the number of users who have post-entered messages (the number of post-entering persons) reaches "an upper limit value of the number of post-entering persons", or the like. Whereby, it is possible to flexibly realize the space information service in various modes as will be described later.

The condition data 15D is stored in any of various storage media such as a RAM, a ROM, a hard disk and the like not shown, for example. If the both of the above conditions are set, the balloon is moved to the specific position when either one of the conditions is satisfied. The condition data 15D is basically designated from the portable terminal 11 of a user who registers a balloon in a series of sequences for balloon registration. However, the service center 19 may automatically set the condition data 15D. For instance, if the user does not designate the condition data 15D, the service center 19 may automatically set default condition data 15D.

Post-entering of a messages by other user is executed by accepting it by a message post-entering unit 114 (contents post-entering unit 141) to be described later with reference to FIG. 21.

FIG. 24 shows an example of the above condition data 15D. In FIG. 24, conditions are set for each user identifier. When the same user registers plural kinds of contents, a contents identifier is set for each user identifier in order to discriminate them.

The balloon moving unit 106 updates the balloon position information 15A in the database 15 to virtually move the balloon in the real physical space. According to this embodiment, the balloon moving unit 106 comprises, as shown in FIG. 17, a random number generating unit 161, a movement quantity calculating unit 162, a balloon position updating unit 163 and a balloon condition data monitoring unit 164.

The random number generating unit 161 generates a random number (a random number relating to latitude, longitude, altitude, a bubble radius or the like) relating to the balloon position information 15A. The movement quantity calculating unit 162 calculates an update quantity (that is, a quantity of movement of a balloon) of the balloon position information 15A on the basis of the random number generated by the random number generating unit 161.

Figures 26, 27:
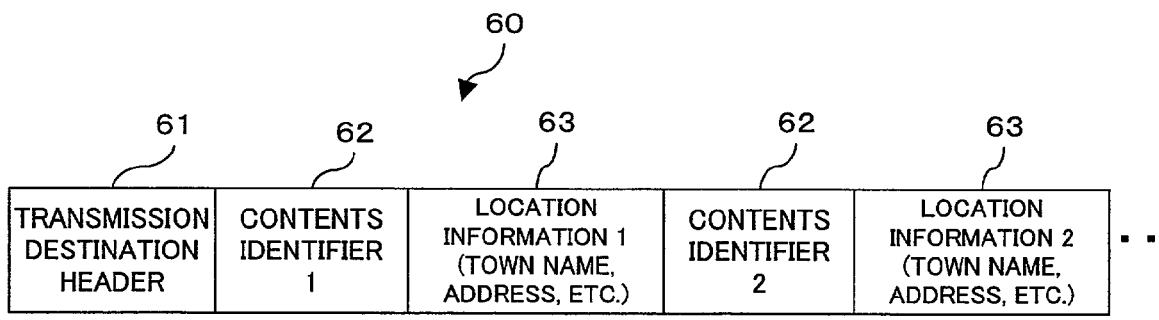
FIG. 26 is a diagram for illustration an example of calculation in a movement quantity calculating unit in the service center shown in FIG. 17.
FIG. 27 is a diagram showing an example of a format of data (a result of confirmation of a balloon registered by the person himself/herself) to be transmitted to the portable terminal from an information notifying unit in the service center shown in FIG. 19.

As shown in FIG. 26, for example, if a random number generated by the random number generating unit 161 is −20″ when the present balloon position is at N35°22′20″ (north latitude), the movement quantity calculating unit 162 updates the balloon position to a new balloon position N35°22′00″. Incidentally, each of longitude, latitude, a bubble radius and the like may be updated in the similar manner.

The balloon position updating unit 163 updates the above balloon position information 15A by a quantity of update calculated by the movement quantity calculating unit 162 to move the balloon by the above quantity of update (movement quantity) in the real physical space.

In this case, the balloon moving unit 106 updates the balloon position information 15A on the basis of a random number generated by the random number generating unit 161 to randomly move the above balloon in the real physical space, thereby floating supply information such as a desired message or the like as a balloon (balloon mail) in the real physical space.

In this case, if a random number generated by the random number generating unit 161 is considered to be data defining behavior of a balloon in the real physical space, the random number generating unit 161 and the condition setting unit 104 fulfil a function as a balloon (information bubble) behavior setting unit which sets the condition data 15D or a random number as behavior data defining behavior of the balloon in the real physical space. The balloon moving unit 106 updates the balloon position information 15A according to the behavior data set by the balloon behavior setting unit to move the balloon.

The condition data monitoring unit 164 has a timer function not shown to monitor (confirm) the condition data 15D. When a condition defined by the condition data 15D is satisfied (for example, when "a floating periods" of the balloon expires, or the number of post-entering persons reaches "the upper limit value of the number of post-entering persons"), the condition data monitoring unit 164 gives a direction to the balloon position updating unit 163 to update the relevant balloon position information 15A to specific position (initial registered position) information, thereby moving the balloon to the specific position (initial registered position).

Namely, the balloon position updating unit 163 according to this embodiment has a function as a first information bubble position updating unit 163A which randomly updates the balloon position information 15A according to a random number generated by the random number generating unit 161 to randomly move a balloon in the real physical space, and a function as a second information bubble position updating unit 163B which updates the balloon position information 15a to position information on a specific position (initial registered position) at the time defined by the condition data 15D to move a balloon to a specific position (initial registered position) in the real physical space.

Note that these function may be provided separately. If there is no necessity to randomly move a balloon, or if there is no necessity to move a balloon to a specific position, only either one of the position updating units 163A and 163B may be provided.

According to this embodiment, a portion configured with the condition setting unit 104 (balloon behavior setting unit 39) and the balloon moving unit 106 accomplish a function as the balloon (information bubble) movement control unit 42 (refer to FIGS. 2 and 17) which updates at least the balloon position information 15A in the database 15 (information bubble managing unit 39) to virtually move the balloon (information bubble) in the real physical space.

This example shows a case where the balloon is randomly moved. Alternatively, it is possible to float a balloon only within a specific space region in the real physical space by limiting an effective random number value, or move (circulate) a balloon along a designated route by using route data designating a moving (circulating) route of the balloon instead of a random number, for example.

Figure 18:
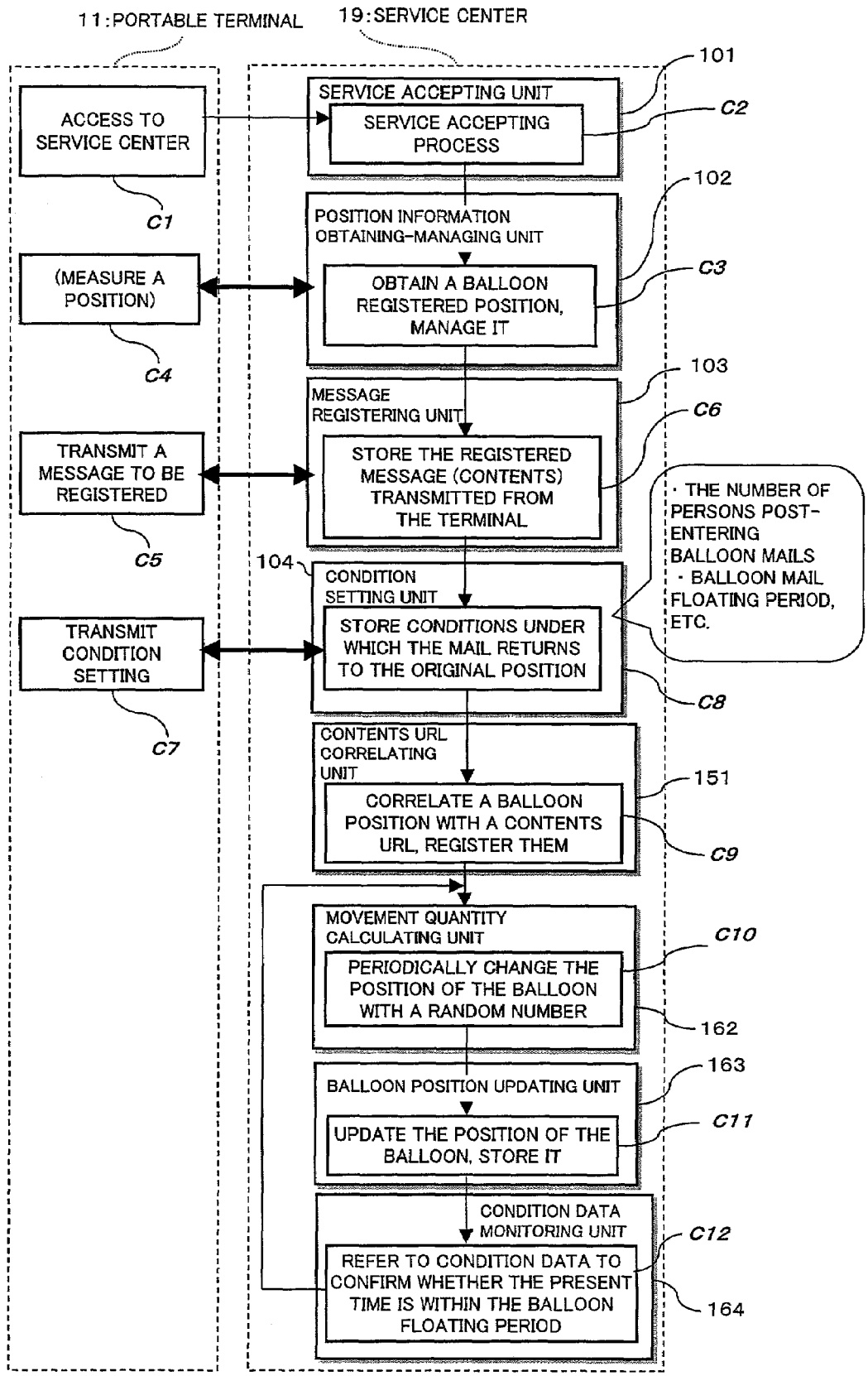
FIG. 18 is a sequence diagram for illustrating operations (registering and moving a balloon) of the service center shown in FIG. 17.

Next, an operation of the service center 19 in the above structure at the time of registration of a balloon will be described with reference to a sequence diagram (steps C1 to C12) shown in FIG. 18.

The user accesses to the service center 19 using the portable terminal 11 in order to register a balloon (sending a balloon register request; step C1). This request is accepted by the service accepting unit 101 of the service center 19 and processed (step C2). Since a type of the service request by the user is "balloon register requests" in this case, the position information obtaining-managing unit 102 obtains a registered position of the balloon, and manages it in, for example, the database 15 (information bubble registering step; step C3).

When the registered position of the balloon is the present position at this time, the position information obtaining-managing unit 102 receives position information measured by the portable terminal 11 (detected by the detecting unit 21) as the balloon position information 15A from the portable terminal 11 to obtain it (step C4). If the balloon is desired to be registered at a different position, it is necessary to specifically designate the position information.

The user then transmits supply information such as a message or the like to be appended to the balloon to be registered to the service center 19 using the portable terminal 11 (step C5). The service center 19 stores the service information as the contents 15C in, for example, the Web information outputting unit (Web server) 18b (step C6). At this time, a URL 15B of the contents 15C is generated.

The user transmits conditions ("floating period," "an upper limit value of the number of post-entering persons" and the like) under which the balloon returns to the original position (to the initial registered position), for example, to the service center 19 using the portable terminal (step C7). In the service center 19, the condition setting unit 104 generates and sets (stores) the condition data 15D as shown in FIG. 24 on the basis of the conditions (step C8).

In the service center 19, the contents URL correlating unit 151 correlates the balloon position information 15A with the contents URL 15B in the database 15 as described above, and registers them, thereby registering the balloon (step C9).

In this example, a registered position of a balloon, a registered message, and information on a setting of behavior of the balloon are separately transmitted to the service center 19. However, these pieces of information may be collectively transmitted to the service center 19. In other words, processes of obtaining a registered position of the balloon (step C3), storing a registered message (step C6), and setting the condition data 15D (step C8) are sequentially executed in the service center 19 in the above example, but these processes may be executed separately (in parallel).

Figure 23:
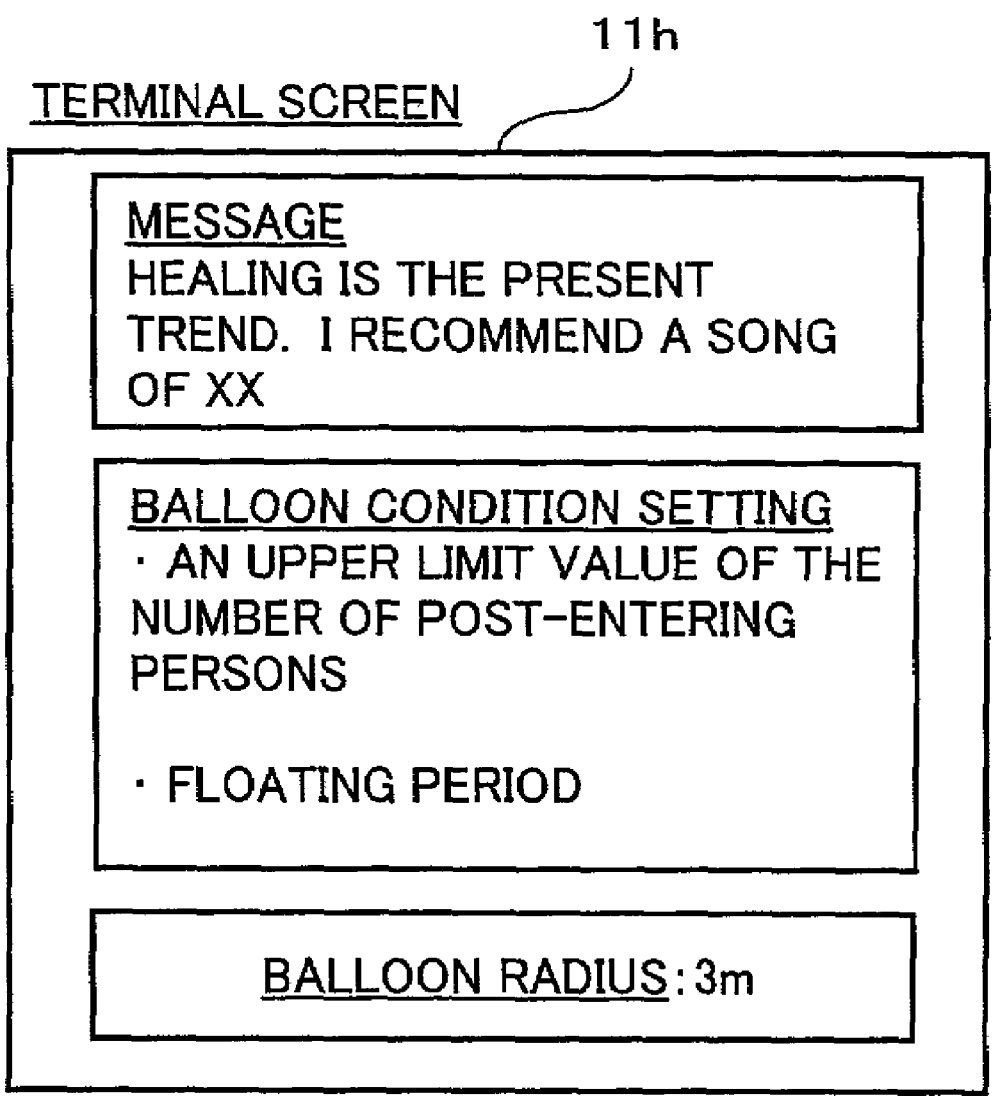
FIG. 23 is a diagram showing an example of a screen of a registered balloon on the portable terminal according to the embodiment.

In this case, the service center 19 provides an input form (refer to FIG. 23) for the above various information as contents or a mail to the portable terminal 11 in response to the above balloon register request, for example. The user inputs necessary information in the input form displayed on the display unit 11h of the portable terminal 11, and collectively transmits the necessary information along with the above position information to the service center 19.

Finally, the balloon position information 15A is correlated with the contents URL 15B of the supply information such as a message and the like in the database 15 so that the balloon is registered in the similar manner, although the service center 19 is required to select the information anyway.

When the registration of the balloon is completed as above, the service center 19 periodically updates a position of the balloon using a random number generated by the random number generating unit 161 while monitoring the condition data 15D, thereby randomly updating the position of the balloon (information bubble moving step; steps C10 to C12). When the condition data monitoring unit 164 confirms that an event satisfying the above condition data 15D occurs, the balloon position updating unit 163 updates the corresponding balloon position information 15A to, for example, the initial registered position information to move the balloon to the initial registered position.

(B2) Description of Confirmation of a State of Balloon

Figure 19:
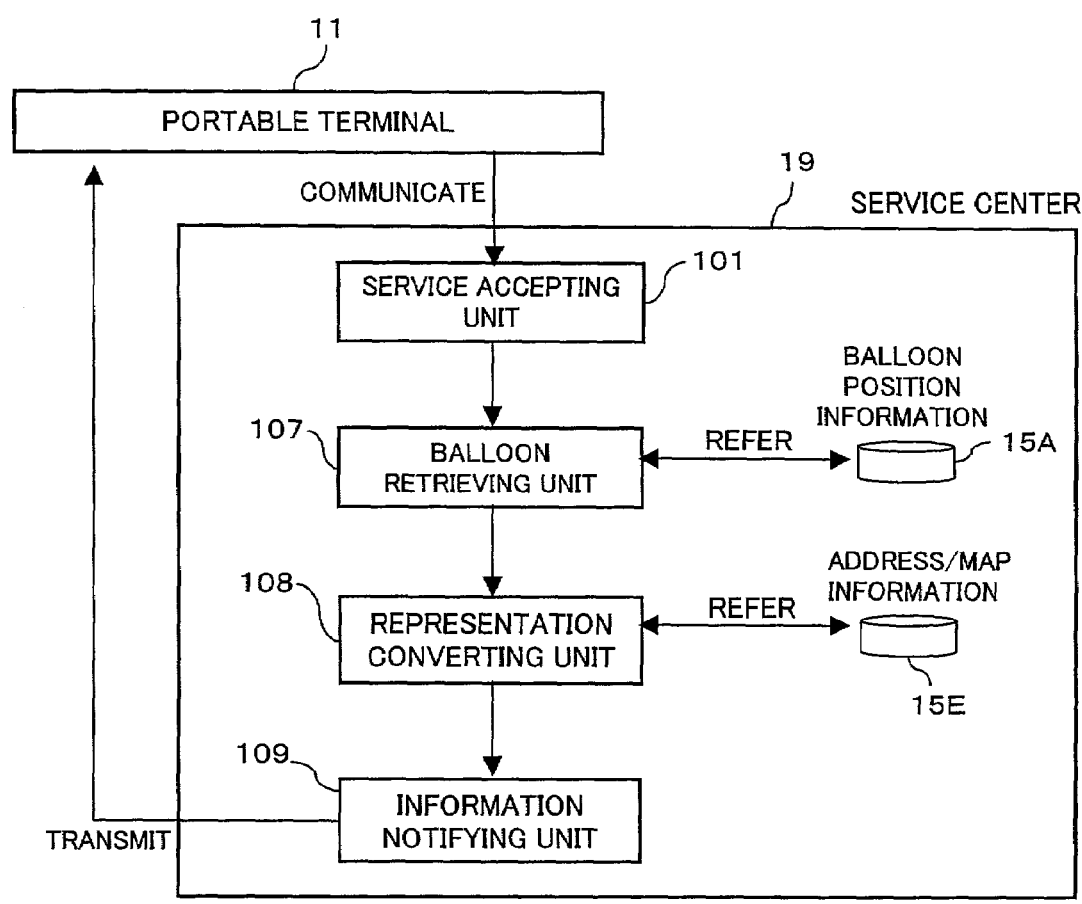
FIG. 19 is a block diagram showing structures of essential parts of the service center, focusing on a function of confirming a state of a balloon according to the embodiment.

Next, description will be made of when the user having registered a balloon desires to confirm a state of the registered balloon (for example, the present position). FIG. 19 is a block diagram showing structures of essential parts of the service center 19, focusing on a balloon state confirming function. As shown in FIG. 19, the service center 19 comprises an address/map information database 15E, a balloon retrieving unit 107, a representation converting unit 108 and an information notifying unit 109, etc., along with the above service accepting unit 101.

The address/map information database 15E holds either one of address information (city name, town name or the like) in the real physical space and map data used in a so-called car navigation system, or the both. The database 15E may be provided in the database 15, or provided separately from the database 15.

The balloon retrieving unit 107 is activated when a type of the service request from the portable terminal 11 accepted by the service accepting unit 101 is "balloon state confirm request," refers to the balloon position-contents URL data 15-1 (refer to FIG. 25) in the database 15 on the basis of a user identifier notified from the portable terminal 11 to obtain the balloon position information 15a corresponding to the user identifier.

The representation converting unit (information bubble position representation converting unit) 108 refers to the address/map information database 15E on the basis of the balloon position information (in concrete, latitude and longitude) obtained by the balloon retrieving unit 107, and converts the position information 15A (latitude and longitude) into a geographical representation form in the real physical space. The expression converting unit 108 can convert the position information 15A into a corresponding city name, town name or address, or convert the position information 15A into data in which a balloon is mapped (displayed) at a corresponding position on map data just like the car navigation system.

The balloon retrieving unit 107 and the representation converting unit 108 are accomplished as one function of, for example, the above-described extracting unit (refer to FIG. 2).

The information notifying unit (information bubble present position providing unit) 109 provides information obtained by the representation converting unit 108 as present position information on the balloon to the portable terminal 11 (of a person who has registered the balloon) that has made the inquiry (the balloon state confirm request). This function can be accomplished as one function of, for example, the above-described providing unit 41 (refer to FIG. 2).

Figure 20:
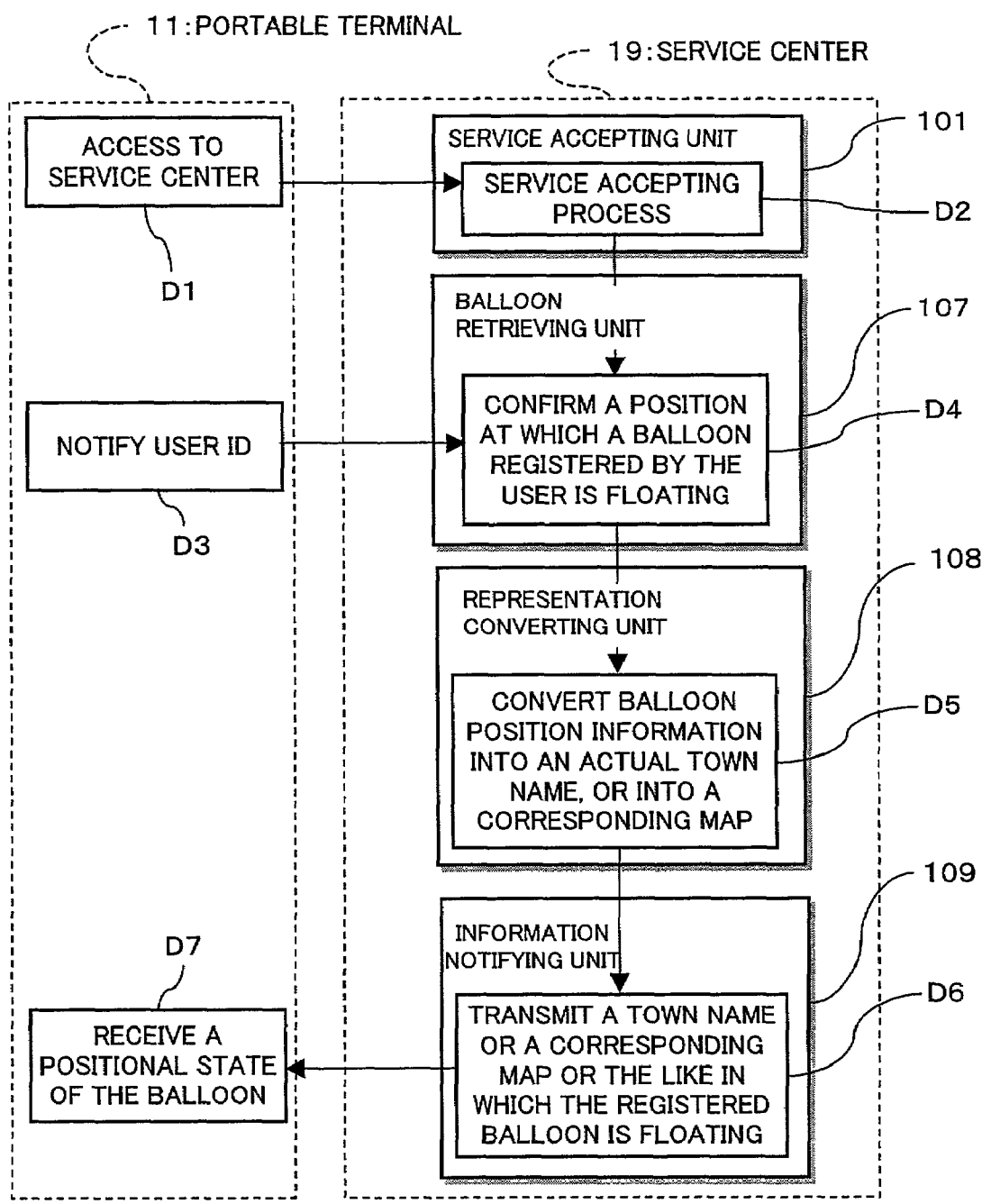
FIG. 20 is a sequence diagram for illustrating an operation (confirming a state of a balloon) of the service center shown in FIG. 19.

Next, detailed description will made of an operation of the service center 19 in the above structure at the time that a state of a balloon is confirmed with reference to a sequence diagram (steps D1 to D7) shown in FIG. 20.

When a user who has registered a balloon accesses to the service center 19 using the portable terminal 11 in order to confirm the present position of the balloon (balloon state confirm request sending; step D1), this request is accepted and processed by the service accepting unit 101 (step D2). The balloon retrieving unit 107 is activated since a type of the service request in this case is "balloon state confirm request", retrieves the balloon position information 15A registered by the user in the database 15 (balloon position-contents URL data 15-1) and obtains it (step D4) based on the user identifier (see step D3) notified by the user (the portable terminal 11).

The representation converting unit 108 converts the obtained position information 15A (latitude and longitude) into an actual city name or town name, or data representing the present position of the balloon on corresponding map data, or the both (step D5). The information notifying unit 109 notifies the portable terminal 11 that has made the inquiry (has registered the balloon) of it as balloon's location information (present position information) (steps D6 and D7).

FIG. 27 shows an example of a transmit data format from the service center 19 to the portable terminal 11. As shown in FIG. 27, in transmit data (a result of confirmation of a state of a registered balloon by the user) to the portable terminal 11, a transmission destination header 16 (telephone number information or an IP address) corresponding to the portable terminal 11 and a plural sorts of present position information 63 corresponding to respective registered balloons, which are combined with a contents identifier 62, are stored.

Whereby, the user of the portable terminal 11 can readily and intuitively recognize where the balloon registered by the user himself/herself is floating. Incidentally, it is possible to notify the portable terminal 11 of latitude and longitude as the present position information on the balloon. However, it is obvious that it is more convenient for the user that the position information 15A is converted into the above geographical representation, then notified it to the user.

The contents identifier 62 to be notified to the user may be the contents URL 15B when the user desires to know the present state [a state of post-entry of messages (the progress of a questionnaire) to be described later or the like] of the balloon (contents 15C) registered by the user. Basically, the contents identifier 62 is not necessarily the contents URL 15B. In other words, when the present state of the balloon (contents 15C) is disclosed to the user, it is sufficient to use the contents URL 15B as the contents identifier 62. When it is desired to conceal the present state of the balloon to the user, it is sufficient to use information irrelevant to the contents URL 15B.

The above result of confirmation of a state of a balloon registered by the user 60 may include data of a floating period, an upper limit value of the number of post-entering persons, or the number of persons having post-entered (record) of the condition data 15D (refer to FIG. 24). Namely, when the user having registered the balloon desires to confirm the setting of the condition data 15D, for instance, these data may be included.

The above function for notification of the present position of a balloon (the balloon retrieving unit 107, the representation converting unit 108 and the information notifying unit 109) may be omitted when the notification is unnecessary.

(B3) Description of Retrieval of a Balloon Registered by other User or Post-entering of a Message Next, description will be made of a case where a balloon registered by other user is retrieved, or a message is post-entered to the balloon.

Figure 21:
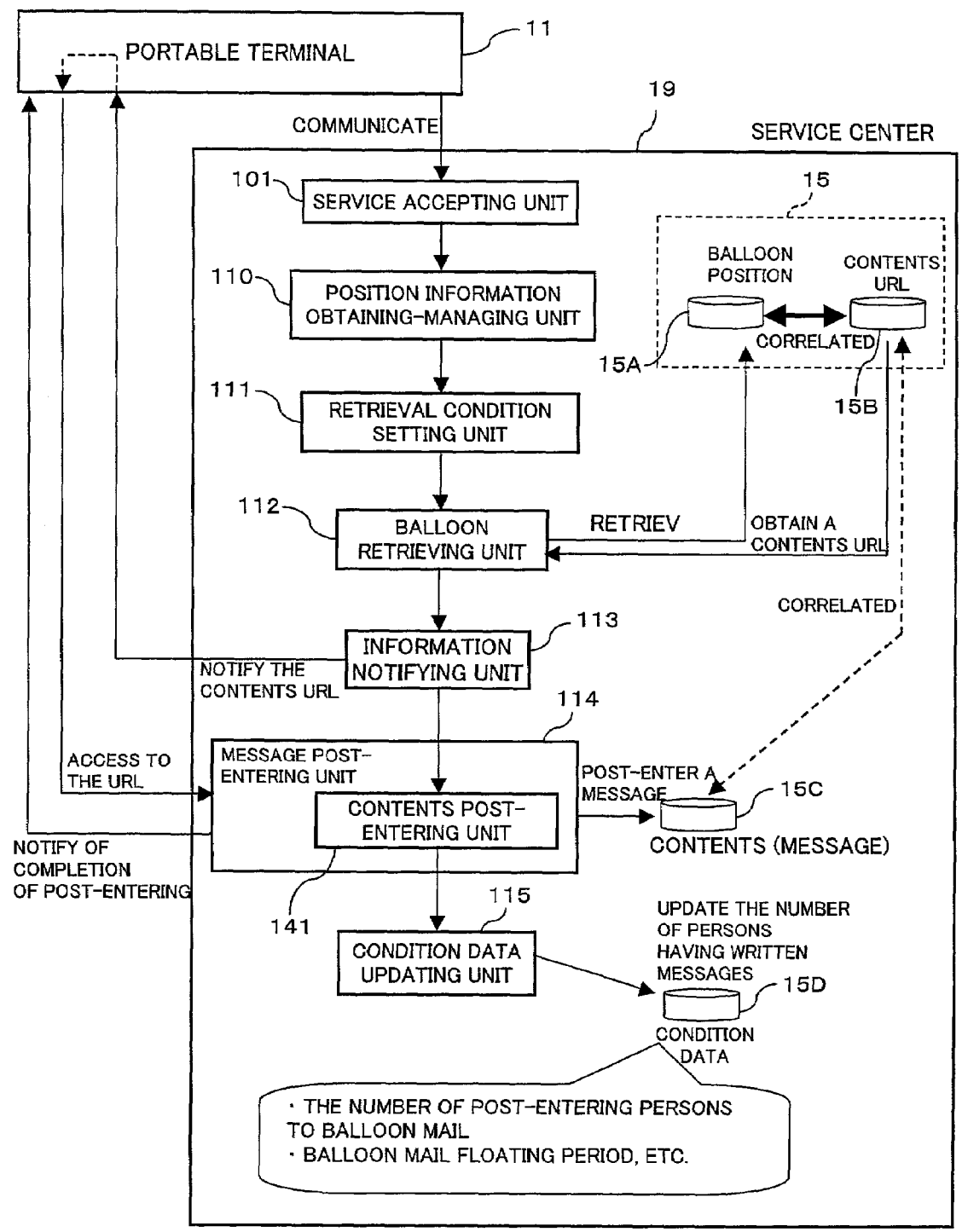
FIG. 21 is a block diagram showing structures of essential parts of the service center, focusing on a function of retrieving a balloon registered by another user and a function of post-entering a message to the same according to the embodiment.

FIG. 21 is a block diagram showing structures of essential parts of the service center 19, focusing on a function of retrieving a balloon registered by other user and post-entering a message. As shown in FIG. 21, the service center 19 comprises a position information obtaining-managing unit 110, a retrieval condition setting unit 111, a balloon retrieving unit 112, an information notifying unit 113, a message post-entering unit 114 and a condition data updating unit 115 along with the above service accepting unit 101.

The position information obtaining-managing unit 110 obtains position information detected (measured) by the portable terminal 11 from the portable terminal 11. The retrieval condition setting unit 111 sets a radius (distance) of an object of retrieval, thereby setting a space region (information) of the object of retrieval. In the case of the service "1" described above, a radius around the present position of the portable terminal 11 is set. In the case of the service "2", a distance from the present position of the portable terminal 11 in a direction in which the antenna of the portable terminal 11 is extending is set, for example.

The balloon retrieving unit 112 refers to the balloon position information 15A in the database, retrieves a balloon included in the above retrieval object space region or having an overlapping portion (that is, a balloon including the retrieval object space range information), and obtains a contents URL 15B correlated with the balloon. When the user uses the above service "1", for example, the balloon retrieving unit 112 retrieves a balloon existing within a space of a designated radius (100 m or the like) around the portable terminal 11, and obtains a contents URL 15B corresponding to the balloon. When the user uses the service "2", the balloon retrieving unit 112 retrieves a balloon existing within a designated distance in a direction in which the antenna is extending using the above retrieval vector V, and obtains a contents URL 15B corresponding to the balloon.

The information notifying unit 113 notifies the portable terminal 11 of the contents URL 15B obtained by the above balloon retrieving unit 112. The message post-entering unit (supply information updating unit) 114 accepts post-entering (updated information) to contents 15C accessed by the portable terminal 11 according to designation by the above contents URL 15B, and post-enters a message or the like to the contents 15C and updates the same by means of the contents post-entering unit 141. A balloon according to this embodiment functions as a mail [or a space moving bulletin board (BBS: Bulletin Board System)] moving in the real physical space, to which post-entering is possible.

The condition data updating unit 115 updates data of "the number of persons having post-entered (record)" (increases by one) of the condition data 15D (refer to FIG. 24) each time the contents post-entering unit 141 post-enters.

Incidentally, the position information obtaining-managing unit 110 may be accomplished as one function of the above-described first receiving unit 16 (refer to FIG. 2), for example. The retrieval condition setting unit 111 and the balloon retrieving unit 112 may be accomplished as one function of the above-described extracting unit 40, for example. The information notifying unit 113 may be accomplished as one function of the above described providing unit 41. The message post-entering unit 114 (contents post-entering unit 114) and the condition data updating unit 115 may be accomplished as one function of the above-described Web information outputting unit 180b, for example.

The position information obtaining-managing unit 110 may be common (shared) to the position information obtaining-managing unit 102 shown in FIG. 17. The balloon retrieving unit 112 may be common (shared) to the balloon retrieving unit 107 shown in FIG. 19. Similarly, the information notifying unit 113 may be common (shared) to the information notifying unit 109 shown in FIG. 19.

Figure 22:
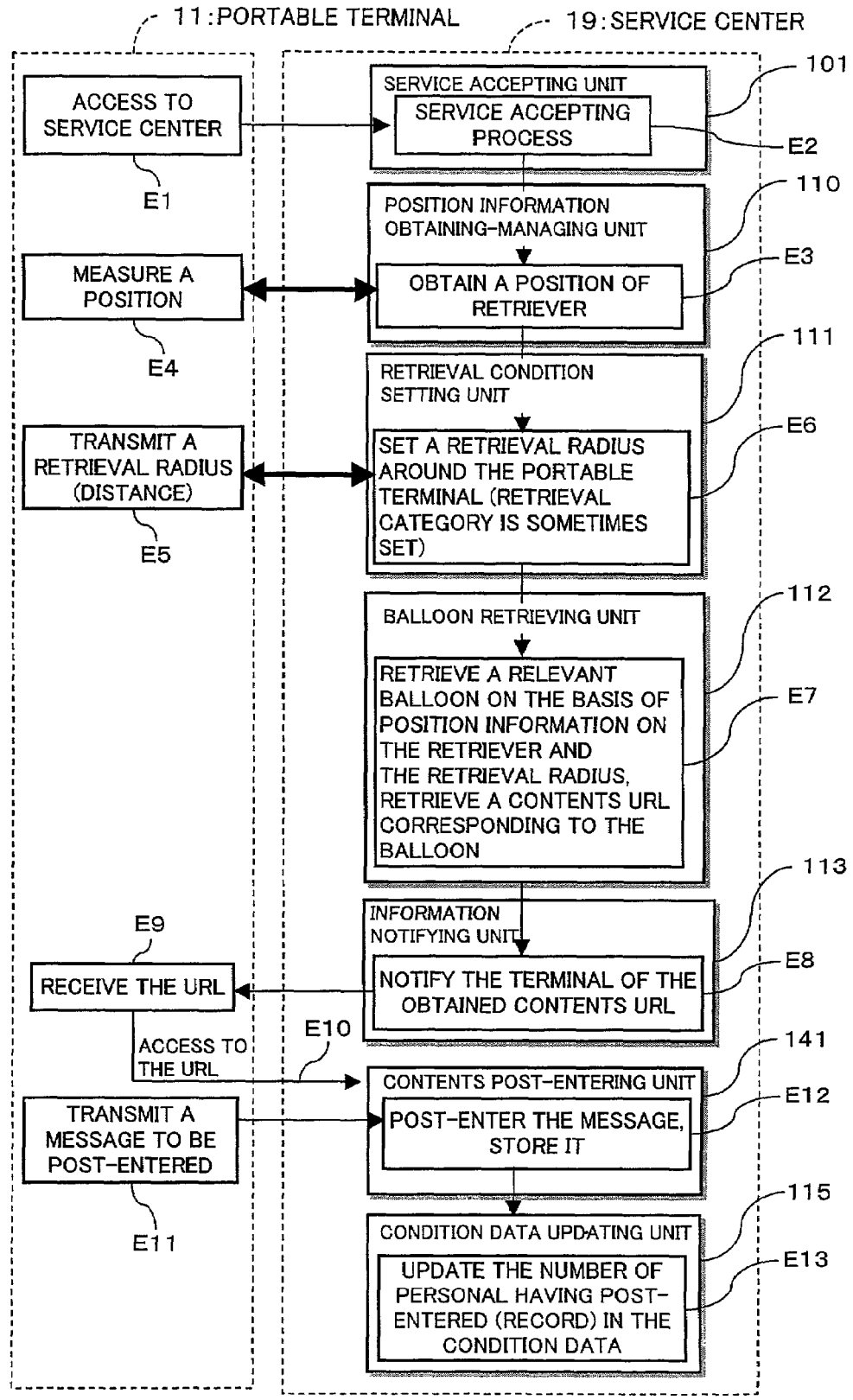
FIG. 22 is a sequence diagram for illustrating operations (retrieving a balloon registered by another user and post-entering a message) of the service center shown in FIG. 21.

Next, an operation of retrieving a balloon registered by other user and post-entering a message in the service center 19 in the above structure will described in detail with reference to a sequence diagram (steps E1 to E13) shown in FIG. 22.

When the user accesses to the service center 19 using the portable terminal 11 in order to retrieve a space (balloon) (balloon retrieve request sending; step E1), the service accepting unit 101 of the service center 19 accepts the request, and processes it (step E2). Since a type of the service request by the user is "space retrieve request" in this case, the position information obtaining-managing unit 110 obtains position information (latitude, longitude, altitude and the like) on the portable terminal 11 (retriever) (step E3). Practically, the position information obtaining-managing unit 110 obtains it by receiving position information measured (step E4) by the portable terminal 11 from the portable terminal 11, for example.

The portable terminal 11 then transmits information for designating a space region that is an object of retrieval [radius (distance)] to the service center 19 (step E5). The retrieval condition setting unit 111 receives this information, and the retrieval condition setting unit 111 sets a retrieval object region around the portable terminal 11 specified by the above information (step E6).

Incidentally, there is a case where "a retrieval category" is set. When the user intentionally desires to retrieve only a balloon, "balloon" is set as the retrieval category, for example. When the user desires to retrieve an information bubble such as a building or the like, this effect is set as the retrieval category. If no retrieval category is set, the user may accidentally hit a balloon floating in the real physical space during the space retrieval.

In this case, the position information on the portable terminal 11 and the information for designating a space range of an object of retrieval may be collectively transmitted to the service center 19 at a time, as well. In the above example, the process of obtaining the position information on the portable terminal 11 (step E3), and the process of setting retrieval conditions (step E6) are sequentially performed in the service center 19. However, the processes may be performed separately (in parallel).

When the retrieval condition setting unit 111 sets the retrieval conditions as above, the service center 19 refers to the balloon position information 15A by means of the balloon retrieving unit 112 on the basis of the position information on the portable terminal 11 and the radius (distance) of retrieval, retrieves a balloon hitting the retrieval conditions (contained in the retrieval object space range or having a overlapping portion), and obtains (extracts) a contents URL 15B corresponding to the balloon (extracting step; step E7).

The obtained contents URL 15B is notified (provided) to the portable terminal 11 from the information notifying unit 113 (providing step; step E8), and received by the portable terminal 11 (step E9). After that, the user of the portable terminal 11 accesses to the received contents URL 15B (step E10), refers to corresponding contents 15C, and performs an operation to post-enter a message or the like to the contents 15C (post-entry message transmitting; step E11).

The contents post-entering unit 141 of the service center 19 accepts the above message to be post-entered (updated information of the contents 15C), the content post-entering unit 141 actually writes the received message or the like in the contents 15C to update the contents 15C (step E12).

Figure 28:
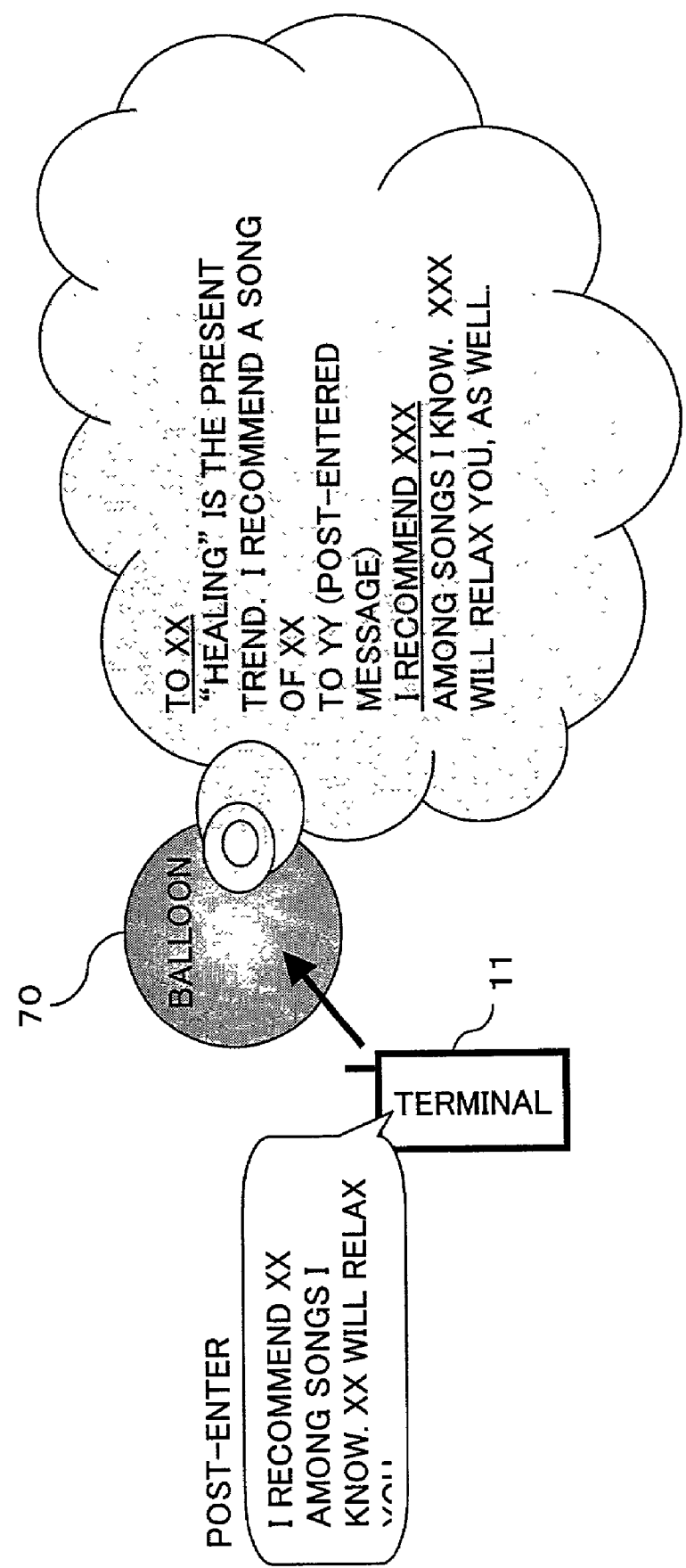
FIG. 28 is a schematic diagram for illustrating an example of post-entry to a balloon according to the embodiment.

FIG. 28 shows an image at this time. FIG. 28 shows an image in the case where a certain portable terminal 11 hits a balloon 70 in space retrieval, and post-enters a message ("I recommend xxx among songs I know. xxx will relax you, as well.") in a message ("'healing' is the present trend. I recommend a song of xx.") displayed in the contents 15C corresponding to the balloon 70. Incidentally, the post-entered message may be independently registered as a small balloon included in the balloon 70.

When the contents 15C is updated as above, the condition data updating unit 115 updates a relevant "the number of persons having post-entered (record)" (refer to FIG. 24) in the condition data 15D monitored by the condition data monitoring unit 164 on the basis of the contents identifier. When "the number of persons having post-entered" reaches "the upper limit value of the number of post-entering persons" by this update, the relevant balloon is moved to a specific position (initial registered position) by the balloon moving unit 106, as stated above.

A hit of the balloon 70 by the user in space retrieval will caused by that the user intentionally carries out the above retrieving procedure. Alternatively, a retrieval space designated by the user accidentally contacts with the balloon 70 so that a hit of the balloon unintentionally occurs since a retrieval radius of the portable terminal 11 is set to a several meters in the service "1".

By using the system 9 [space information service (balloon mail service)] as above, it becomes possible to carry out various modes of the service, as follows:

(1) Advertising Balloon Service

When it is desired to advertise a good or a service to many and unspecified persons, the advertiser registers a balloon (advertising balloon) related to advertisement information (advertisement contents) as supply information on the service center 19. The advertising balloon randomly moves in the real physical space as stated above, so that a small number of registered advertising bubbles can provide a great effectiveness of advertising without registering a number of fixed information bubbles in many places. The advertiser can thereby reduce a cost of advertisement.

A size (bubble radius) of the above advertising balloon may be freely set according to a cost of advertisement of the advertiser. Further, a size of the balloon may be changed according to the present position of the balloon such that a large bubble radius is set in a densely populated area such as a city or the like since the hit rate is high even if the size of the advertising balloon is small, whereas a small bubble radius is set in a depopulated area since the hit rate is small, for example.

In the case of an advertising balloon, it is not necessary to return the advertising balloon to the advertiser (initial registered position). In such case, it is possible to nullify the balloon by deleting information relating to the balloon from the data base 15 when a predetermined period is elapsed, or when the number of times that the balloon is hit (the number of referring persons) reaches a predetermined number of times. Similarly, it is not necessary to post-enter a message by a user in the case of the advertising balloon. Therefore, a function of the message post-entering unit 114 (contents post-entering unit 141) may be omitted.

(2) Questionnaire Balloon Service

When a person who provides a good or a service (a company, a shop, an individual or the like) desires to collect information on the goods or the service through questionnaire, for example, the person registers a balloon (questionnaire balloon) related to a questionnaire form (contents) as supply information on the service center 19. When the person desires to collect results of the questionnaire on 100 persons, for example, the person sets "100" to "the upper limit value of the number of post-entering persons" of the above condition data 15D.

The questionnaire balloon randomly moves in the real physical space until messages post-entered by 100 persons are obtained. When results of the questionnaire on 100 persons are obtained, the balloon returns to the original position.

Accordingly, it is possible to obtain results of questionnaire on persons in necessary numbers using one (or a small number of) questionnaire balloon without registering fixed information bubbles for questionnaire on 100 persons in different places. As a result, the provider can readily obtain a number of results of questionnaire from many and unspecified users, thereby using the results in marketing of the good or service even at a low cost.

The questionnaire balloon is not randomly moved, but may be circulated in a specified place (route) in which the provider desires to obtain results of the questionnaire by setting the behavior thereof, as a matter of course. This service can be applied to not only questionnaire but also various researches on users.

(3) Prize Balloon Service

This service is, for example, that a balloon (prize balloon) related to information (prize contents) that a prize good or money will be offered to a winner as supply information is registered on the service center 19 and floated in the real physical space, and the prize good or money is offered to a user who hits the prize balloon in space retrieval.

For example, a shop selling goods such as a department store or the like registers a prize balloon related to a message (contents) that one hundred thousand yen will offer, for example, as a campaign or the like on the service center 19, and floats the prize balloon in the vicinity of its own shop or inside the shop by setting the behavior. If this campaign is notified to many and unspecified users over the Internet or the like, it is expected that a number of users gather in the neighbor of the shop in order to retrieve the prize balloon.

Namely, the shop selling goods can provide a service such as treasure hunting using the prize balloon, expecting a great effectiveness of attracting people.

However, if the user sets a radius (distance) of the object of retrieval to a long distance (large area) such as a several hundred meters or several kilometers in the service "1", the user can easily hit the prize balloon when the prize balloon exists within a several-hundred-meters or several-kilometers range around the user. In such case, it is necessary to limit the retrieval distance to several meters to several tens meters in the service "2".

The user having hit the prize balloon presents, for example, the display screen ("win one hundred thousand yen", for instance) to the shop, thereby receiving the good or prize. In order to determine whether the user is a proper person who has hit the prize balloon, thus a proper recipient, the user who has hit the prize balloon needs to post-enter information such as a user identifier or the like that proves that the user is the recipient in the contents 15C, and presents it, for example.

Since a prize balloon of a large bubble is easily hit, the bubble radius is generally set to small. Since the number of hits by the users is the number of winners in the case of a prize balloon, such condition that the prize balloon is nullified when the number of hits reaches the number of winners is set as a setting of behavior of the prize balloon. In such case, it is possible to hold down a cost of registration of the prize balloon since even the prize balloon of the minimum radius can yield a necessary number of winners. Alternatively, it is possible to register prize balloons in number equal to the number of winners, each of which will be nullified when a user hits the prize balloon.

The prize balloon may be registered not only at a shop but also in a place that the registrant desires to gather people such as an event site, an amusement facility or the like.

By moving a balloon in the real physical space and freely (arbitrarily) setting behavior of the balloon by the user (or the service center 19), it is possible to flexibly realize various modes of the space information service such as an advertising balloon service, a questionnaire balloon service, a prize balloon service and the like.

(C) Description of Other Service Modes

Next, a display service and a collection service will be described as other service modes using the space information service system 9 described above. Note that, basically, the balloon (information bubble) does not move [that is, on the assumption of the basic system structure described in item (A)] when not specifically mentioned in the following description.

(C1) Display Service

Figure 29:
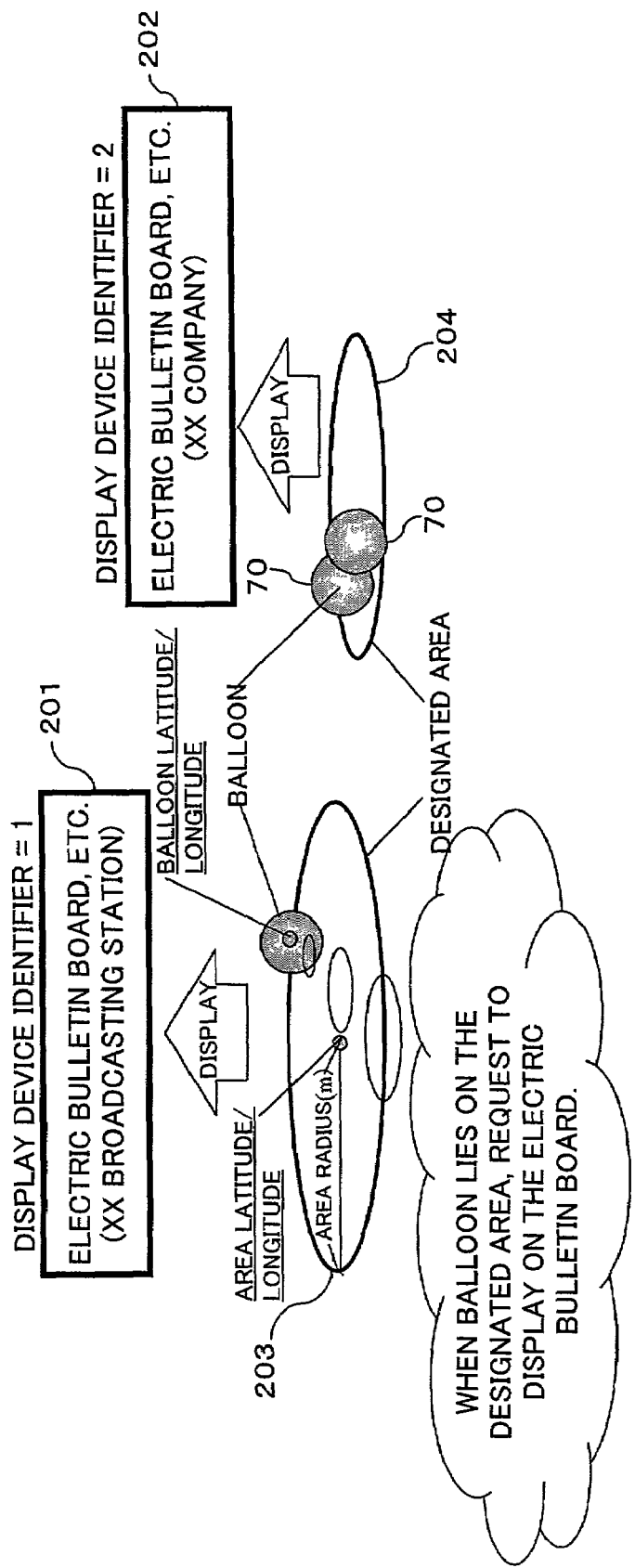
FIG. 29 is a diagram for illustrating a display service using a space information service system according to the embodiment.

FIG. 29 is a diagram for illustrating a display service using the space information service system 9 described above. FIG. 29 depicts the display service that when a balloon 70 is registered in a certain designated area 203 (204), information such as a message or the like linked to the balloon 70 is displayed on a display system such as an electric bulletin board 201 (202) or the like on a street as a service image under predetermined conditions.

The designated area 203 (204) is designated by position information (latitude and longitude) in the real physical space and a radius (area radius) around the position, for example, as shown in FIG. 29.

Figure 30:
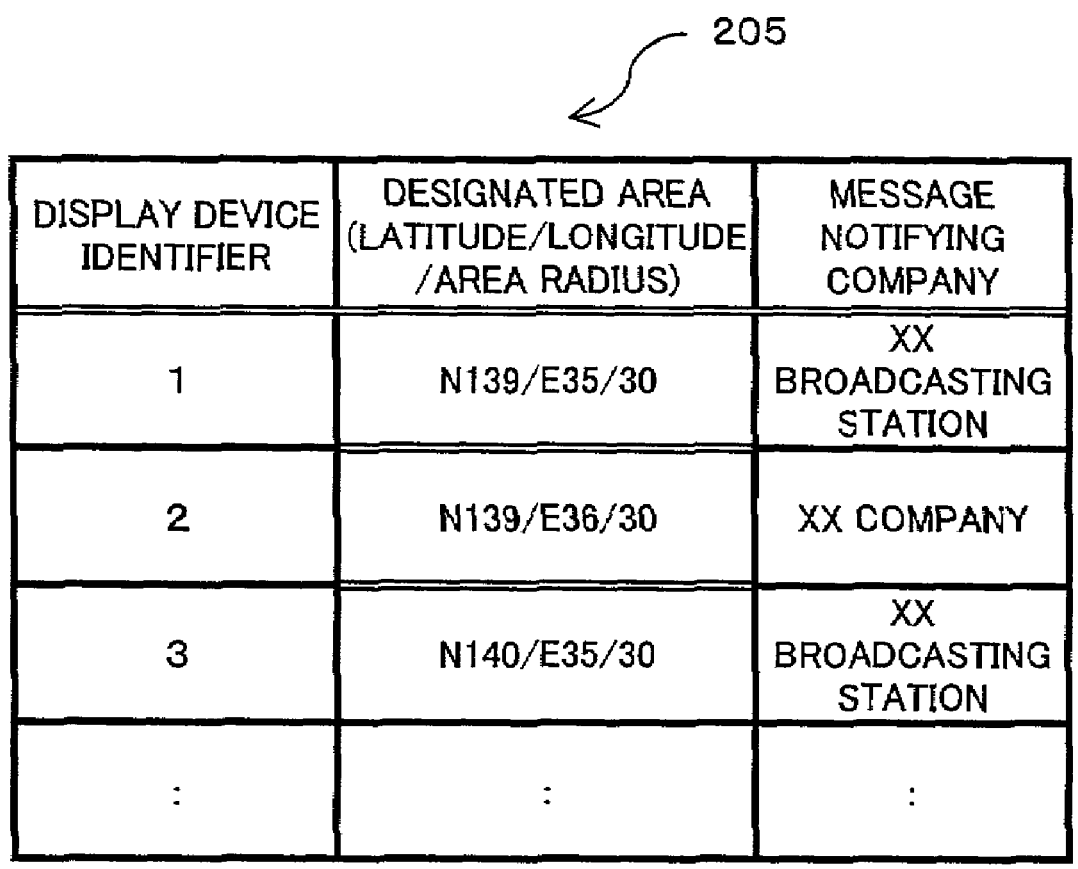
FIG. 30 is a diagram showing an example of area data in a display service shown in FIG. 29.

The service center 19 has area data 205 in which the designated area information is correlated with a display device identifier [identifier of the electric bulletin board 201 (202)], and a name of a company, a broadcasting station or the like (hereinafter generally referred as a display service company) which executes the display service to the electric bulletin board 201 (202), as shown in FIG. 30, for example. It is determined whether the balloon 70 exists within the designated area 203 (204) on the basis of the above designated area information and registered position information for the balloon 70.

Figure 34:
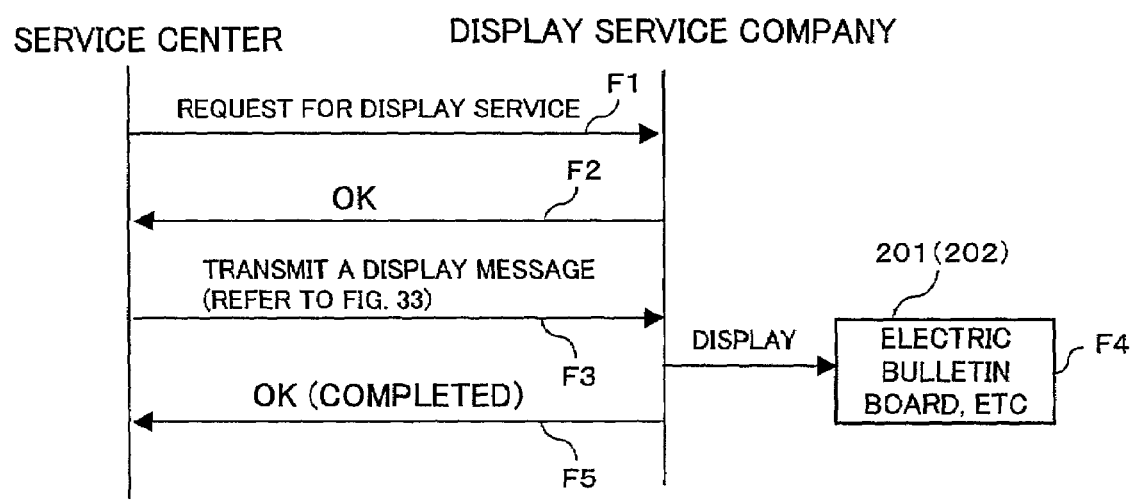
FIG. 34 is a diagram showing a data transmit/receive sequence among the service center, a display service company and an electronic bulletin board in the display service shown in FIG. 29.

When it is determined as a result that the balloon (when even only a part thereof) exists on the designated area 203 (204), the service center 19 refers to the above area data 205, and requests the display service company corresponding to the designated area 203 (204) to display information (contents) such as a message or the like linked to the balloon 70 on the electric bulletin board 201 (202), as shown in FIG. 34, for example (step F1).

Figure 35:
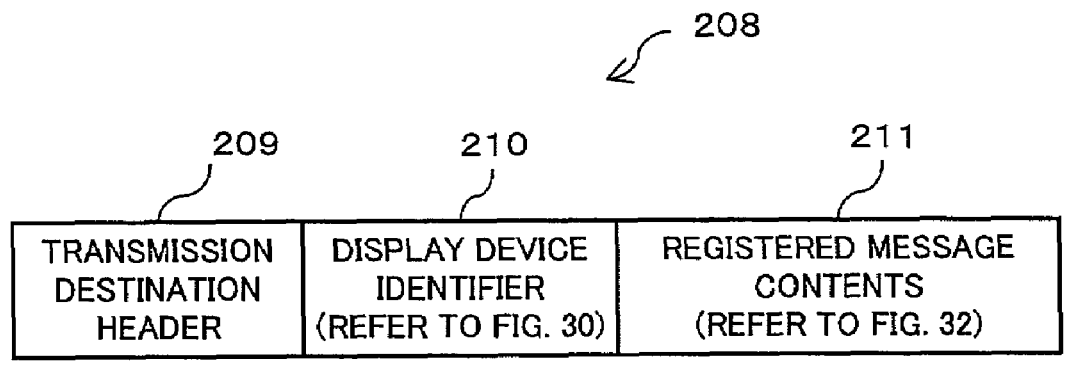
FIG. 35 is a diagram showing an example of a transmit data format for a display message to be transmitted to a display service center from the service center in FIG. 34.

When accepting the request, the display service company requested to display notifies the service center 19 of it (OK) (Step F2). The service center 19 receives the notification, and transmits a message or the like of the balloon 70 desired to be actually displayed to the display service company (step F3). FIG. 35 shows an example of a transmit data format to the display service company. As shown in FIG. 35, a transmission destination header (telephone number information or an IP address of the display service company) 209, a display device identifier 210, registered message contents 211, etc. are stored in transmit data 208 of the display message.

When the display service company receives the transmit data 208, the display service company displays the received registered message contents 211 on the electric bulletin board 201 (202) identified by the display device identifier 210 (step F4), and notifies the service center 19 that the display is completed (step F5).

Figure 31:
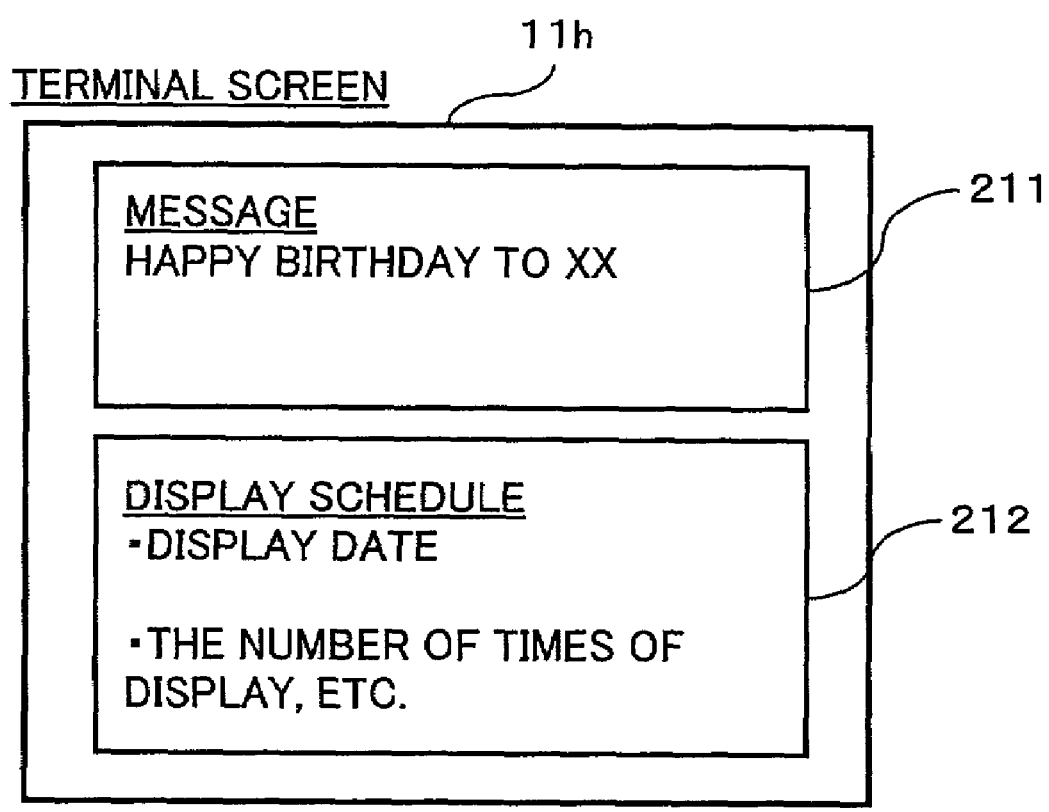
FIG. 31 is a diagram for illustrating an example of a screen of a registered message and a display schedule on the portable terminal in the display service shown in FIG. 29.

A period for which the message is displayed or the number of times that the message is displayed on the electric bulletin board 201 (202) can be designated by the user or the service center 19. In the case where the user designates, when the user accesses to the service center 19 using the portable terminal 11 in order to use the display service, the service center 19 provides an input form (contents) having a message input column 211 and a display schedule input column 212 as shown in FIG. 31 to the portable terminal 11.

With the contents being displayed on the display unit 11h (refer to FIG. 31), the user of the portable terminal 11 inputs a message that the user desires to register in the message input column 211, inputs a display schedule [display date and time (or display period), the number of times of display, etc.] in the display schedule input column 212, then transmits them to the service center 19. At this time, position information (latitude, longitude, etc.) on the portable terminal 11 is also notified to the service center 19.

The service center 19 gives a registered message identifier to each message transmitted from the portable terminal 11, and registers it as contents. The service center 19 then generates registered message (contents) data 206, as shown in, for example, FIG. 32, and generates schedule data 207 in which the above registered message identifier is correlated with the display schedule transmitted from the portable terminal 11 for each user, as shown in, for example, FIG. 33.

The service center 19 manages the message (contents) and the display schedule therefor registered by each user according to the registered message data 206 and the schedule data 207. After that, the service center 19 monitors the schedule set according to the schedule data 207. When the service center 19 finds a registered message whose display date and time comes, the service center 19 requests the display service company corresponding to the designated area 203 (204) correlated with the registered message to display the message, as above.

By designating the display schedule as this, it is possible to automatically display a message of birthday celebration (refer to message "1" in FIG. 32, for example) of an acquaintance or friend on the electric bulletin board 201 (202), or periodically or a periodically display an advertising message (refer to message "2" in FIG. 32, for example) of a company or shop several times on the electric bulletin board 201 (202), for example.

Figure 36:
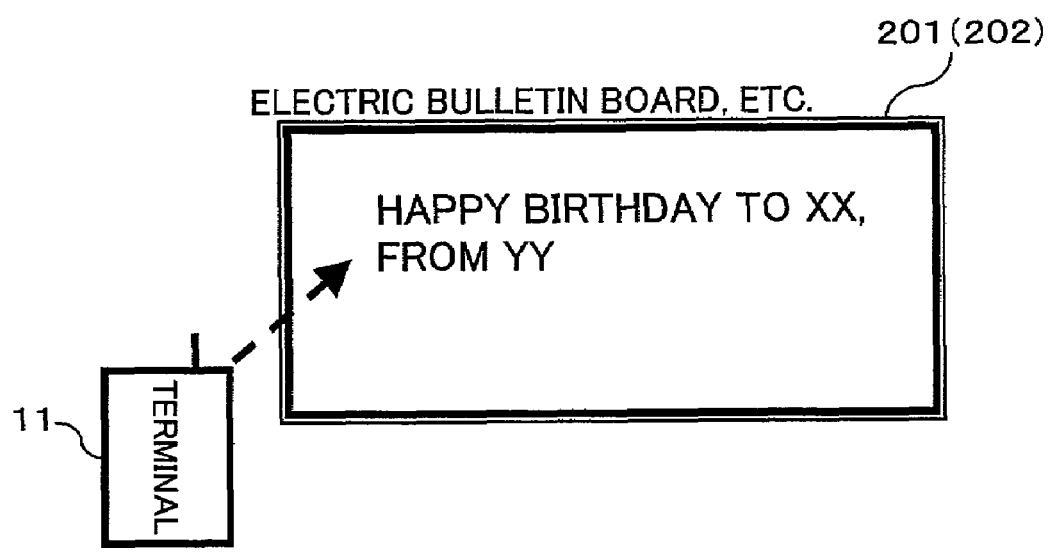
FIG. 36 is a schematic diagram showing an example of a message display to the electronic bulletin board in the display service shown in FIG. 29.

FIG. 36 shows an image in which a message of birthday celebration is displayed in a designated date and time (at 6 p.m. on the 15th day of Jan., 2001) only once (refer to the schedule data 207 in FIG. 33) on the electric bulletin board 201 (202) corresponding to the designated area 203 (204). In the above example, the date and time are designated. However, it is alternatively possible to designate a display period, as a matter of course.

In the above display service, it is possible to apply the balloon mail service thereto. For example, it is possible to provide a service such that the above balloon 70 is moved (circulated) in a plurality of designated areas, and the same message or different messages are successively displayed on the electric bulletin boards disposed in different places.

When an advertisement service such that the electric bulletin board on which a message is to be displayed is changed for each season, for example, it is sufficient to circulate only one balloon 70, which allows an advertisement cost to be held low.

(C2) Collection Service

Next, description will be made of a service mode in which a collection service such as contents collection or point collection is provided to a user using the above space information service system 9. The content collection service signifies a service that when the user refers to all balloons (contents) in a predetermined number displaying characters such as animals or the like and collects them, a good (premium) or prize money is presented to the user. The point collection service signifies a service that when the user refers to a specific balloon (contents), a point is given to the user, and a good or money (or merchandize coupon) corresponding to the points is presented to the user.

Figure 37:
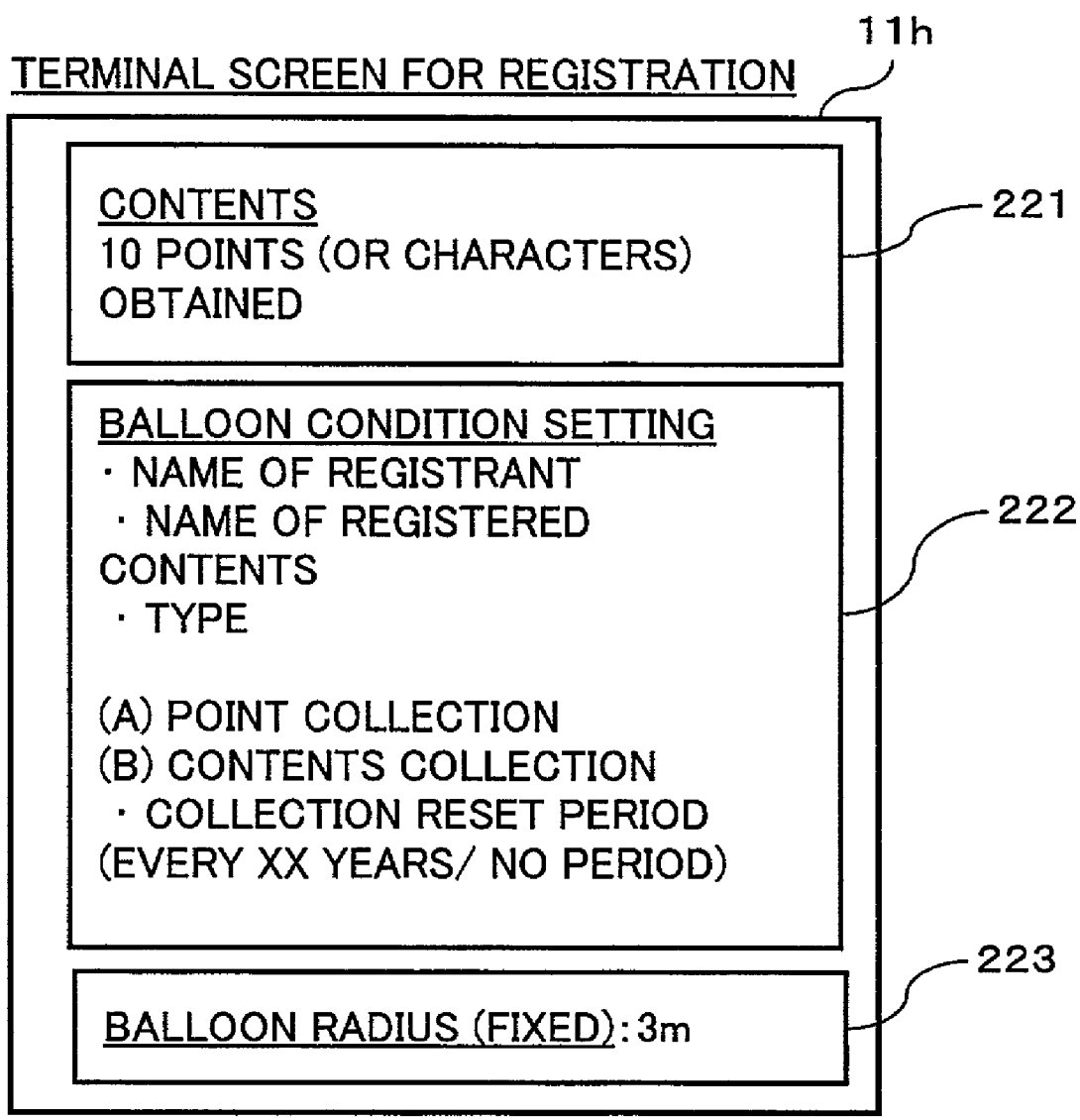
FIG. 37 is a diagram showing an example of a screen of registration on the portable terminal for illustrating a collection service using the space information service according to the embodiment.

In executing this service, the service provider (a department store, a zoo or the like) accesses to the service center 19 to request the service center 19 to register the service. The service center 19 having received the register request provides registration form contents having various input columns 221 to 223 for inputting (registering) information necessary to execute the service, such as contents that the service provider desires to register, balloon condition setting information [name of registrant, name of registered contents, a type of collection (point collection or contents collection), a collection reset period (every xx years or no period), etc.], a balloon radius (bubble radius), etc. as shown in, for example, FIG. 37.

With the registration form contents being displayed on the display unit 11h, the user inputs necessary information in the input columns 221 to 223 in the portable terminal 11, and transmits it to the service center 19. The contents are a message or the like representing the number of points that the user can obtain when accessing to the contents, for example, in the case of the point collection service. In the case of the contents collection (character collection to be described later), the contents are data representing a character's name or image, for example.

The service center 19 manages various information transmitted from the portable terminal 11 as registered condition data 224 as shown in, for example, FIG. 38 for each user [registering user (registrant) identifier]. FIG. 38 depicts that four kinds of information, that is, a contents identifier for identifying contents registered by the user, a type of collection service to be provided by the contents (collection type), a collection maximum value representing a maximum value of the number of contents that are an object of the collection in the case of the collection service, and a collection reset period representing a period in which the number of collected contents or points is automatically reset, are managed for each user.

Figure 39:
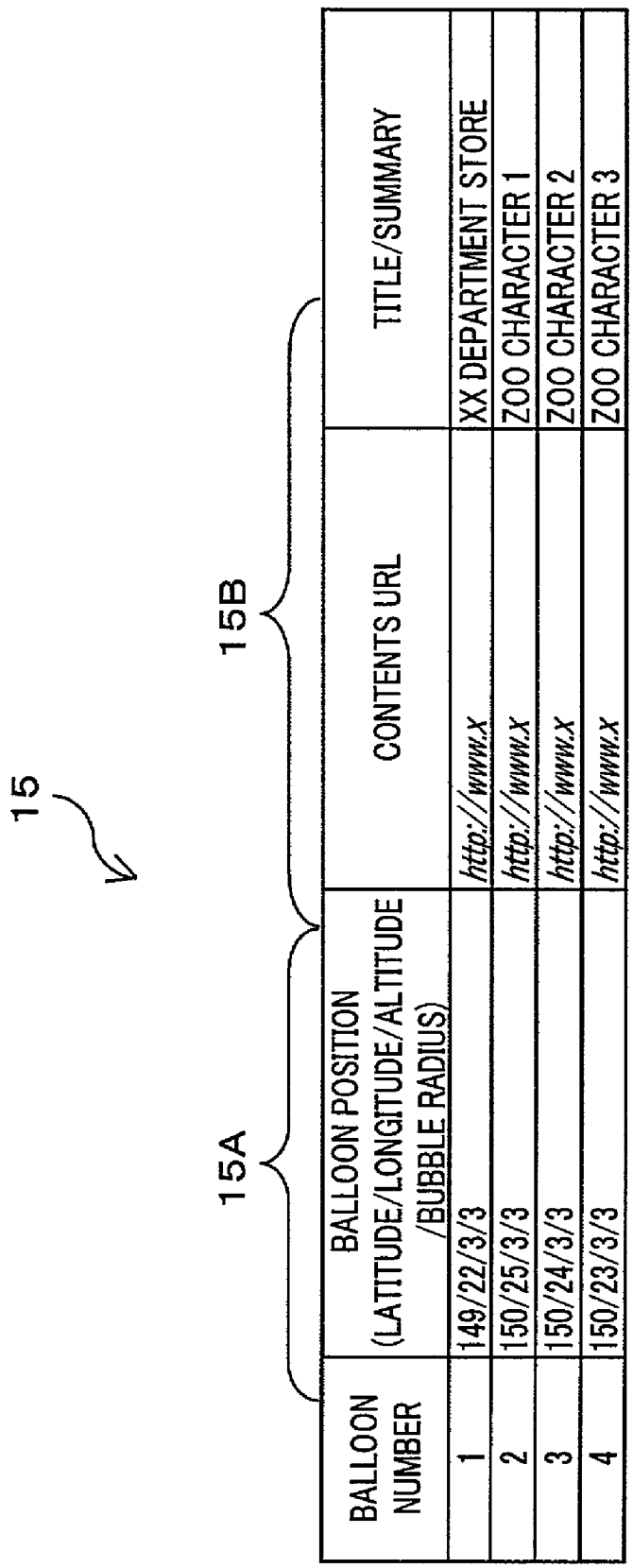
FIG. 39 is a diagram showing an example of registered contents in the database on the service center's side used in the collection service using the space information service system according to the embodiment.

In this case, the service center 19 correlates position information (balloon position information) 15A transmitted from the portable terminal 11 with the above contents URL 15B, and registers them on the database 15 as shown in FIG. 39, for example, thereby virtually registering a balloon linked with the contents URL 15B (contents) in a place in the real physical space specified by the position information 15A.

FIG. 39 also depicts that a title or summary of the registered contents is managed at each balloon number. When providing the contents URL 15B to the portable terminal 11, the service center 19 also provides a corresponding title or summary, so as to make the user of the portable terminal 11 recognize which contents are linked to the contents URL 15B.

At this time, the service center 19 manages an identifier of the contents to which the user has accessed, a type of collection, a collection maximum value (the number of all characters; 6, for example), and a result of accumulation (record), etc. for each user identifier in the collection data 226 as shown in, for example, FIG. 40.

When the collection type is the contents collection service, information on accumulated names or numbers of contents collected by the user is stored in the above accumulation result (record). When the collection type is the point collection service, an accumulated value of points obtained for each contents accessed by the user is stored in the accumulation result (record).

By referring to the accumulation result (record), it is possible to know the number of points obtained by a corresponding user (for example, user 1), or information about which character contents a corresponding user (for example, user 2) has already accessed to (collected), or which character contents the user has not yet accessed to.

The service center 19 provides the accumulation result (record) to the portable terminal 11 at an appropriate timing that the portable terminal 11 makes a request, or that the accumulation result gets into a predetermined state (for example, when all predetermined contents are collected). The user of the portable terminal 11 can know the present state of the collection.

Figure 41:
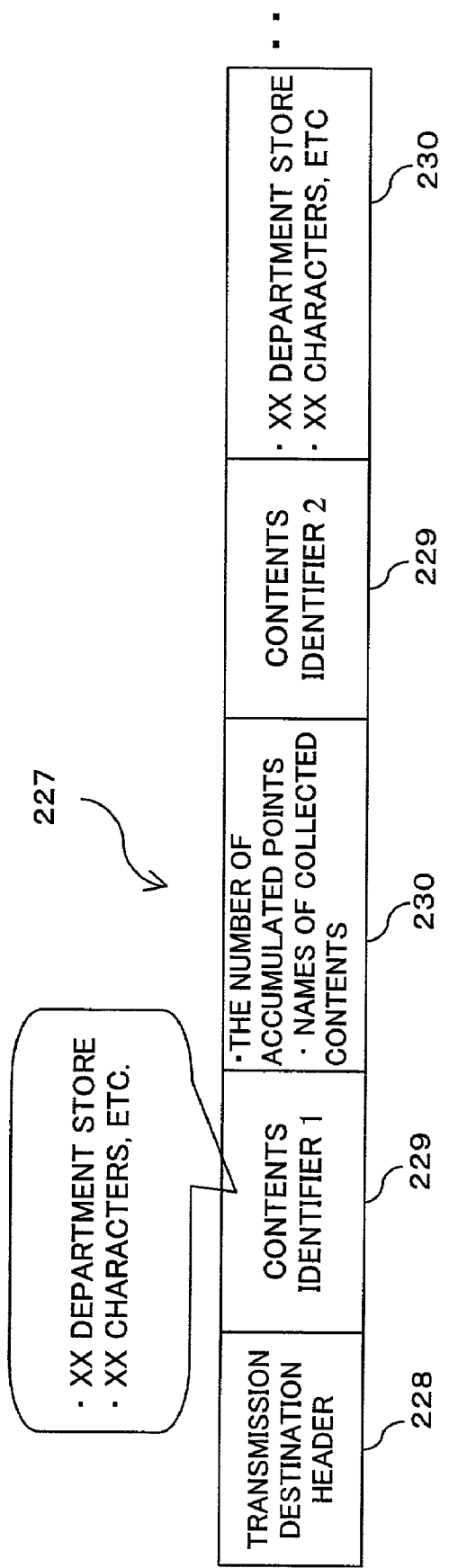
FIG. 41 is a diagram showing an example of a data format for data (notification of a state of collection) to be transmitted to the portable terminal from the service center in the collection service using the space information service system according to the embodiment.

FIG. 41 depicts an example of a format for transmit data (collection state notification) 227 to the portable terminal 11 from the service center 19 at this time. As shown in FIG. 41, a transmission destination header (telephone number information or IP address) 228 is set in the collection state notification 227. Besides, contents identifiers 229 and accumulation results (the number of accumulated points, names of collected contents or the like) for each contents accessed by the user are set in the collection state notification 227. Using this notification 227, the present state of collection is notified to a desired destination terminal such as the portable terminal 11 or the like corresponding to the transmission destination header 228.

In this case, the contents identifier 229 to be notified to the portable terminal 11 is not necessarily the contents URL 15B, basically.

Figure 42:
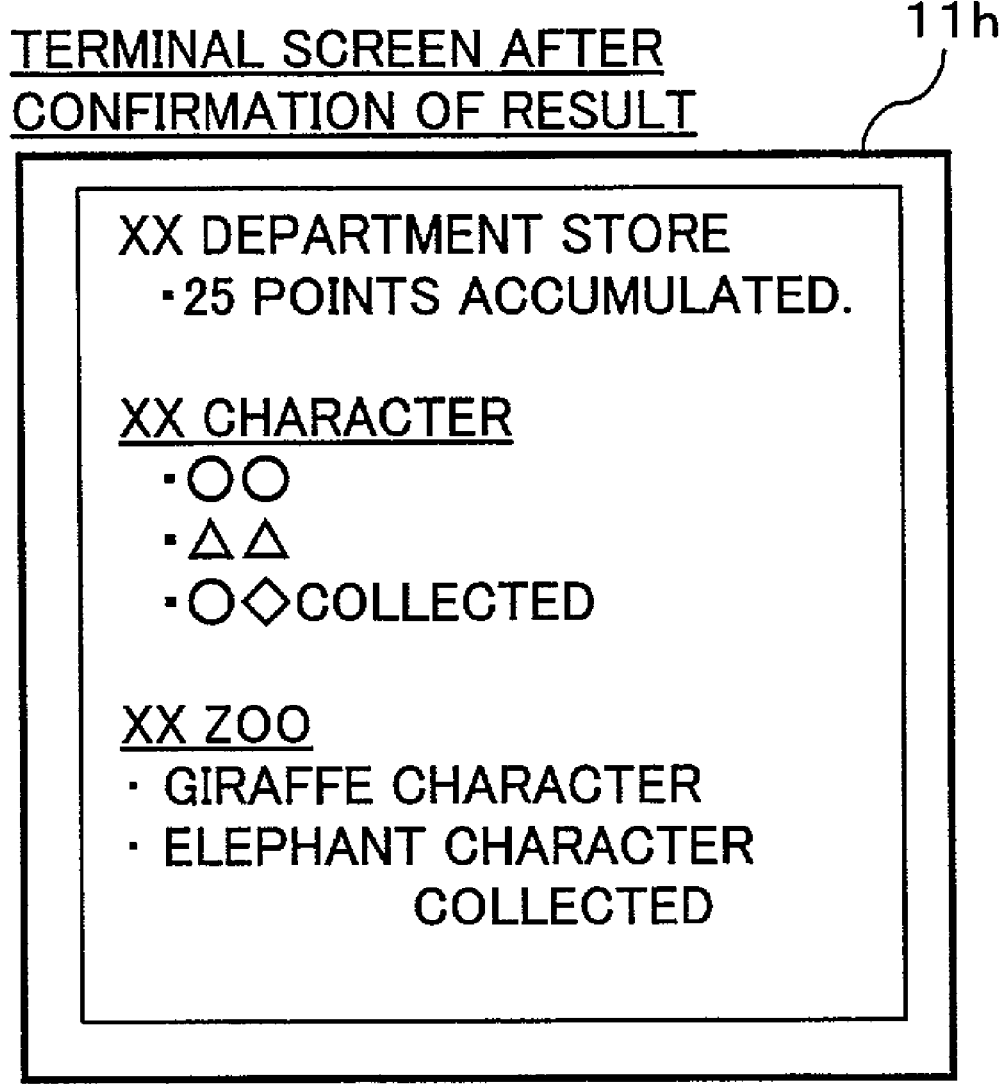
FIG. 42 is a diagram showing an example of a display screen on the portable terminal having received the collection state notification shown in FIG. 41 in the collection service using the space information service system according to the embodiment.

As schematically shown in FIG. 42, for example, the present collection state of either the point collection service or the contents (character) collection service, or the both used by the user is displayed on the display unit 11h of the portable terminal 11 that has received the above collection state notification 227. The user can thereby appropriately confirm the present state of the collection.

Next, description will be made of practical examples of the contents (character) collection and point collection services.

(C2.1) Description of Practical Example of Contents (Character) Collection Service In a zoo, for example, the administrator or manager registers a balloon (hereinafter referred to as a character balloon) linked to contents (character contents; a contents URL 15B) displaying an animal character (for example, a character of giraffe, elephant, lion or the like) at an accommodation facility such as a cage in which the animal is accommodated or a signboard illustrating the accommodated animal or the like.

When the visitor (user) retrieves a balloon (space retrieval) by aiming the portable terminal 11 toward the accommodation facility or signboard of the animal, a character balloon is hit so that corresponding character contents (a contents URL 15B) are provided from the service center 19 to the portable terminal 11. The visitor can thereby obtain an animal character of one kind of animal that the visitor has seen.

After that, the visitor successively retrieves character balloons registered inside the zoo, and collects character contents (animal characters) in the similar manner. In this character collection service, if a retrieval distance from the portable terminal 11 is set to such a long retrieval distance as including the entire of the zoo, only one retrieval may hit all the character balloons (contents) at a time, just like the prize balloon described above. It is therefore necessary to set the retrieval distance to a relatively short distance such as several meters or the like in the service "2".

When the visitor has collected all the animal characters as above, the user can receive a premium or memento at a predetermined exchanging booth inside or outside the zoo by presenting its effect (for example, a display screen shown in FIG. 42) at the window.

To determine whether the visitor has actually collect the characters in an appropriate way or not, the accumulation result described above with reference to FIG. 40 is inquired in the service center 19 using a user identifier of the user, the information is received by a terminal (or the portable terminal) disposed at the exchanging booth from the service center 19 (a data format at this time may be the same as that shown in FIG. 41 or a different one), and they are compared (collated) with each other.

Meanwhile, the accumulation result (record) in the above collection data 226 (refer to FIG. 40) is reset in the service center 19 when the premium or memento is exchanged, as a matter of course.

By executing the character collection service, the zoo can expect a great effect of gathering people, whereas the user can get a premium or memento, which is thus profitable to the both. This largely contributes to promotion of use of this service, and spread of the portable terminal 11.

The character collection service may be combined with the above balloon mail service. Namely, the above character balloon is floated within a constant space range in the zoo. Whereby, an element like treasure hunting is added to the character collection, which leads to a larger effect of gathering people.

(C2.2) Description of Practical Example of Point Collection Service

In a shop selling goods such as a department store or the like, a manager of the shop registers a gate (point) balloon linked to contents (point contents) representing obtained points at a position in a space inside the shop corresponding to an entrance to the shop or the floor.

When the user (customer) enters the shop, the user retrieves the balloon in the vicinity of the entrance to hit the gate balloon, accesses to the relevant point contents, and obtains the above point.

The user can obtain the point manually, as above. Alternatively, the user may set the retrieval distance to several tens centimeters to one meter in the service "1", whereby the retrieval object space region contacts with the gate balloon when the user enters the shop. As a result, the user can automatically access to the above point contents so as to obtain a point.

In either case, it is unfavorable that the customer repetitively goes in and out the shop to hit the gate balloon many times a day. Therefore, it is necessary to limit the number of times that the same customer hits (accesses to) the gate balloon to, for example, once a day. For this, a user identifier having been registered is transmitted to the service center 19 when the portable terminal 11 transmits its position information to the service center 19, for example, so that the service center 19 monitors a state of access to the point contents by the user using the user identifier, like in the character collection service.

When the user saves points that can be changed to a good, premium, memento, merchandise coupon, or the like by entering the shop several times, the user represents a display screen of the portable terminal 11 as shown in, for example, FIG. 42 to exchange the points into a good, premium, memento, merchandise coupon or the like at a predetermined exchanging booth or the like, similarly to the character collection service.

To authenticate the points obtained by the user, the accumulation result (record) of the collection data (refer to FIG. 40) is inquired in the service center 19 using a user identifier of the customer, the information is received by a terminal (or the portable terminal) disposed at the exchanging booth from the service center 19 (a data format at this time may be the same as that shown in FIG. 41 or a different one), and they are compared (collated) with each other, similarly to the character collection service.

In this case, when the points are exchanged with a good, premium, memento, merchandise coupon or the like, the relevant accumulation result (record) in the collection data 226 (refer to FIG. 40) is subtracted by the exchanged points, for example.

In the point collection service, the shop can expect a great effect of gathering people, whereas the user can get a good, premium, memento, merchandise coupon or the like, which is thus profitable to the both. This largely contributes to promotion of use of this service, and spread of the portable terminal 11.

The point collection service may be combined with the above balloon mail service. Namely, the above point balloon is floated inside the shop. Whereby, an element like treasure hunting is added to the point collection, which leads to a larger effect of gathering people.

In the above examples, an object of execution of the collection is a zoo or a shop selling goods. However, this service may be executed in various amusement facilities such as a recreation ground and the like, theme parks, various event sites.

By applying the above collection services, it is possible to realize the following service. For example, a ticket balloon is registered at an entrance gate of a vehicle or an attraction in an amusement facility such as a recreation ground, a theme park or the like. When the user (portable terminal 11) passes through the entrance gate and hits the ticket balloon, the admission fee is automatically recorded as use points or the like in the point contents.

The user pays money (charge for using the facility) equivalent to the above use points when leaving the facility, for example. Whereby, the user can use a vehicle or an attraction only by carrying the portable terminal 11 without purchasing a ticket or the like, so that user's convenience is largely improved. Incidentally, money equivalent to the above use points may be charged to the user later, or settled by a credit card. In such case, personal information on the user (address, telephone number, credit card number, etc.) needs to be registered on the service center 19.

(D) Description of Charge System

Use of the above space information service system 9 will promote use of the service. On the other hand, it is expected that access (use) to the contents from the portable terminals 11 becomes much more frequent than usual. In proportion to it, ① data (packet) communication charge (hereinafter referred as packet charge) to be paid to the network (communication carrier) 10' by the user (portable terminal 11), and ② contents use charge (when chargeable) to be paid to a contents provider 242 (hereinafter simply referred as a provider 242) will be largely increased.

Hereinafter, description will be made of a charging method in which an account to be charged the above ① data communication charge, ② contents use charge, and ③ contents registration charge can be flexibly designated according to a service mode that can be defined by various attributes (or an arbitrary combination of the attributes) such as an attribute of the portable terminal 11 (hereinafter simply referred as the terminal 11) or a user of the portable terminal 11 [service user (subscriber)], an attribute of the provider 242, an attribute of registered contents and the like.

Figure 44:
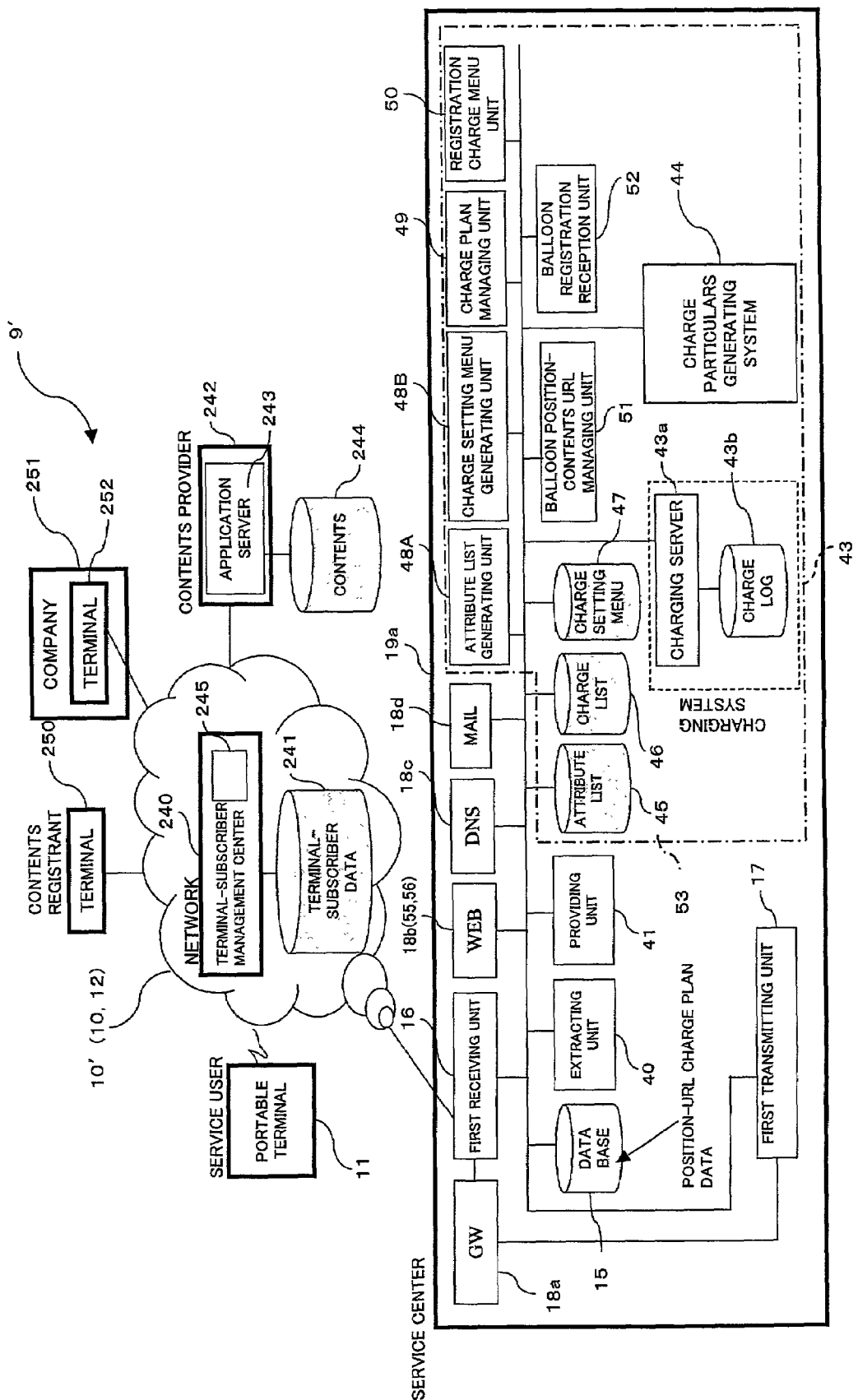
FIG. 44 is a block diagram showing a structure of the space information service system in order to illustrate a charging method according to the embodiment.

FIG. 44 is a block diagram showing a structure of a space information service system according to this embodiment for the purpose of illustrating the above charging system. In the system 9' shown in FIG. 44, the service center 19a comprises, as structural elements of a charge processing apparatus 53 for the space information service, a charging system 43, a charge particulars generating system 44, an attribute list storing unit 45, a charge list storing unit 46, a charge setting menu storing unit 47, an attribute list generating unit 48A, a charge setting menu generating unit 48B, a charge policy managing unit 49, a registration charge menu unit 50, a balloon position-contents URL managing unit 51, a balloon registration reception unit 52, etc., dissimilarly to the system 9 shown in FIG. 2.

Figure 43:
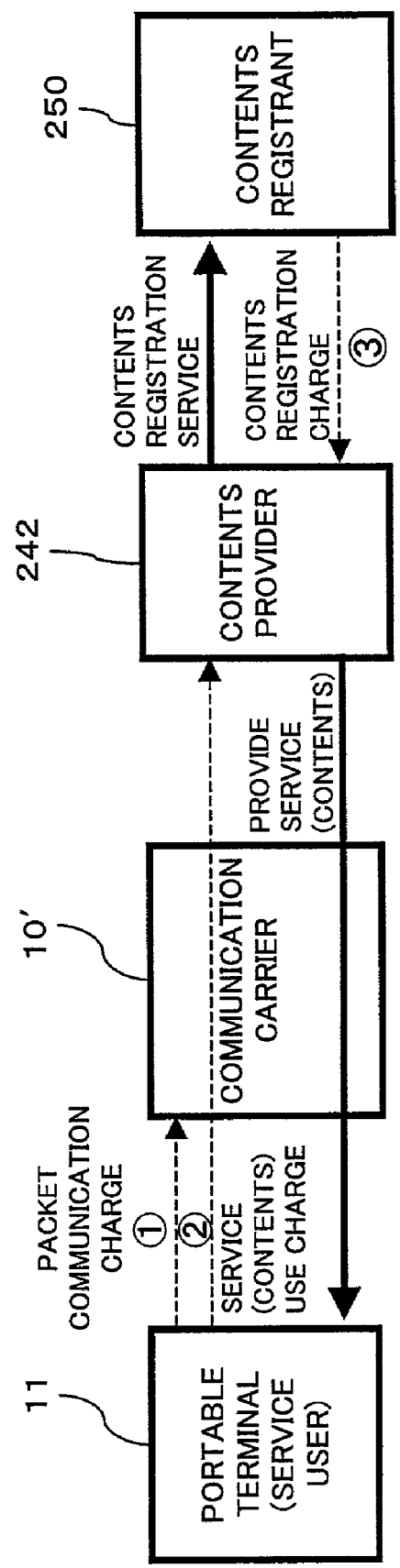
FIG. 43 is a block diagram showing a system structure for illustrating a service use charge according to the embodiment.

A terminal (contents registrant) 250 (refer to FIGS. 43 and 44), and a provider 242 managing a contents database 244 by means of an application server 243 are connected to a network 10'. The network 10' corresponds to a portion configured with the radio network 10 and the Internet 12 shown in FIGS. 1 and 2. A terminal-subscriber management center 240 managing terminal-subscriber data by means of a terminal-subscriber database 241 is disposed in the radio network 10. In FIG. 44, a terminal 252 of a company 251 accessible to the service center 19 over the Internet 12 is also connected to the network 10'. In FIG. 44, like reference characters designate like or corresponding parts, unless not particularly mentioned.

Figure 45:
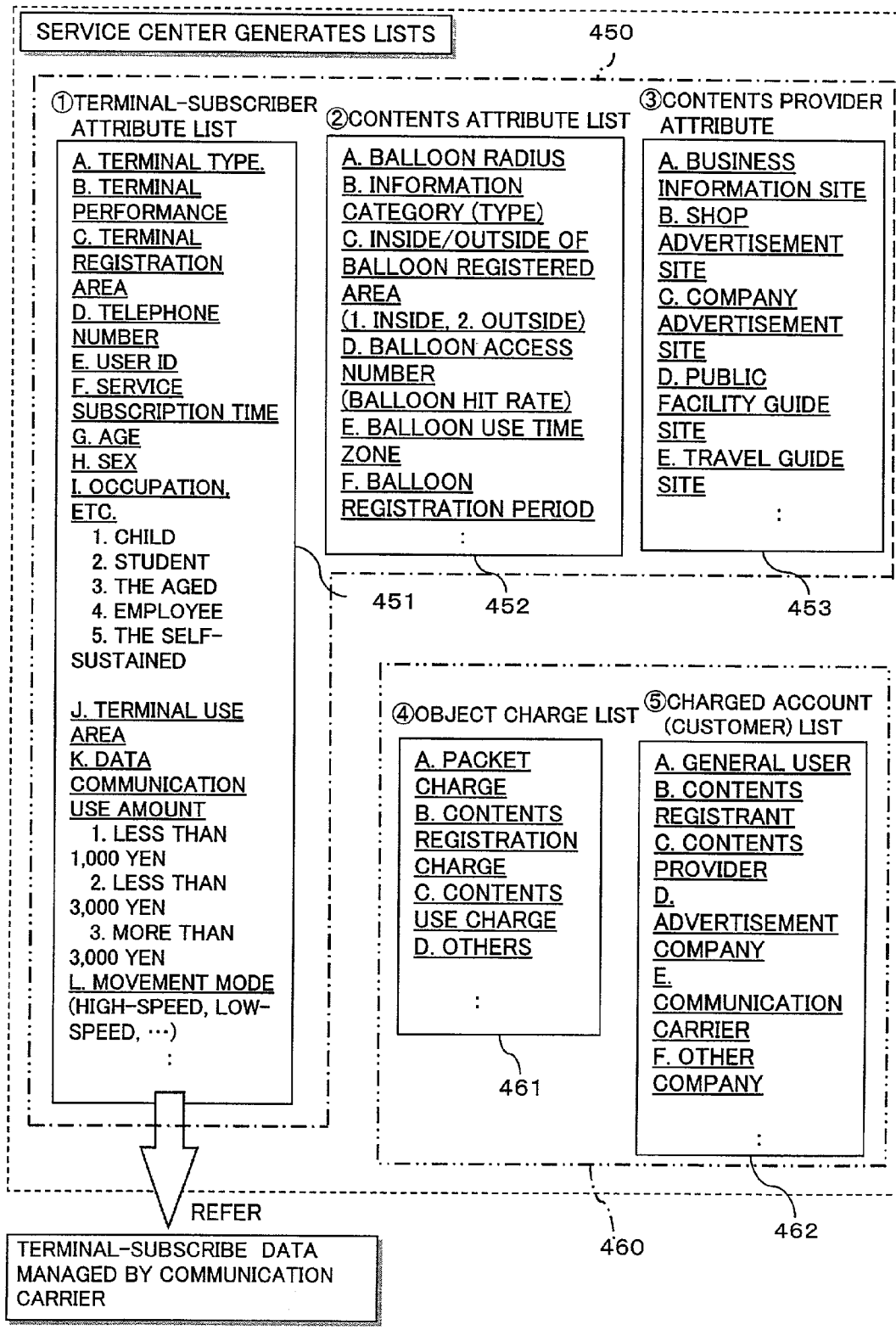
FIG. 45 is a diagram showing an example of an attribute list (terminal-subscriber attribute list, contents attribute list, contents provider attribute list) and a charge list (object charge list and charged account list) according to the embodiment.
Figure 46:
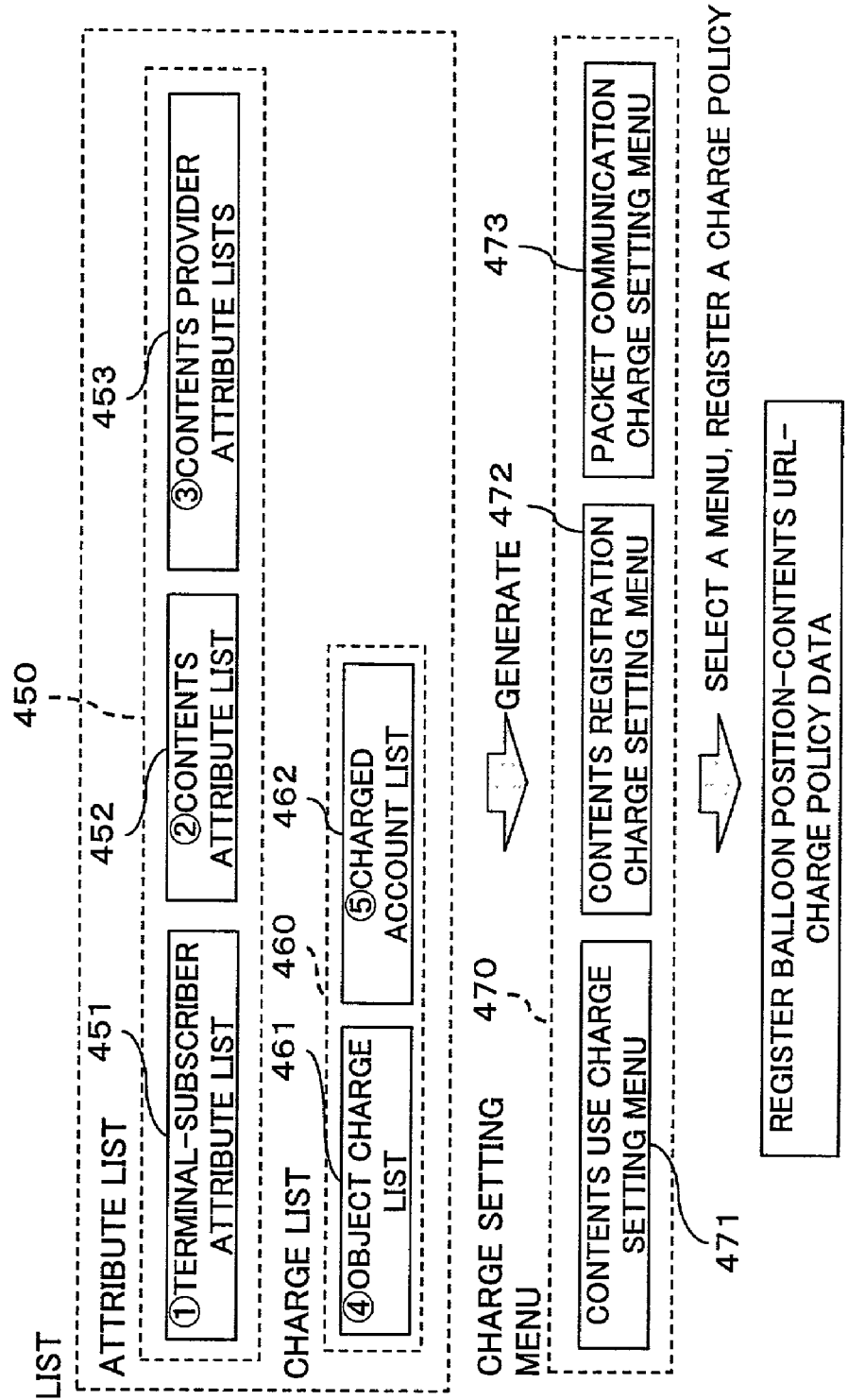
FIG. 46 is a diagram for illustrating a procedure for generating a charge setting menu and balloon position-contents URL-charge policy data according to the embodiment.

In the service center 19a, the attribute list storing unit 45 stores various attribute lists 450 such as a terminal-subscriber attribute list 451 having a list of attribute information relating to the terminal 11 and a user of the terminal 11, a contents attribute list 452 having a list of attribute information relating to contents themselves, a contents provider attribute list 453 having a list of attribute information relating to the provider 242 and the like, as shown in, for example, FIGS. 45 and 46. Attribute information configuring each of the lists 451 to 453 is as follows, as shown in, for example, FIG. 45. Incidentally, the attribute information is not limited to the listed below, of course.

① Terminal-subscriber Attribute List 451
A. type of terminal:information on a type of the portable terminal 11 (for example, manufacturer information, type number, product number, etc.);
B. terminal performance: for example, information representing a performance of the terminal such as a data communication rate, a memory capacity, etc. of the portable terminal 11;
C. terminal registration area: information relating to a registration area (purchase area) of the portable terminal 11;
D. telephone number: telephone number of the portable terminal 11;
E. user ID: information to identify a user of the portable terminal 11;
F. service subscription time: a time when the user subscribed for the service (voice, data communication) by purchasing the portable terminal 11;
G. age: information on age of the user of the portable terminal 11;
H. sex: information about sex of the user of the portable terminal 11;
I. occupation, etc.: information on an occupation or a type of occupation of the user of the portable terminal 11 (1. child, 2. student, 3. the aged, 4. employee, 5. the self-sustained, etc.);
J. terminal use area: information on an area in which the portable terminal 11 is presently used;
K. data communication use amount: information on a data communication use amount (monthly amount or accumulated amount) of the portable terminal 11 (1. less than 1,000 yen, 2. less than 3,000 yen, 3. equal to or more than 3,000 yen, etc.);
L. movement mode: information on the present movement mode of the portable terminal 11 [high-speed movement (on a vehicle, etc.), low-speed movement (during walking, etc.).

② Contents Attribute List 452
A. balloon radius: information on a size (radius) of a registered balloon (information bubble);
B. information category: information on an information category (type) of contents (URL) related to the balloon;
C. inside/outside of a balloon registered area: information on whether an access position (present position) of the portable terminal 11 to the balloon is (1.) inside or (2.) outside of an area of the registered balloon;
D. balloon access number: information on the number of times that the portable terminal 11 refers to the balloon (contents) (that is, a balloon hit rate);
E. balloon use time zone: information on a time zone in which the balloon (contents) is used (referred);
F. balloon registration period:information on a registration period of the balloon (contents).

③ Contents Provider Attribute List
A. business information site:information representing that the provider 242 is a provider operating (providing) a business site;
B. shop advertisement site: information representing that the provider 242 is a provider operating (providing) a shop advertisement site;
C. company advertisement site:information representing that the provider 242 is a provider operating (providing) a company advertisement site;
D. public facility guide site:information representing that the provider 242 is a provider operating (providing) a site for guiding a public facility;
E. travel guide site:information representing that the provider 242 is a provider operating (providing) a site for travel guide of a certain area.

The above lists 451 to 453 are generated by the attribute list generating unit 48A. Each piece of information in the terminal-subscriber attribute list 451 is generally managed by the communication carrier 10' (terminal-subscriber management center 240), so that the service center 19 needs to receive the information from the terminal-subscriber management center 240.

Figure 52:
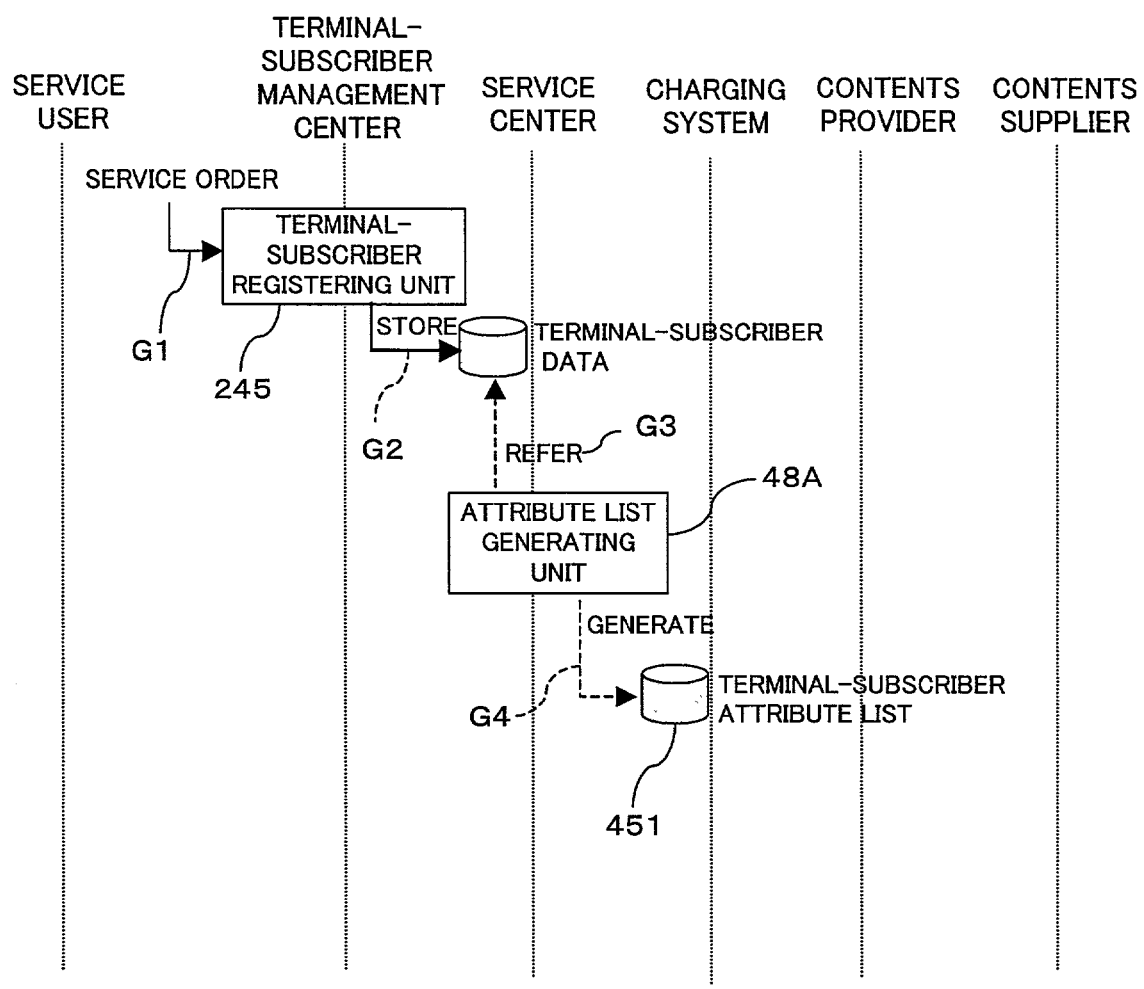
FIG. 52 is a sequence diagram for illustrating a procedure for generating a terminal-subscriber attribute list shown in FIGS. 45 and 46.

Namely, as shown in, for example, FIG. 52, when a user having purchased the portable terminal 11 enters personal information and the like in a predetermined application form and applies for registration of service subscription of a general service such as a voice service, a data (packet) communication service, or the like, the service order for the registration is accepted by the terminal-subscriber registering unit 245 (refer to FIG. 44) of the terminal-subscriber management center 240 (step G1). The personal information and the like are stored and registered as terminal-subscriber data in the terminal-subscriber database 241 by the terminal-subscriber registering unit 245 (step G2). The attribute list generating unit 48A of the service center accesses and refers to the terminal-subscriber database 241 (step G3) to obtain necessary information, and generates the above terminal-subscriber attribute list 451 (step G4).

The charge list storing unit 46 stores various charge lists 460 such as ④ an object charge list 461 representing types of charges that become object charges, ⑤ a charged account (customer) list 462 representing individuals and companies to be charged, and the like. The types of charges that become object charges (object charge list 461) includes A. packet charge, B. contents registration charge, C. contents use charge, and the like. The charged account list 462 includes A. general user (user of the portable terminal 11), B. contents registrant, C. contents provider, D. advertisement company, E. communication carrier, F. other company, and the like. Incidentally, information in the lists 461 and 462 is not limited to the above, as a matter of course.

According to this embodiment, desired pieces of the attribute information in the attribute list 450 (the terminal-subscribers attribute list 451, the contents attribute list 452, the contents provider attribute list 453) and the charge list 460 (the object charge list 461, the charged account list 462) are appropriately combined (or any one of them) and designated, whereby a charged account is flexibly designated (setting of a charge policy) according to a mode of providing the information service.

Assuming that "A. terminal type" in the terminal-subscriber attribute list 451, "E. balloon use time zone" in the contents attribute list 452, "E. travel guide site" in the contents provider attribute list 453, "C. contents use charge" in the object charge list 461, and "D. advertisement company" in the customer list 462 are designated (attribute designation). A service becomes possible such that if the portable terminal 11 of a specific type accesses to specific contents (site) in a certain specific time zone, a charge for use of the contents at that time will be charged to the advertisement company.

Namely, the attribute list storing unit 45 functions as an attribute information storing unit which stores several kinds of attribute information being able to define a service mode at the time that the portable terminal 11 uses (receives contents) space information (space retrieval). The charge list storing unit 46 functions as a charge type information storing unit which stores information relating to several types of service charge which can be an object charges in service modes each defined by the above attribute information, and a customer information storing unit which stores information on charged accounts on which several types of charges can be claimed. The storing units 45 and 46 may be accomplished by a certain storage medium such as a ROM, a RAM, a hard disk or the like.

The charge setting menu generating unit 48B shown in FIG. 44 generates various charge setting menus 470 such as a contents use charge setting menu 471, a contents registration charge setting menu 472, a packet communication charge setting menu 473 on the basis of the attribute list 450 (the terminal-subscriber attribute list 451, the contents attribute list 452, the contents provider attribute list 453) and the charge list 460 (the object charge list 471, the charged account list 462), as schematically shown in FIG. 46.

The menus 471 to 473 are menus used to designate (select) desired attribute information out of attribute information (items) shown in the lists 451 to 453, 461 and 462 for each of the registration contents (balloon) with respect to the contents use charge, the contents registration charge and the packet charge. By selecting any one of the menus 471 to 473 (selecting attribute information or inputting attribute information), the above attribute is designated.

The above menu selection is sometimes performed by the contents registrant 250. According to circumstances, the menu selection is performed by the provider 242 or the communication carrier 10'. The generated charge setting menu 470 (the contents use charge setting menu 471, the contents registration charge setting menu 472, the packet communication charge setting menu 473) is stored in the charge setting menu storing unit 47, extracted by, for example, the extracting unit 40 at need, and provided (down-loaded) to the provider 242 or the like by the providing unit 41. The charge setting menus 471 to 473 may be exchanged by mail.

The charge policy managing unit 49 generates and manages the charge policy data 481 to 483 for the contents use charge, the contents registration charge and the packet communication charge as shown in FIGS. 47 through 49 on the basis of attribute information designated in the attribute designation in the above menus 471, 472 and 473. Each sorts of charge policy data 481 to 483 is correlated with balloon position-contents URL data 15-1 at a corresponding balloon number as the charge policy data 480 as shown in, for example, FIG. 50, and registered as balloon position-contents URL-charge policy data 15-2 in the database 15. The respective charge policy for the contents use charge, the contents registration charge and the packet communication charge are set for each registered balloon, and managed (refer to FIG. 46).

In the charge policy data 481 to 483 shown in FIGS. 47 through 49, a symbol represented by a combination of an encircled number and an English letter such as "③-D" or "②-A" represents attribute information shown in the lists 451 to 453, 461 and 462 shown in FIG. 45. For example, "③-D" represents "D. public facility guide site" in the "③ contents provider attribute list 453", and "②-A" represents "A. balloon radius" in "② contents attribute list 452."

In a record at a balloon number "1" in the charge policy data 481 shown in FIG. 47, "2. outside the area" of "C. balloon registration area" in "② contents attribute list" is set as "charge condition", "C. contents use charge" in "④ charged account list" is set as "object charge, "30 yen each" is set as "(charge) rate", and "A. general user" in "⑤ charged account list 462" is set as "charged account."

According to the charge policy data 481 (record at the balloon number "1"), when the user accesses to the balloon from outside the area of the balloon, a contents use charge of 30 yen each is charged to the user (portable terminal 11) who has referred to the balloon.

In concrete, if the balloon (contents) at the balloon number "1" is contents (a relay broadcasting site) of a broadcasting station carrying out a relay broadcasting (streaming video distribution) of a baseball game, a soccer game or the like, and the replay broadcasting balloon is registered at the stadium, the above contents use charge will be charged to a user accessing to the relay broadcasting balloon outside the stadium, for example. When the user accessed to the relay broadcasting balloon from inside the stadium, it is possible that no charge is charged to the user since the user has already paid the admission fee for the stadium.

Similarly, a record at a balloon number "2" signifies that if the balloon is registered, linked with a public facility guide site (③-D) or a travel guide site (③-E), the contents use charge (④-C, 100 yen/month) occurring when a user (portable terminal 11) accesses to the balloon and refers to the public facility guide site (③-D) or the travel guide site (③-E) will be charged to an advertisement company (⑤-D) advertising in the site.

A record at a balloon number "3" signifies that if the balloon is registered as a bulletin board balloon, the contents use charge occurring when a user (portable terminal 11) accesses to the bulletin board will be free (no designation of "charge condition" and "charged account").

Similarly, records at balloon numbers "1" to "3" in the charge policy data 482 relating to the contents use charge shown in FIG. 48 signify the following charge policy.

record at a balloon number "1": A contents registration charge (④-B) according to a balloon size (balloon radius; ②-A) and a balloon registration period (②-F) will be charged to a contents registrant 250 (⑤-B) such as an event company registering the relay broadcasting balloon.

record at a balloon number "2": With respect to a contents registration charge (④-B) for the public facility guide site (③-D), a charge (30 yen each) according to the number of times of access to the site (balloon) will be charged to a contents registrant 250 (⑤-B) of the public facility guide site as the contents registration charge (④-B).

record at a balloon number "3": With respect to registration of a balloon (contents) as a bulletin board balloon, the contents registration charge (④-B) will be free (no designation of charged account) if the balloon size (②-A) is not larger than a predetermined size (for example, 3 m) and the registration period (②-F) is within a predetermined term (for example, one week).

Records at balloon numbers "1" to "3" in the charge policy data 483 with respect to the packet communication charge shown in FIG. 49 signify the following charge policies.

record at a balloon number "1": If an access time (balloon use time zone; ②-E) to the above relay broadcasting balloon is 18:00 to 21:00, for example, a packet communication charge (④-A; measured rate) of the user (portable terminal 11) at this time will be charged to a company (⑤-F) such as a sponsor or the like (the sponsor will shoulder the packet communication charge to the user).

record at a balloon number "2": With respect to a packet communication charge (④-A: measured rate) occurring when the user accesses to the public facility guide site (③-D) or the travel guide site (③-E), the provider 242 (⑤-C) will shoulder it as a special campaign or the like, for example.

record at a balloon number "3": A packet communication charge (④-A; measured rate) to the user (portable terminal 11) occurring when the user accesses to the bulletin board balloon will be collected from the user (⑤-A).

According to this embodiment, various information in the lists 451 to 453, 461 and 462 are suitably (arbitrarily) combined (or any one of them), and registered in the database 15 (correlated with the balloon position-contents URL correlation data 15-1). Whereby, a setting that charges a desired service charge in any one of various service modes to a desired charged account becomes possible.

The charge policy managing unit 49 functions as a charge policy setting unit which arbitrarily combines various information in the attribute list storing unit 45 and the charge list storing unit 46 to set an arbitrary service mode and a charged account for a service charge of each charge type. According to this embodiment, a fine setting of a charged account for a service charge (contents use charge, contents registration charge, packet communication charge or the like) according to any one of various service modes becomes possible.

Accordingly, such a setting becomes possible that a company or a provider 242 can shoulder a contents use charge or a packet communication charge (and a contents registration charge in the case where an individual is the contents registrant 250), which is generally charged to a user (portable terminal 11).

In the case of a setting that a charged account for the balloon is changed according to a date or a time zone, a plurality of records may be registered for one balloon (at one number), and a record that becomes unnecessary may be deleted. For example, when the charge policy managing unit (charge policy setting unit) 49 registers a record (hereinafter referred as a time record) whose attribute with respect to a date or a time zone is newly designated, the charge policy managing unit 49 checks whether there has been another time record at the same balloon number or not. When there is no time record, the charge policy managing unit 49 newly registers (or overwrites) a new time record. When there has already been another time record, the charge policy managing unit 49 additionally registers a new time record, so as to register a plurality of time records.

The balloon position-contents URL managing unit 51 shown in FIG. 44 correlates position information 15A (latitude, longitude, altitude) on a balloon (information bubble) to be registered on the database 15 with a contents URL 15B and registers them on the database 15, thereby managing balloon position-contents URL data 15-1 in the database 15 (balloon position-contents URL-charge policy data 15-2).

The balloon registration reception unit 52 requests the registration charge menu unit 50 to confirm a charge of the contents registration charge when accepting a request for registration of a balloon (information bubble) from the contents registrant 250. When accepting a request from the balloon registration reception unit 52, the registration charge menu unit 50 accesses to the database 15 to refer to the charge policy data 482 (refer to FIG. 48) with respect to the contents registration charge, confirms the contents registration charge, generates a contents registration charge confirmation menu according to the charge, and provides it to the contents registrant 250.

When a response (notification of OK) about the contents registration charge confirmation menu is transmitted back to the registration charge menu unit 50, the balloon position-contents URL managing unit 51 correlates balloon position information 15A with a contents URL 15B (balloon registering process).

Figure 51:
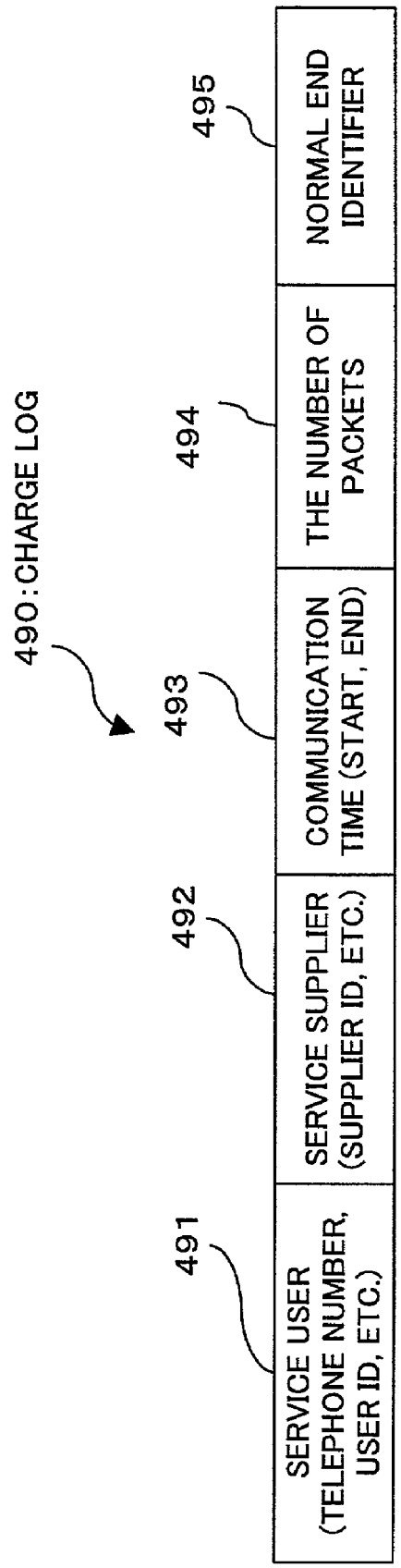
FIG. 51 is a diagram showing an example of a data format for a charge log according to the embodiment.

The above charging system 43 comprises a charging server 43a and a charge log database 43b. The charging system 43 stores a charge log 490 composed of various data such as service user data 491 (telephone number, user ID, etc.), service supplier (registrant) data 492 (supplier ID, etc.), communication time data 493 (start/end time), data of the number of packets 494, a normal end identifier 495, etc. in the charge log database 43b by means of the charging server 43a, as schematically shown in FIG. 51, for example.

Here, the service supplier may be a contents registrant 250 or a provider 242. According to circumstances, the service supplier may be a user of the portable terminal 11 or a communication carrier 10'. The normal end identifier 495 is information representing whether the communication has normally ended or not (whether the communication has abnormally ended due to occurrence of a failure or a congestion).

The charge particulars generating system 44 totalizes various service charges such as a contents use charge, a contents registration charge, a packet communication charge and the like for each of the user of the portable terminal 11 or a service supplier on the basis of the charge log 490 recorded in the charge log database 43b, and generates charge particulars for claiming the service user charges from a designated charged account on the basis of the balloon position-contents URL-charge policy data 15-2 [charge policy data 480 (481 to 483)].

The charging server 43a in this case simply records only the above charge log 490. Alternatively, the charging server 43a may record and totalize a history of the above service use charges on the basis of the balloon position-contents URL-charge policy data 15-2 [charge policy data 480 (481 to 483)].

The charging system 43 and the charge particulars generating system 44 function as a charge processing unit which charges various service charges such as a contents use charge, a contents registration charge, a packet communication charge, etc. to a charged account according to a setting of a charge policy by the charge policy managing unit 49.

The charging system 43 and the charge particulars generating system 44 are not necessarily provided in the service center 19a.

Next, description will be made of operations of the system 19a in the above structure.

(D1) When the Contents Registrant 250 Sets Charges

Figure 53:
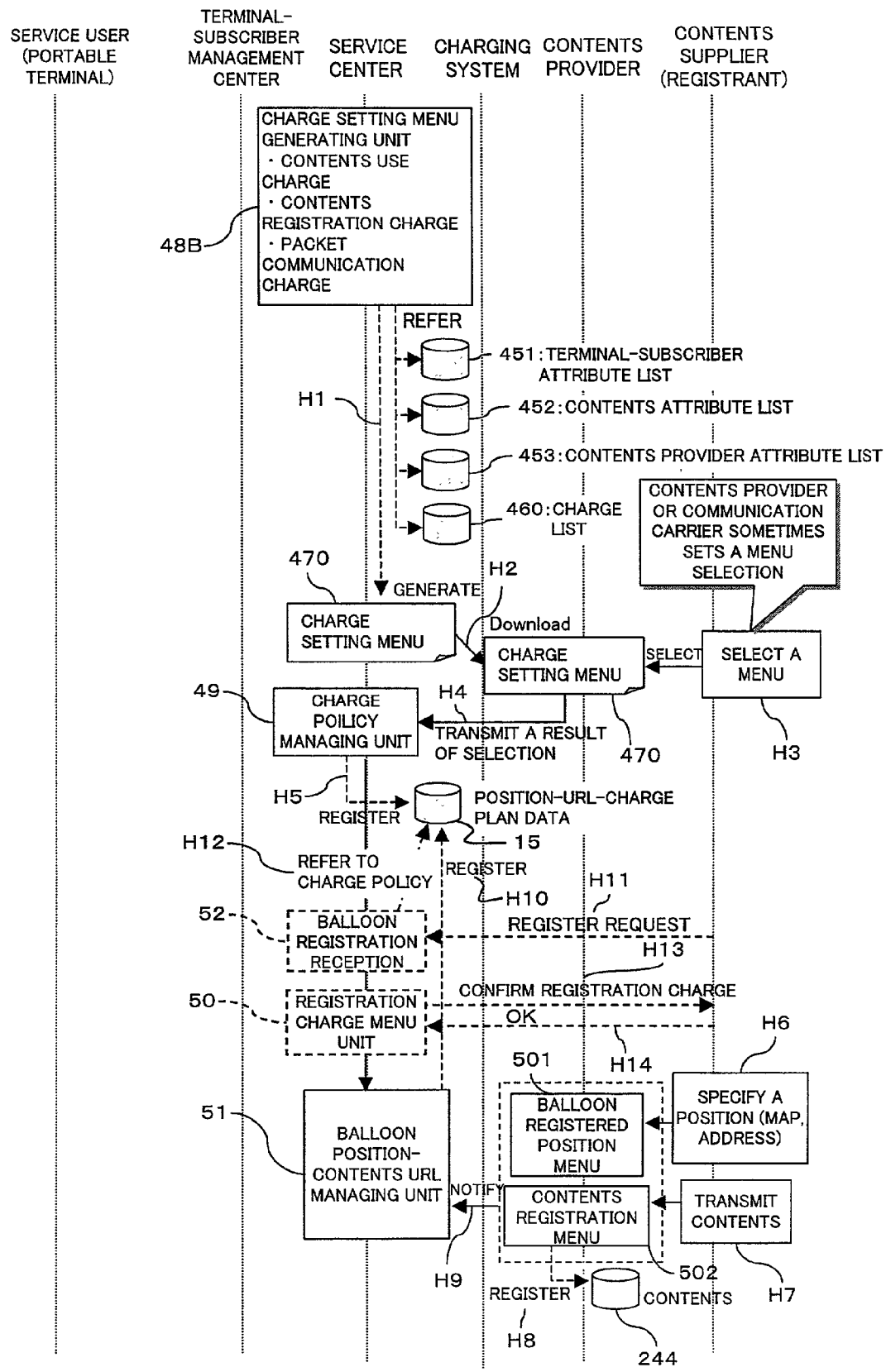
FIG. 53 is a sequence diagram for illustrating a procedure for setting charge policy data according to the embodiment.

As shown in FIG. 53, in the service center 19a, the charge setting menu generating unit 48B refers to the terminal-subscriber attribute list 451, the contents attribute list 452, the contents provider attribute list 453 and the charge list 460 (the object charge list 461, the charged account list 462), and generates the charge setting menu 470 (the contents use charge setting menu 471, the contents registration charge setting menu 472, the packet communication charge setting menu 473) (step H1).

The generated charge setting menu 470 is down-loaded to the provided 242 (step H2). When the contents registrant 250 accesses to the provider 242 thereafter in order to register desired contents (balloon), the above charge setting menu 470 is provided to the contents registrant 250, and the contents registrant 250 selects information (items) in the charge setting menu 470 (step H3).

When the contents registrant 250 desires such a charge setting that an advertising company shoulders a contents use charge (for example, 200 yen each) to a user (student) of the portable terminal 11 having accessed to the registered balloon (travel guide site) in a time zone from 17:00 to 22:00, for example, the contents registrant 250 selects attribute information in the various lists 451 to 453, 461 and 462 in the contents use charge setting menu 471.

Namely, the contents registrant 250 selects "2. Student" in a child menu (pull-down menu or the like) of "I. occupation (1. child, 2. student, 3. the aged, . . . ) in the terminal-subscriber attribute list 451, as shown in FIG. 55(a), for example. The contents registrant 250 then selects "2. 17:00–22:00" in a child menu of "E. balloon use time zone" in the contents attribute list 452, as shown in FIG. 55(b).

The contents registrant 250 next selects "E. travel guide site" in the contents provider attribute list 453 as shown in FIG. 55(c), and "C. contents use charge" in the object charge list 461, as shown in FIG. 55(d). Whereupon, the charge input menu 461a is displayed. The contents registrant 250 inputs "200" as an amount to be collected on a yen basis, and selects "4. Yen/each" as a frequency of collection, for example. At this time, the contents registrant 250 may select another currency unit such as "dollar" as the currency unit.

Further, the contents registrant 250 selects "D. advertisement company" (F company, provisionally) in the customer list 462. As above, the registrants 250 completes a request to the provider 242 for a setting of charges for such a service that the advertising company (F company) shoulders a contents use charge (for example, 200 yen/each) to the user (student) of the portable terminal 11 having accessed to the travel guide site in a time zone from 17:00 to 22:00. Incidentally, the order in which the contents registrant 250 selects the items in FIGS. 55(a) through 55(e) is changeable. The lists 451 to 453, 461 and 462 shown in FIGS. 55(a) through 55(e) may be displayed on (provided to) the terminal 11 in a certain order, or all of or a part of the lists may be simultaneously displayed.

The provider 242 then transmits the above charge setting request (menu selection result) to the charge policy managing unit 49 (step H4). The charge policy managing unit 49 generates charge policy data 481 with respect to the contents use charge as described above with reference to FIG. 47 on the basis of the received selection result, and registers the charge policy data 481 on the database 15 (step H5).

The step H5 corresponds to a charge policy setting step in which plural kinds of attribute information in the above attribute list storing unit 45 (attribute list 450), information (information in object charge list 461) with respect to a type of any one of the plural kinds of service charges, and information (information in the customer list 462) with respect to any one of charged accounts in the charge list storing unit 47 (charge list 460) are arbitrarily combined, and a charged account for an arbitrary service mode and a type of the service charge is set.

After that, the contents registrant 250 designates a position (balloon position information 15A) at which the contents registrant 250 desires to register the above balloon in the balloon registration position menu 501 provided by the provider 242, for example (step H6). The contents registrant 250 inputs contents (travel guide information) (or a contents URL 15B if the site has been opened) that the contents registrant 250 desires to correlate with the balloon in the contents registration menu 502 (step H7).

The provider 242 registers the contents (contents URL 15B) received from the contents registrant 250 on the contents database 244 (step H8), and notifies the balloon position-contents URL managing unit 51 in the service center 19a of the balloon position information 15A and the contents URL 15B (step H9).

The balloon position-contents URL managing unit 51 correlates at least the balloon position information 15A and the contents URL 15B with the above charge policy data 481, and registers them on the database 15, thereby registering the balloon position-contents URL-charge policy data 15-2 described above with reference to FIG. 50 (step H10).

In the service center 19a, a charge setting for a service that the advertisement company (F company) shoulders a contents use charge (for example, 200 yen/each) to the user (student) of the portable terminal 11 having accessed to the travel guide site in a time zone from 17:00 to 22:00 is completed.

(D2) When Provider 242 Beforehand Sets Charges

In the above example, an amount of the charge to be collected (charge) is designated by the contents registrant 230. However, the provider 242 may beforehand set it. For example, the contents registrant 250 registers his/her own shop information (shop balloon) on a provider 242 operating a gourmet exclusive site at a monthly or yearly charge according to a balloon size beforehand decided by the gourmet exclusive site (provider 242).

Figure 56A:
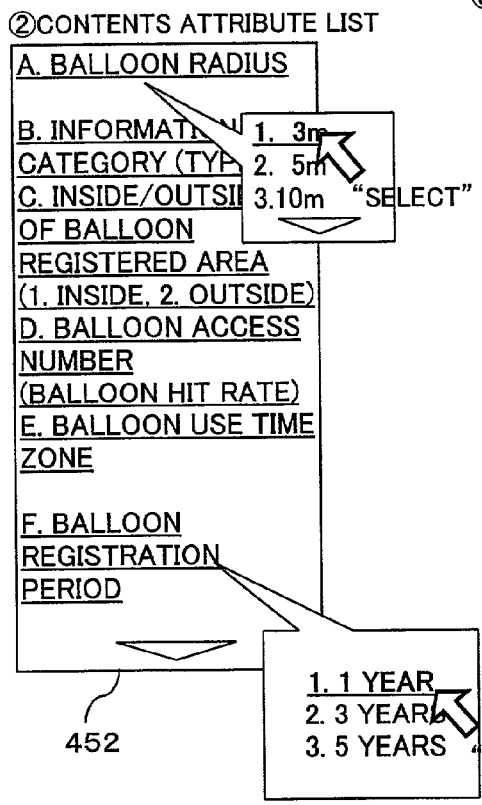
FIGS. 56(a) through 56(d) are diagrams showing an example of a display of a charge setting menu (contents registration charge setting menu) in order to illustrating a procedure for selecting information for setting charge policy data according to the embodiment.
Figure 56B:
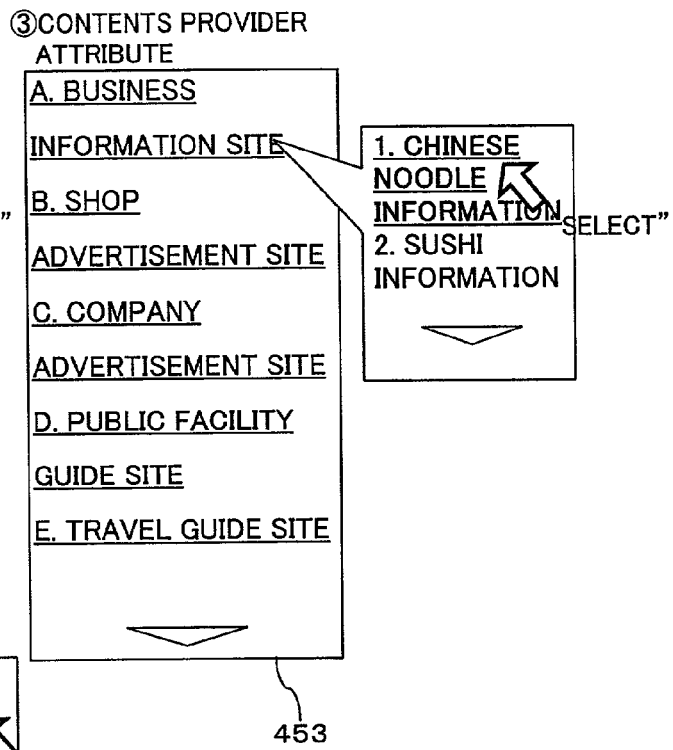
Figure 56C:
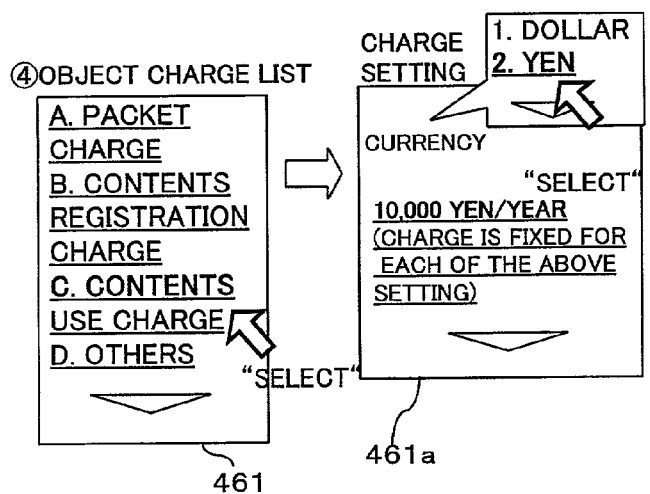
Figure 56D:
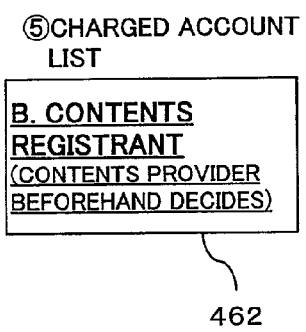
Figure 57A:
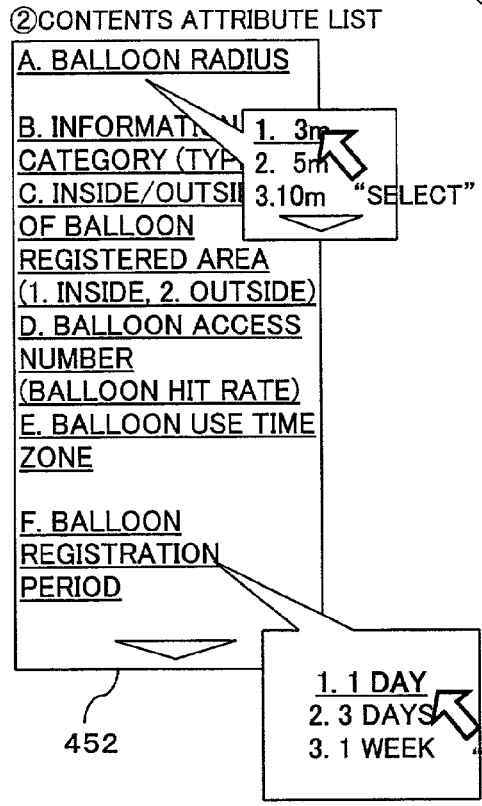
FIGS. 57(a) through 57(d) are diagrams showing an example of a display of a charge setting menu (contents registration charge setting menu) in order to illustrate a procedure for selecting information for setting charge policy data according to the embodiment.
Figure 57B:
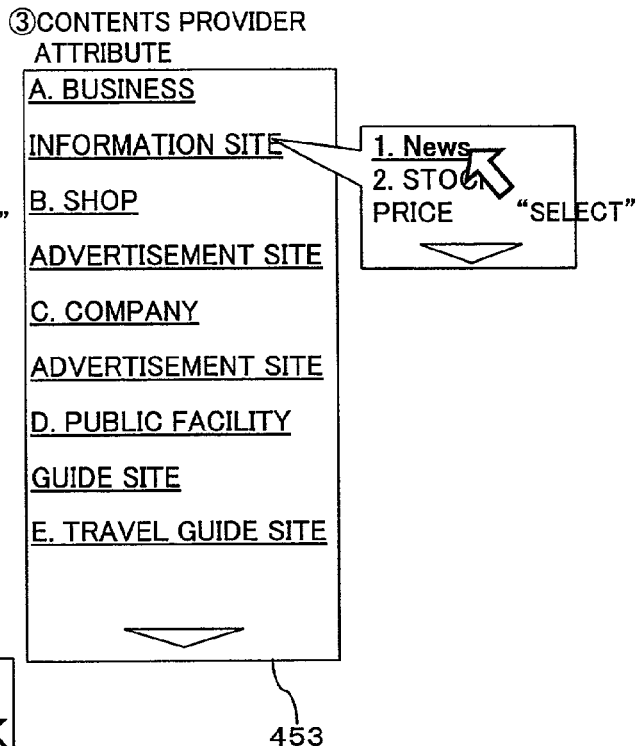
Figure 57C:
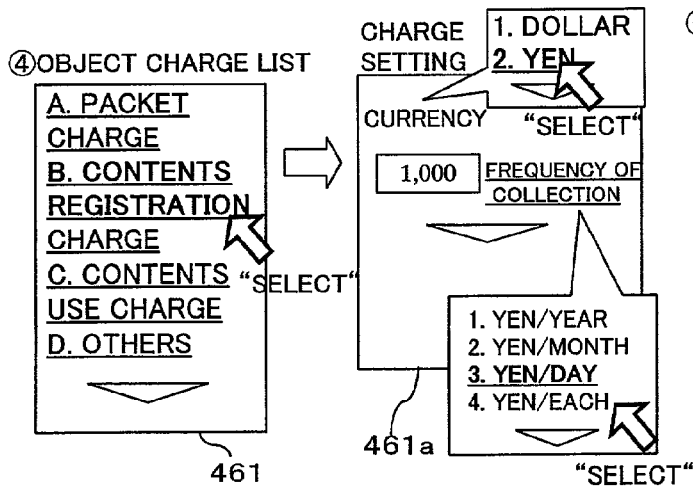
Figure 57D:
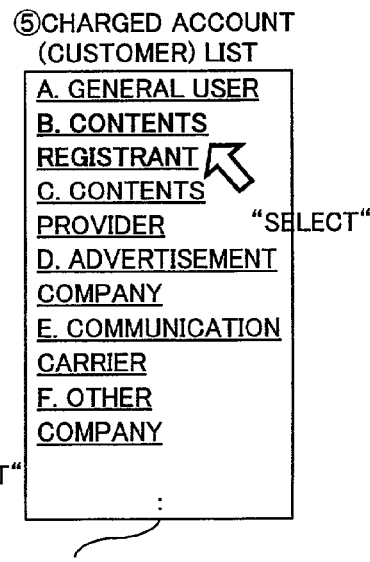
Figure 59:
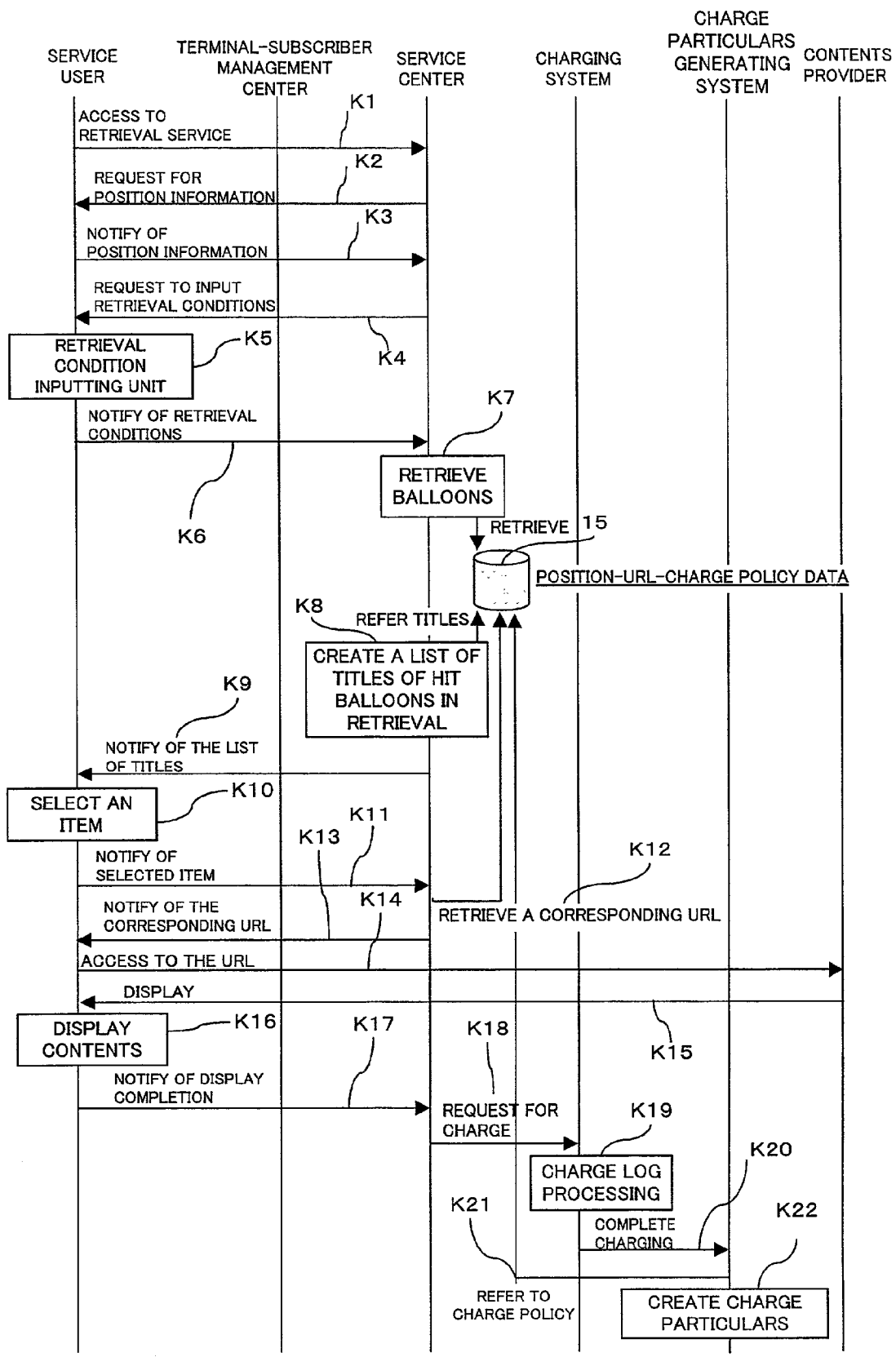
FIG. 59 is a sequence diagram for illustrating an operation of the service center after the charge policy data is set according to the embodiment.

In this case, the contents registrant 250 selects "3 m" in a child menu of "A. balloon radius" in the content attribute list 452, and "one year" in a child menu of "F. balloon registration period" when selecting the menu (step H3) described above, as shown in FIG. 56(a). The contents registrant 250 also selects "1. Chinese noodle information" in a child menu of "B. shop advertisement site" in the contents provider attribute list 453, as shown in FIG. 56(b), and selects "B. contents registration charge" in the object charge list 461, as shown in FIG. 56(c). Incidentally, the order in which the contents registrant 250 selects attributes shown in FIGS. 56(a) through 56(c) is changeable.

In this case, the information designated up to now is transmitted as a register request to the balloon registration reception unit 52 of the service center 19*a* (step H11) as shown in FIG. 53. The balloon registration reception 52 notifies the registration charge menu unit 50 of the received designated information (balloon radius, balloon registration charge).

The registration charge menu unit 50 refers to charge policy database 482 (refer to FIG. 48) with respect to a contents registration charge beforehand decided on the basis of the notified designated information and held in the database 15 (step H12). The registration charge menu unit 50 presents a registration charge confirmation menu 461*b* shown in FIG. 56(*c*) and a charged account list 462 shown in FIG. 56(*d*), for example, to call upon the contents registrant 250 to confirm the charged amount and the charged account according to the designated information (registration charge confirmation; step H13).

When the contents registrant 250 agrees with the amount and the charged account presented as above, the contents registrant 250 notifies the service center 19*a* (registration charge menu unit 50) of it (OK) (step H14). Thereafter, the balloon position-contents URL managing unit 51 correlates balloon position information on the shop balloon with a contents URL 15B, thereby registering the shop balloon in the similar manner to the above-described steps H6 to H10.

(D3) When a User (Service User) of the Portable Terminal 11 Registers a Balloon in a Site Whose Contents Registration Charge is Beforehand Decided Next, description will be made of an operation in a case where a message (balloon) is registered on a site (for example, a bulletin board balloon registered in Shibuya) a contents registration charge of which is beforehand decided by the provider 242.

Figure 54:
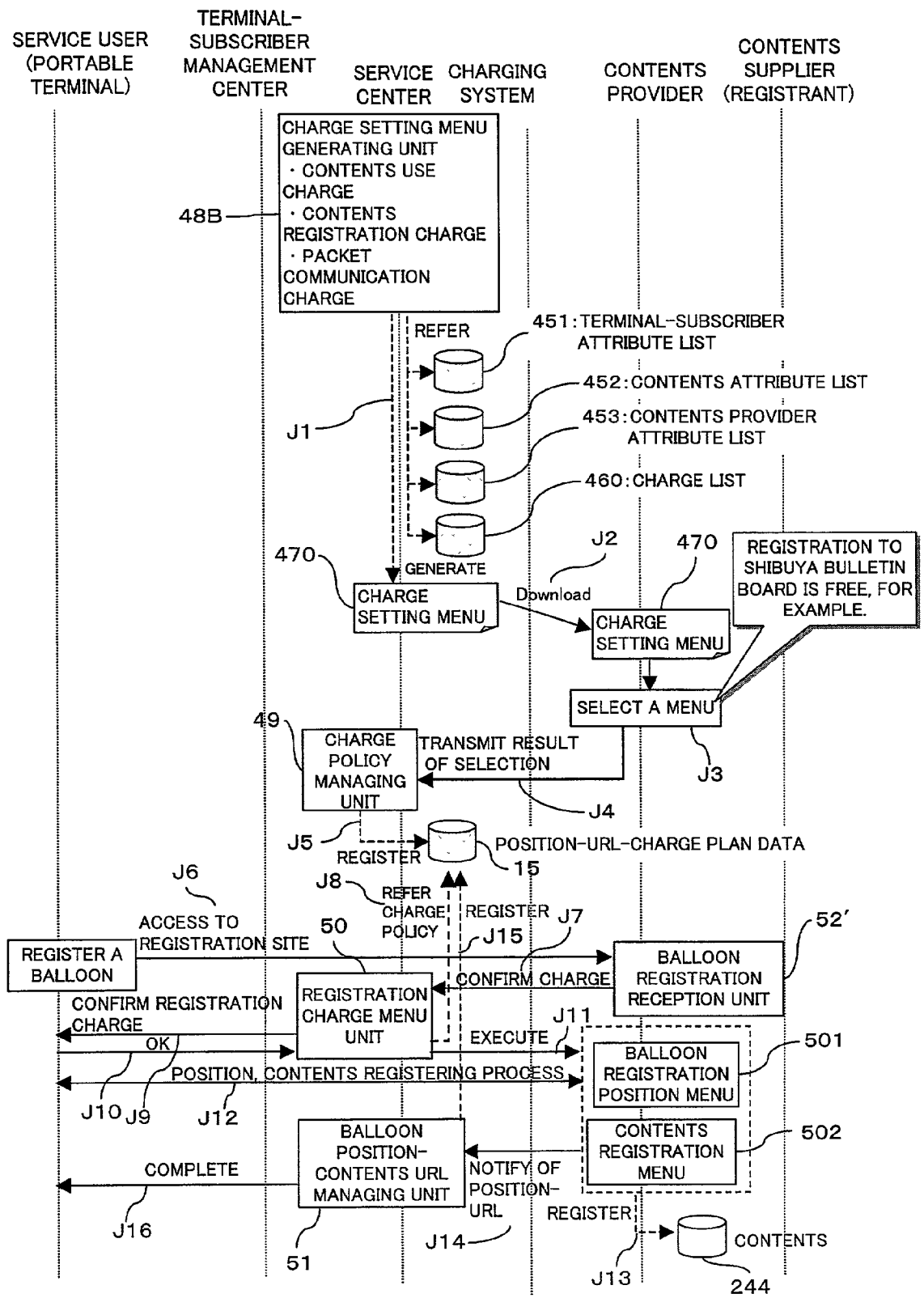
FIG. 54 is a sequence diagram for illustrating another procedure for setting charge policy data according to the embodiment.

In this case, in the service center 19*a*, the charge setting menu generating unit 48B refers to the terminal-subscriber attribute list 451, the contents attribute list 452, the contents provider attribute list 453 and the charge list 460 (the object charge list 461, the charged account list 462), and generates a charge setting menu 470 (the contents use charge setting menu 471, the contents registration charge setting menu 472, the packet communication charge setting menu 473) (step J1) in the similar manner to the above-described steps H1 and H2, as shown in FIG. 54. The charge setting menu 470 is down-loaded to the provider 242 (step J2).

In this case, the provider 242 selects a menu in the charge setting menu 470, and performs a charge setting that registration (writing) of a message (balloon) on the bulletin board balloon (bulletin board site) is free (step J3), for example. The charge setting (menu selection result) is transmitted to the charge policy managing unit 49 in the service center 19*a* (step J4) as well. The charge policy managing unit 49 generates charge policy data 482 with respect to the contents registration charge as described above with reference to FIG. 48 on the basis of the received selection result, and registers the charge policy data 482 on the database 15 (charge policy setting step; step J5).

When a user of a certain portable terminal 11 accesses to the bulletin board site in order to register a message on the bulletin board site after completion of the above registration (setting of a charge policy) (transmission of a balloon register request; step J6), the balloon registration reception unit 52' of the provider 242 accepts the balloon register request. The balloon register reception unit 52' transmits a request to confirm the contents registration charge to the registration charge menu unit 50 of the service center 19*a* (step J7).

The registration charge menu unit 50 refers to charge policy data 482 corresponding to a balloon number of the bulletin board site in the database 15 (step J8), generates a registration charge confirmation menu displaying a contents registration charge (free in this case) having been set, and provides it to the portable terminal 11 (step J9).

The user of the portable terminal 11 confirms the contents registration charge. When the user agrees with the fee, the user transmits back it (OK) to the service center 19*a* (registration charge menu unit 50) (step J10). When receiving the OK notification, the registration charge menu unit 50 requests the provider 242 to carry out the balloon registering process (step J11).

In response to the request, the provider 242 provides the balloon registration position menu 501 and the contents registration menu 502 to the portable terminal 11. The user of the portable terminal 11 designates a position (balloon position information 15A) at which the user desires to register a message (balloon) in the balloon registration menu 501, and inputs message contents that the user desires to correlate with the message (balloon) in the contents registration menu (step J12).

The provider 242 registers the message contents received from the user of the portable terminal 11 on the contents database 244 (step J13), and notifies the balloon position-contents URL managing unit 51 in the service center 19*a* of balloon position information 15A and a contents URL 15B (step J14).

The balloon position-contents URL managing unit 51 correlates the balloon position information 15A with the contents URL 15B and registers them on the database 15, thereby registering the message (balloon) in the above bulletin board site (step J15). After that, the balloon position-contents URL managing unit 51 notifies the portable terminal 11 of completion of the registration (step J16).

(D4) When the Provider 142 Beforehand Sets a Contents Registration Charge for a Contents Registrant 250

Next, description will be made of a menu selecting operation in the case where the provider 242 performs such a charge setting at the above step J3 that a contents registration charge according to a balloon size and a registration period is collected from a contents registrant 250 when the contents registrant 250 registers a business information site (business information balloon) for a newspaper or news in the vicinity of a station.

In this case, the provider 242 selects "3m" in a child menu of "A. balloon radius" in the contents attribute list 452, selects "1 day" in a child menu of "F. balloon registration period" as shown in FIG. 57(*a*), and selects, "1. news" in a child menu of "B. business information site" in the contents provider attribute list 453 as shown in FIG. 57(*b*), for example.

As shown in FIG. 57(*c*), the provider 242 selects "B. contents registration charge" in the object charge list 461. Whereupon, the charge input menu 461*a* is displayed. The contents registrant 250 inputs "1000" as an amount to be collected on a yen basis as currency unit, and selects "4. yen/day" as a frequency of collection, for example.

As shown in FIG. 57(*d*), the provider 242 selects "B. contents registrant" in the charged account list 462. The provider 242 then sends results of the selection to the charge policy managing unit 49 of the service center 19*a* (step J4 shown in FIG. 54), whereby charge policy data 482 (refer to FIG. 48) with respect to the contents registration charge is generated, and registered on the database 15 (step J5 shown in FIG. 54). As this, a charge setting for such a service is completed that a contents registration charge of 1000 yen per one day is collected from the contents registrant 250 having registered a business information site (business information site) for a newspaper or news in the vicinity of a station.

After that, balloon position-contents URL correlation data 15-1 is registered on the database 15 in the similar manner to the steps H6 to H10 shown in FIG. 53. Incidentally, the order in which the items are selected described above with reference to FIGS. 57(a) through 57(d) is changeable. Further, the order and mode in which the data has been displayed on the portable terminal 11 can be freely set.

(D5) When a Specific Company Shoulders a Packet Communication Charge to the Portable Terminal Under a Contract Between the Communication Carrier 10' and a Certain Company 251 (refer to FIG. 44)

Next, description will be made of such a charge setting (menu selecting operation) that if a portable terminal 11 having accessed to certain timetable service contents (balloon) (not limited to a site operated by a specific provider) is of the latest type manufactured by a certain company 251 (for example, F company), F company 251 will shoulder a part of the packet communication charge to the portable terminal 11 under a contract between the communication carrier 10' and the company 251. Incidentally, the menu selecting operation in this case may be carried out by F company 251 (terminal 252) or a provider 242 requested by F company 251. The following description will be made in the former case.

The F company 251 (terminal 252) accesses to the service center 19a over, for example, the Internet 12 in order to perform the above charge setting. The service center 19a provides the charge setting menu 470 generated by the charge setting menu generating unit 48B to F company 251.

F company 251 (terminal 252) selects "1. FJ001" in a child menu of "A. terminal type" in the terminal-subscriber attribute list 451 as shown in FIG. 58(a), and selects "2. timetable" in a child menu of "B. information category" in the contents attribute list 452 as shown in FIG. 58(b).

As shown in FIG. 58(c), F company does not select anything in the contents provider attribute list 453. F company selects "A. packet charge" in the object charge list 461, as shown in FIG. 58(d). Whereupon, the charge input menu 461a is displayed. F company then inputs "2000" as an amount to be collected on a yen basis as unit, selects "4. yen/month" as frequency of collection, and selects "1. discount" as execution contents.

F company 251 (terminal 252) selects itself "1. F company" as "F. other company" in the charged account list 462, as shown in FIG. 58(e). F company then sends results of selection to the charge policy managing unit 59 of the service center 19a, whereby the charge policy managing unit 49 generates charge policy data 483 (refer to FIG. 49) with respect to a packet charge.

The charge policy data 483 is registered on the database 15 as described above (charge policy setting step). As this, such a charge setting for a service is completed that when a user accesses to certain timetable service contents using a portable terminal 11 of the latest model manufactured by F company, F company shoulders (discounts) a part (2000 yen per month) of a packet communication charge to the portable terminal 11. In this case, the order in which items shown in FIGS. 58(a) through 58(e) are selected is changeable. Further, the order and mode in which the lists are display on the portable terminal can be freely set.

(D6) Description of an Operation at the Time of Use of the Service

Next, an operation at the time that the service is used after the above charge setting is completed in the service center 19a will be described in detail with reference to a sequence diagram (steps K1 to K22).

When a user (service user) of the portable terminal 11 accesses to a space retrieval service (service center 19a) using the portable terminal 11, for example, (step K1), the service center 19a requests the terminal 11 to transmit position information (latitude, longitude, altitude) (step K2). In response to this, the terminal 11 notifies the service center 19a of position information detected by the detecting unit 21 (refer to FIG. 4) (step K3).

The service center 19a requests the portable terminal 11 to input retrieval conditions [retrieval distance, information (retrieval) category, etc.] (step K4). In response to this, the terminal 11 inputs retrieval conditions (step K5), and notifies the service center 19a of the conditions (step K6). In the service center 19a, the extracting unit 40 (refer to FIG. 40) accesses to the database 15 to retrieves balloons (step K7), and creates a list of titles and summaries (refer to FIG. 50) of balloons (retrieval hit balloons) satisfying the above designated conditions (including retrieval object space range information) (step K8).

The title/summary list is notified to the portable terminal 11 through the providing unit 41 (step K9). The user of the portable terminal 11 selects an item that the user desires to refer to in the list (step K10). The selected item is notified to the service center 19a (step K11). In the service center 19a, the extracting unit 40 retrieves and obtains a contents URL 15B corresponding to the selected item that has been notified in and from the database 15 (step K12), and the providing unit 41 notifies (provides) the portable terminal 11 of the contents URL 15B (step K13).

The user of the portable terminal 11 performs an access operation to the notified contents URL 15B (step K14) to access to the provider 242, and displays corresponding contents on the portable terminal 11 (steps K15 and K16). When displaying of the contents is completed thereafter, display completion notification is notified from the portable terminal 11 to the service center 19a (step K17). The service center 19a outputs a charge request to the charging system 43 (charging server 43a) with the notification as an opportunity (step K18).

The charging system 43 (charging server 43a) records a charge log 490 (refer to FIG. 51) in the charge database 43b in response to the above charge request (charge log processing; step K19), and notifies the charge particulars generating system 44 that the charging is completed (step K20). The charge particulars generating system 44 accesses to the database 15 to refer to charge policy data 480 (480 to 483) (step K21), totalizes the charge log according to a charge policy set by the charge policy data 480, and generates charge particulars data to be charged to the charged account (charge processing step; step K22).

According to the charging method (charge processing apparatus) of this embodiment, an arbitrary service mode and a charged account for a service charge of each charge type may be set, and a process of charging for the above service charge to the charged account may be carried out. In consequence, a flexible setting to charge a desired service charge in a desired service mode to a desired charged account becomes possible.

Accordingly, it becomes possible to set a charged account for a contents use charge or a packet communication charge occurring when the portable terminal 11 uses the space information service to a charged account (the company 251, the provider 242 or the communication carrier 10' according to the circumstances) other than the portable terminal 11 under certain conditions (service mode). Thus, an economical burden on the user caused by use of the space information service (space retrieval service) can be reduced. Particularly, since the opportunity of using the service by the user is assumed to largely increase in the above space retrieval service, it is very effective that a charged account can be arbitrarily set according to the service mode.

In order to increase the number of kinds of registered contents in the provider 242, it is possible to set a charged account for all of or a part of a contents registration charge to the provider 242 or another company by setting that the contents registration charge is free (or discounted) during a campaign, for example.

In the above example, by arbitrarily combining various sorts of attribute information in the terminal-subscriber attribute list 451, the contents attribute list 452, and the contents provider attribute list 453 (a combination of plural sorts of attribute information in the same list, or a combination of plural sorts of attribute information in different lists, or one sort of attribute information is possible), it is possible to finely perform a charge setting according to any one of various service modes. This largely improves flexibility of the charge setting.

Meanwhile, the above charging method is on the assumption that the balloon does not move (the information bubble movement control unit 42 is not disposed in the service center 19a). However, the charging method may be applied to a system in which the balloon is moved by the above information bubble movement control unit 42, as a matter of course.

When the balloon is moved, an opportunity of using the space retrieval service by the portable terminal 11 is more increased. Thus, it is very effective that the contents use charge or the packet communication charge can be charged to anyone the other than a user of the portable terminals 11, as above.

(E) Others

Note that the present invention is not limited to the above example, but may be modified in various ways without departing from the scope of the invention.

For example, the above-described detecting unit 21 of the portable terminal 11 may be externally disposed to the portable terminal 11. In such case, the detecting unit 21 may detect position information including latitude, longitude, altitude, azimuth and an inclination angle of an object of detection. Further, position information on an object of detection is not limited to latitude, longitude, altitude, azimuth and an inclination angle.

The above database 15 may hold astronomical information such as a constellation as space range information in the three-dimensional space, and provide the astronomical information as service information. Inscribed contents of the database 15 may be variously changed according to a design plan or the like other than the above described.

Instead of the above URL, URI (Uniform Resource Identifier) or URN (Uniform Resource Name) may be used as an address. As well known, "URI" is a name uniformly given to a resource of the Internet 12 using "http,", which is an IP address representing a computer name that is a resource of the Internet 12.

On the other hand, "URL" is that a protocol applied to a resource is described before URI representing the resource of the Internet 12, a format of which is presented as "protocol: URI." For example, http:130.*, ftp://130.*, gopher://130.***, etc. Incidentally, "URN" represents sole address.

The portable terminal 11 can access to the service center 19 at free under a contract of subscription between the user and the system administrator or on the basis of advertisement.

In the above embodiments, a portable terminal such as a portable telephone or a PDA is used as a user terminal. However, it is possible to use a personal computer (so-called a notebook-sized personal computer) of a portable type to which a radio transceiver (data communication function) is internally or externally disposed, which provides the similar functions and effects as well.

As retrieval conditions, it is possible to display a structure or a natural object along with an object of retrieval designated by the user when the structure or the natural object lies in front or in rear of the object of retrieval, and limit the number of displayed objects and make a list thereof.

In the above examples, an voluntary user can access to contents linked to an information bubble (balloon) and write a message or the like. However, there is possibility that the contents are rewritten by a mischievous or dishonest act.

For this, information (permission flag 484) representing write-inhibit to contents (balloon) of a public facility or travel guide that will have a trouble if any user freely rewrites, as shown in FIG. 60. A writing by a user to contents to which the permission flag 484 (YES) is set is inhibited, whereby the contents are protected.

The permission flag 484 may be set to data shown in FIGS. 8, 9 and 25, as a matter of course.

What is claimed is:

1. A server apparatus for a space information service comprising:
    an information bubble managing unit for managing bubble data in which space range information including position information in a real physical space is correlated with supply information in order to virtually register an information bubble related with said desired supply information in said real physical space;
    an extracting unit for extracting supply information of bubble data including retrieval object space range information based on position information on a user terminal from said information bubble managing unit;
    a providing unit for providing said supply information extracted by said extracting unit to said user terminal; and
    an information bubble movement control unit for updating at least position information of said bubble data to virtually move said information bubble in said real physical space, said information bubble movement control unit including
    an information bubble behavior setting unit for setting behavior data defining behavior of said information bubble in said real physical space, and
    an information bubble moving unit for updating position information of said bubble data on the basis of said behavior data set by said information bubble behavior setting unit to move said information bubble according to said behavior data,
    wherein said information bubble behavior setting unit including a random number generating unit for generating a random number with respect to position information of said bubble data as behavior data; and said information bubble moving unit including a first information bubble position updating unit for randomly updating position information of said bubble data with the random number generated by said random number generating unit to randomly move said information bubble in said real physical space.

2. The server apparatus for a space information service according to claim 1, wherein said information bubble behavior setting unit comprises a condition setting unit for setting condition data with respect to a time to move said information bubble to a specific position in said real physical space as said behavior data; and said information bubble moving unit comprises a second information bubble position updating unit for updating position information of said bubble data to position information on said specific position at a time defined by said condition data.

3. The server apparatus for a space information service according to claim 2, wherein said information bubble behavior setting unit sets an initial registered position for said information bubble as said specific position.

4. The server apparatus for a space information service according to claim 3, wherein said condition setting unit sets data with respect to an available period to move said information bubble as said condition data.

5. The server apparatus for a space information service according to claim 2, wherein said condition setting unit sets data with respect to an available period to move said information bubble as said condition data.

6. The server apparatus for a space information service according to claim 2, wherein said information bubble managing unit comprises a supply information updating unit for updating said supply information according to update information about said supply information from user terminals having received said supply information.

7. The server apparatus for a space information service according to claim 6, wherein said condition setting unit sets data with respect to the number of times of update of said supply information by said supply information updating unit as said condition data.

8. A server apparatus for a space information service comprising:

an information bubble managing unit for managing bubble data in which space range information including position information in a real physical space is correlated with supply information in order to virtually register an information bubble related with said desired supply information in said real physical space;

an extracting unit for extracting supply information of bubble data including retrieval object space range information based on position information on a user terminal from said information bubble managing unit;

a providing unit for providing said supply information extracted by said extracting unit to said user terminal; and an information bubble movement control unit for updating at least position information of said bubble data to virtually move said information bubble in said real physical space, said information bubble movement control unit including an information bubble behavior setting unit for setting behavior data defining behavior of said information bubble in said real physical space, and an information bubble moving unit for updating position information of said bubble data on the basis of said behavior data set by said information bubble behavior setting unit to move said information bubble according to said behavior data, wherein said information bubble behavior setting unit includes a condition setting unit for setting condition data with respect to a time to move said information bubble to a specific position in said real physical space as said behavior data, said information bubble behavior setting unit sets an initial registered position for said information bubble as said specific position, and said information bubble moving unit includes a second information bubble position updating unit for updating position information of said bubble data to position information on said specific position at a time defined by said condition data.

9. A server apparatus for a space information service comprising:

an information bubble managing unit for managing bubble data in which space range information including position information in a real physical space is correlated with supply information in order to virtually register an information bubble related with said desired supply information in said real physical space;

an extracting unit for extracting supply information of bubble data including retrieval object space range information based on position information on a user terminal from said information bubble managing unit;

a providing unit for providing said supply information extracted by said extracting unit to said user terminal; and an information bubble movement control unit for updating at least position information of said bubble data to virtually move said information bubble in said real physical space, said information bubble movement control unit including an information bubble behavior setting unit for setting behavior data defining behavior of said information bubble in said real physical space, and an information bubble moving unit for updating position information of said bubble data on the basis of said behavior data set by said information bubble behavior setting unit to move said information bubble according to said behavior data, wherein said information bubble behavior setting unit including a condition setting unit for setting condition data with respect to a time to move said information bubble to a specific position in said real physical space as said behavior data, and said information bubble moving unit including a second information bubble position updating unit for updating position information of said bubble data to position information on said specific position at a time defined by said condition data, and where said condition setting unit sets data with respect to an available period to move said information bubble as said condition data.

10. A server apparatus for a space information service comprising:

an information bubble managing unit for managing bubble data in which space range information including position information in a real physical space is correlated with supply information in order to virtually register an information bubble related with said desired supply information in said real physical space;

an extracting unit for extracting supply information of bubble data including retrieval object space range information based on position information on a user terminal from said information bubble managing unit;

a providing unit for providing said supply information extracted by said extracting unit to said user terminal; and an information bubble movement control unit for updating at least position information of said bubble data to virtually move said information bubble in said real physical space, said information bubble movement control unit including an information bubble behavior setting unit for setting behavior data defining behavior of said information bubble in said real physical space, and an information bubble moving unit for updating position information of said bubble data on the basis of said behavior data set by said information bubble behavior setting unit to move said information bubble according to said behavior data, wherein said information bubble behavior setting unit including a condition setting unit for setting condition data with respect to a time to move said information bubble to a specific position in said real physical space as said behavior data, and said information bubble moving unit including a second information bubble position updating unit for updating position information of said bubble data to position information on said specific position at a time defined by said condition data, and wherein said information bubble managing unit includes a supply information updating unit for updating said supply information according to upload information about said supply information received form one or more of user terminals having used said space information service and received said supply information.

11. A server apparatus for a space information service comprising:

an information bubble managing unit for managing bubble data in which space range information including position information in a real physical space is correlated with supply information in order to virtually register an information bubble related with said desired supply information in said real physical space;

an extracting unit extracting supply information of bubble data including retrieval object space range information based on position information on a user terminal from said information bubble managing unit;

a providing unit for providing said supply information extracted by said extracting unit to said user terminal; and an information bubble movement control unit for updating at least position information of said bubble data to virtually move said information bubble in said real physical space, said information bubble movement control unit including an information bubble behavior setting unit for setting behavior data defining behavior of said information bubble in said real physical space, and an information bubble moving unit for updating position information of said bubble data on the basis of said behavior data set by said information bubble behavior setting unit to move said information bubble according to said behavior data, wherein said information bubble behavior setting unit including a condition setting unit for setting condition data with respect to a time to move said information bubble to a specific position in said real physical space as said behavior data, and said information bubble moving unit including a second information bubble position updating unit for updating position information of said bubble data to position information on said specific position at a time defined by said condition data, and wherein said information bubble managing unit includes a supply information updating unit for updating said supply information according to update information about said supply information from a user terminal having received said supply information, and wherein said condition setting unit sets data with respect to the number of times of update of said supply information by said supply information updating unit as said condition data.

12. The server apparatus for a space information service comprising:

an information bubble managing unit for managing bubble data in which space range information including position information in a real physical space is correlated with supply information in order to virtually register an information bubble related with said desired supply information in said real physical space;

an extracting unit for extracting supply information of bubble data including retrieval object space range information based on position information on a user terminal from said information bubble managing unit;

a providing unit for providing said supply information extracted by said extracting unit to said user terminal; and an information bubble movement control unit for updating at least position information of said bubble data to virtually move said information bubble in said real physical space, wherein said information bubble managing unit includes a supply information updating unit for updating said supply information according to upload information about said supply information received from one or more of user terminals having used said space information service and received said supply information.

13. The method for providing a space information service comprising the steps of:

an information bubble managing unit for managing bubble data in which space range information including position information in a real physical space is correlated with supply information in order to virtually register an information bubble related with said desired supply information in said real physical space;

an information bubble moving step of updating at least position information of said bubble data to virtually move said information bubble in said real physical space;

an extracting step of extracting supply information of bubble data including retrieval object space range information based on position information or a user terminal; and a providing step of providing said supply information extracted at said extracting step to said user terminal, wherein at said information bubble moving step, position information of said bubble data is updated using a random number to randomly move said information bubble in said real physical space.

14. The method for providing a space information service according to claim 13, wherein at said information bubble moving step, position information of said bubble data is updated to specific position information when a predetermined period is elapsed after a start of movement of said information bubble to move said information bubble to a specific position in said real physical space.

15. The method for providing a space information service according to claim 14, wherein at said information bubble moving step, position information of said bubble data is updated to specific position information when the number of times of update of said supply information by user terminals having received said supply information reaches a predetermined number of times after a start of movement of said information bubble to move said information bubble to a specific position in said real physical space.

16. The method for providing a space information service according to claim 13, wherein at said information bubble moving step, position information of said bubble data is updated to specific position information when the number of times of update of said supply information by user terminals having received said supply information reaches a predetermined number of times after a start of movement of said information bubble to move said information bubble to a specific position in said real physical space.

17. The method for providing a space information service according to claim 16, wherein said specific position is an initial registered position of said information bubble.

18. The A method for providing a space information service comprising the steps of:
   an information bubble registering step of registering bubble data in which space range information including position information in a real physical space is correlated with supply information in order to virtually register an information bubble related with said desired supply information in said real physical space;
   an information bubble moving step of updating at least position information of said bubble data to virtually move said information bubble in said real physical space;
   an extracting step of extracting supply information of bubble data including retrieval object space range information based on position information on a user terminal; and
   a providing step of providing said supply information extracted at said extracting step to said user terminal,
   wherein at said information bubble moving step, position information of said bubble data is updated to specific position information when a predetermined period is elapsed after a start of movement of said information bubble to move said information bubble to a specific position in said real physical space, and
   wherein at said information bubble moving step, position information of said bubble data is updated to specific position information when the number of times of update of said supply information by user terminals having received said supply information reaches a predetermined number of times after a star of movement of said information bubble to move said information bubble to a specific position in said real physical space.

19. A method for providing a space information service comprising the steps of:
   an information bubble registering step of registering bubble data in which space range information including position information in a real physical space is correlated with supply information in order to virtually register an information bubble related with said desired supply information in said real physical space;
   an information bubble moving step of updating at least position information of said bubble data to virtually move said information bubble in said real physical space;
   an extracting step of extracting supply information of bubble data including retrieval object space range information based on position information on a user terminal; and
   a providing step of providing said supply information extracted at said extracting step to said user terminal,
   wherein at said information bubble moving step, position information of said bubble data is updated to specific position information when the number of times of update of said supply information by a user terminal having received said supply information reaches a predetermined number of times after a start of movement of said information bubble to move said information bubble to a specific position in said real physical space.

20. The method for providing a space information service according to claim 19, wherein said specific position is an initial registered position of said information bubble.

21. A charge processing apparatus for a space information service that manages bubble data in which space range information including position information in a real physical space is correlated with supply information in order to virtually register an information bubble related to said desired supply information in said real physical space, and provides supply information of bubble data including retrieval object space range information based on position information on a user terminal to said user terminal, said charge processing apparatus comprising:
   an attribute information storing unit for storing plural kinds of attribute information being able to define service modes of said space information service;
   a charge type information storing unit for storing information on plural types of service charges which can be objects of charge in said service modes;
   a charged account information storing unit for storing information on a plurality of charged accounts;
   a charge policy setting unit for arbitrarily combining various kinds of information in said storing unit to set a charged account for an arbitrary service mode and a service charge of an arbitrary type of charge; and
   a charge processing unit for executing a charging process to charge said service charge to said charged account according to a setting by said charge policy setting unit.

22. The charge processing apparatus for a space information service according to claim 21, wherein said attribute information storing unit stores attribute information on said user terminal and a user of said user terminal.

23. The charge processing apparatus for a space information service according to claim 22, wherein said attribute information storing unit stores information on said supply information.

24. The charge processing apparatus for a space information service according to claim 23, wherein said attribute information storing unit stores attribute information on a registrant of said supply information.

25. The charge processing apparatus for a space information service according to claim 22, wherein said attribute information storing unit stores attribute information on a registrant of said supply information.

26. The charge processing apparatus for a space information service according to claim 21, wherein said attribute information storing unit stores attribute information on said supply information.

27. The charge processing apparatus for a space information service according to claim 26, wherein said attribute information storing unit stores attribute information on a registrant of said supply information.

28. The charge processing apparatus for a space information service according to claim 21, wherein said attribute information storing unit stores attribute information on a registrant of said supply information.

29. The charge processing apparatus for a space information service according to claim 21, wherein said charge type information storing unit stores information on a use charge and a communication charge for said supply information at the time that said user terminal receives said supply information, and a registration charge for said simply information as information with respect to said service charges.

30. A method for charging a space information service that manages bubble data in which space range information including position information in a real physical space is correlated with supply information in order to virtually register an information bubble related to said desired supply information in said real physical space, and provides supply information of bubble data including retrieval object space information based on position information on a user terminal to said user terminal, said method comprising the steps of:
 a charge policy setting step of arbitrary combining plural kinds of attribute information being able to define service modes of said space information service, information on types of plural kinds of service charges that can be objects in said service modes, and information on a plurality of charged accounts to set an arbitrary service mode and a charged account for a service charge of each type of charge; and
 a charge processing step of executing a charging process to said charged account for said service charge according to a setting at said charge policy setting step.

31. The method for charging a space information service according to claim 30, wherein said attribute information is attribute information on said user terminal and a user of said user terminal.

32. The method for charging a space information service according to claim 31, wherein said attribute information is attribute information on said supply information.

33. The method for charging a space information service according to claim 32, wherein said attribute information is attribute information on a registrant of said supply information.

34. The method for charging a space information service according to claim 31, wherein information on said service charge is information on a use charge and a communication charge at the time that said user terminal receives said supply information, and a registration charge for said supply information.

35. The method for charging a space information service according to claim 30, wherein said attribute information is attribute information on said supply information.

36. The method for charging a space information service according to claim 35, wherein said attribute information is attribute information on a registrant of said supply information.

37. The method for charging a space information service according to claim 30, wherein said attribute information is attribute information on a registrant of said supply information.

38. The method for charging a space information service according to claim 30, wherein information on said service charge is information on a use charge and a communication charge at the time that said user terminal receives said supply information, and a registration charge for said supply information.

\* \* \* \* \*